US011412422B2

(12) United States Patent
Rastegardoost et al.

(10) Patent No.: US 11,412,422 B2
(45) Date of Patent: Aug. 9, 2022

(54) HANDOVER IN UNLICENSED BAND

(71) Applicant: Ofinno, LLC, Reston, VA (US)

(72) Inventors: Nazanin Rastegardoost, McLean, VA (US); Esmael Hejazi Dinan, McLean, VA (US); Hyoungsuk Jeon, Centreville, VA (US); Kyungmin Park, Vienna, VA (US); Hua Zhou, Herndon, VA (US); Kai Xu, Herndon, VA (US); Ali Cagatay Cirik, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 26 days.

(21) Appl. No.: 16/800,518

(22) Filed: Feb. 25, 2020

(65) Prior Publication Data

US 2020/0296635 A1 Sep. 17, 2020

Related U.S. Application Data

(60) Provisional application No. 62/818,345, filed on Mar. 14, 2019.

(51) Int. Cl.
*H04W 36/00* (2009.01)
*H04W 36/08* (2009.01)
*H04W 72/04* (2009.01)
*H04W 74/08* (2009.01)
*H04L 5/00* (2006.01)

(52) U.S. Cl.
CPC ....... *H04W 36/0055* (2013.01); *H04L 5/0048* (2013.01); *H04W 36/08* (2013.01); *H04W 72/042* (2013.01); *H04W 74/0833* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,965,434 B1* | 3/2021 | Babaei | ................. | H04W 72/14 |
| 2011/0194407 A1* | 8/2011 | Ji | .......................... | H04W 56/00 |
| | | | | 370/226 |
| 2014/0126497 A1* | 5/2014 | Xu | .................... | H04W 52/0229 |
| | | | | 370/329 |
| 2016/0254888 A1* | 9/2016 | Nagata | ............. | H04W 72/0453 |
| | | | | 370/329 |

(Continued)

OTHER PUBLICATIONS

3GPP TS 36.212 V15.3.0 (Sep. 2018); 3rd Generation Partnership Project; Technical Specification Group Radio Access Network; Evolved Universal Terrestrial Radio Access (E-UTRA); Multiplexing and channel coding (Release 15).

(Continued)

*Primary Examiner* — Yee F Lam
(74) *Attorney, Agent, or Firm* — Trent W. Merrell; Kavon Nasabzadeh; Brett Gardner

(57) ABSTRACT

A wireless device receives a radio resource control message from a base station that indicates a handover from a first cell of the first base station to a second cell of a second base station. During the handover, a DCI from the second base station is received that indicates a random access channel occasion. The random access channel occasion is determined and used to transmit a preamble to the second base station. Once a response to the preamble is received, the wireless device transmits a message to the second base station to indicate a completion of the handover.

20 Claims, 27 Drawing Sheets

(56) References Cited

U.S. PATENT DOCUMENTS

| | | | |
|---|---|---|---|
| 2018/0049073 A1* | 2/2018 | Dinan | H04W 36/08 |
| 2018/0124648 A1* | 5/2018 | Park | H04W 36/0005 |
| 2018/0124650 A1* | 5/2018 | Park | H04L 41/0873 |
| 2018/0124656 A1* | 5/2018 | Park | H04W 36/0072 |
| 2018/0279136 A1* | 9/2018 | Tsai | H04W 72/046 |
| 2019/0081740 A1* | 3/2019 | Kaikkonen | H04W 72/0446 |
| 2019/0261281 A1* | 8/2019 | Jung | H04W 52/146 |
| 2019/0268060 A1* | 8/2019 | Nam | H04B 7/0695 |
| 2019/0313447 A1* | 10/2019 | Islam | H04W 74/006 |
| 2020/0029259 A1* | 1/2020 | Yiu | H04W 74/008 |
| 2020/0314709 A1* | 10/2020 | Ly | H04W 72/14 |

OTHER PUBLICATIONS

3GPP TS 36.213 V15.3.0 (Sep. 2018); p. 8-58.
3GPP TS 36.213 V15.3.0 (Sep. 2018); p. 279-376.
3GPP TS 36.300 V15.4.0 (Dec. 2018); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description;; Stage 2; (Release 15).
3GPP TS 37.213 V15.1.0 (Sep. 2018); 3rd Generation Partnership Project; Technical Specification Group Radio Access Network; Physical layer procedures for shared spectrum channel access; (Release 15).
3GPP TS 38.212 V15.4.0 (Dec. 2018); 3rd Generation Partnership Project; Technical Specification Group Radio Access Network; NR; Multiplexing and channel coding; (Release 15).
3GPP TS 38.213 V15.4.0 (Dec. 2018); 3rd Generation Partnership Project; Technical Specification Group Radio Access Network; NR; Physical layer procedures for control; (Release 15).
3GPP TS 38.300 V15.4.0 (Dec. 2018); 3rd Generation Partnership Project; Technical Specification Group Radio Access Network; NR; NR and NG-RAN Overall Description; Stage 2; (Release 15).
3GPP TS 38.321 V15.4.0 (Dec. 2018); 3rd Generation Partnership Project; Technical Specification Group Radio Access Network; NR; Medium Access Control (MAC) protocol specification; (Release 15).
3GPP TS 38.331 V15.4.0 (Dec. 2018); 3rd Generation Partnership Project; Technical Specification Group Radio Access Network; NR; Radio Resource Control (RRC) protocol specification; (Release 15).
3GPP TR 38.889 V1.0.0 (Nov. 2018); 3rd Generation Partnership Project; Technical Specification Group Radio Access Network; Study on NR-based Access to Unlicensed Spectrum; (Release 16).
3GPP TSG RAN WG1 Meeting #94 Gothenburg, Sweden, Aug. 20-24, 2018 Title: RAN1 Chairman's Notes.
3GPP TSG RAN WG1 Meeting #94bis Chengdu, China, Oct. 8-12, 2018 Title: RAN1 Chairman's Notes.
3GPP TSG RAN WG1 Meeting #95 Spokane, USA, Nov. 12-16, 2018 Title: RAN1 Chairman's Notes.
3GPP TSG RAN WG1 Meeting Ad-Hoc Meeting 1901 Taipei, Taiwan, Jan. 21-25, 2019 Title: RAN1 Chairman's Notes.
3GPP TSG RAN WG1 Meeting #96 Athens, Greece, Feb. 25-Mar. 1, 2019 Title: RAN1 Chairman's Notes.
3GPP TSG RAN WG1 Meeting #95 R1-1812356 Spokane, USA, Nov. 12-16, 2018; Agenda item: 7.2.2.4.1; Source: MediaTek Inc.; Title: Channel access procedure in NR-U; Document for: Discussion and decision.
3GPP TSG RAN WG1 Meeting #95 R1-1812561, Spokane, USA, Nov. 12-16, 2018; Agenda Item: 7.2.2.4.2; Source: LG Electronics; Title: Initial access and mobility for NR unlicensed operation Document for: Discussion and decision.
3GPP TSG RAN WG1 Meeting #95 R1-1812698; Spokane, USA, Nov. 12-16, 2018; Agenda item: 7.2.2.4.2; Source: Nokia, Nokia Shanghai Bell; Title: On Initial Access and Mobility for NR-U; Document for: Discussion and Decision.
3GPP TSG RAN WG1 Meeting #95 R1-1812720; Spokane, USA, Nov. 12-16, 2018; Agenda Item: 7.2.2.4.1; Source: TCL Communication; Title: On Paging and RACH enhancements for NR-U; Document for: Discussion and decision.
3GPP TSG RAN WG1 Meeting #95 R1-1812802; Spokane, USA, Nov. 12-16, 2018; Source: OPPO; Title: Initial access and mobility for NR-U; Agenda Item: 7.2.2.4.2; Document for: Discussion and Decision.
3GPP TSG RAN WG1 Meeting #95 R1-1813217; Spokane, USA, Nov. 12-16, 2018; Agenda Item: 7.2.2.2; Source: InterDigital Inc.; Title: NR-U Frame Structure Design; Document for: Discussion and Decision.
3GPP TSG RAN WG1 Meeting #95 R1-1813221; Spokane, USA, Nov. 12-16, 2018 ; Agenda Item: 7.2.2.4.2; Source: InterDigital Inc.; Title: Discussion on Procedures for Initial Access and Mobility in NR-U; Document for: Discussion and Decision.
3GPP TSG RAN WG1 Meeting #95 R1-183410; Spokane, USA; Nov. 12-Nov. 16, 2018; Agenda item: 7.2.2.2; Source: Qualcomm Incorporated; Title: TxOP Frame Structure for NR unlicensed; Document for: Discussion and Decision.
3GPP TSG RAN WG1 Meeting #95 R1-1813414; Spokane, USA; Nov. 12-Nov. 16, 2018; Agenda item: 7.2.2.4.2; Source: Qualcomm Incorporated; Title: Initial access and mobility procedures for NR unlicensed Document for: Discussion and Decision.
3GPP TSG-RAN WG1 Meeting #95 R1-1813459; Spokane, USA, Nov. 12-16, 2018; Agenda Item: 7.2.2.4.2; Source: Ericsson; Title: On initial access, RRM, mobility and RLM; Document for: Discussion, Decision.
3GPP TSG-RAN WG1 Meeting 1901 R1-1903024; Athens, Greece, Feb. 25-Mar. 1, 2019; Agenda item: 7.2.12.1; Source: Qualcomm Incorporated; Title: On Mobility Enhancements during HO; Document for: Discussion/Decision.
3GPP TSG RAN WG1 Meeting #96 R1-1903113; Athens, Greece, Feb. 25-Mar. 1, 2019; Agenda Item: 7.2.12.1; Source: Huawei, HiSilicon; Title: Overview on NR mobility enhancements; Document for: Discussion and decision.
3GPP TSG-RAN WG2 Meeting #104 R2-1816688; Spokane, US, Nov. 12-16, 2018 Revision of R2-1813964; Agenda Item: 11.2.1.1; Souce: MediaTek Inc.; Title: Random access backoff and timers in NR-U; Document for Discussion and decision.
3GPP TSG-RAN WG2 Meeting #104 R2-1816776; Spokane, U.S. A, Nov. 12-16, 2018 Revision of R2-1814007; Agenda Item: 11.2.1.1; Source: InterDigital; Title: Random access in NR-Unlicensed; Document for: Discussion, Decision.
3GPP TSG-RAN WG2 Meeting #104 R2-1817473; Spokane, USA, Nov. 12-16, 2018; Agenda Item: 11.2.1.1 Source: Apple Inc.; Title: RACH Enhancements in NR-U; Document for: Discussion.
3GPP TSG-RAN WG2 #104 TDoc R2-1817966; Spokane, WA, USA, Nov. 12-16, 2018; Revision of R2-1815026; Agenda Item: 11.2.1.1 ; Source: Ericsson; Title: Discussions on RACH enhancements for NR-U; Document for: Discussion, Decision.
3GPP TSG RAN Meeting #80 RP-181433; La Jolla, USA, May 21-May 25, 2018; Source: Intel Corporation Title: New WID: NR mobility enhancements; Document for: Approval; Agenda Item: 9.1.10.

* cited by examiner

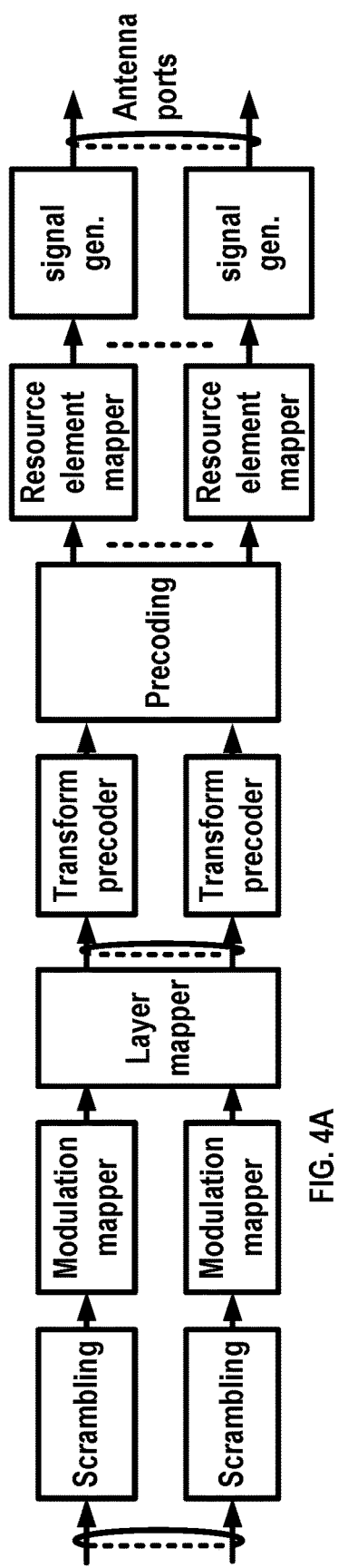
FIG. 4A
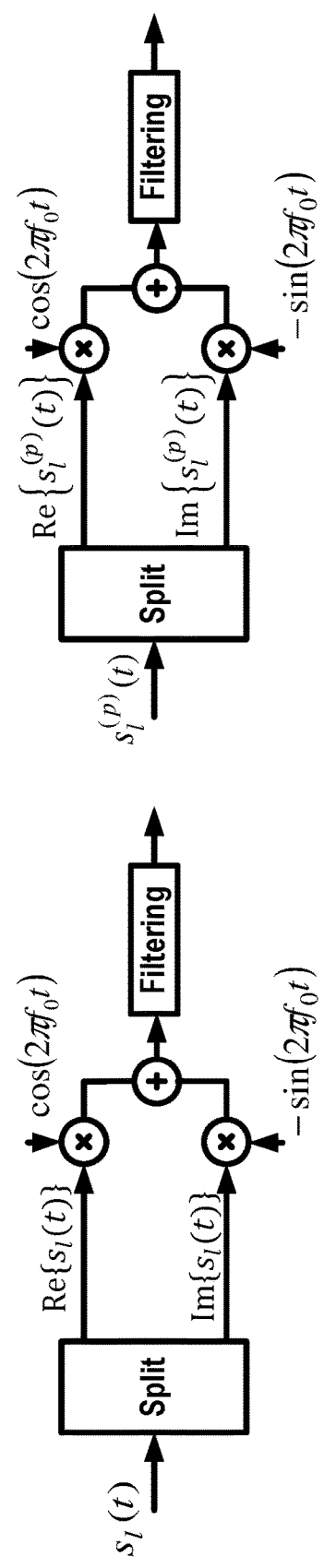
FIG. 4B
FIG. 4D
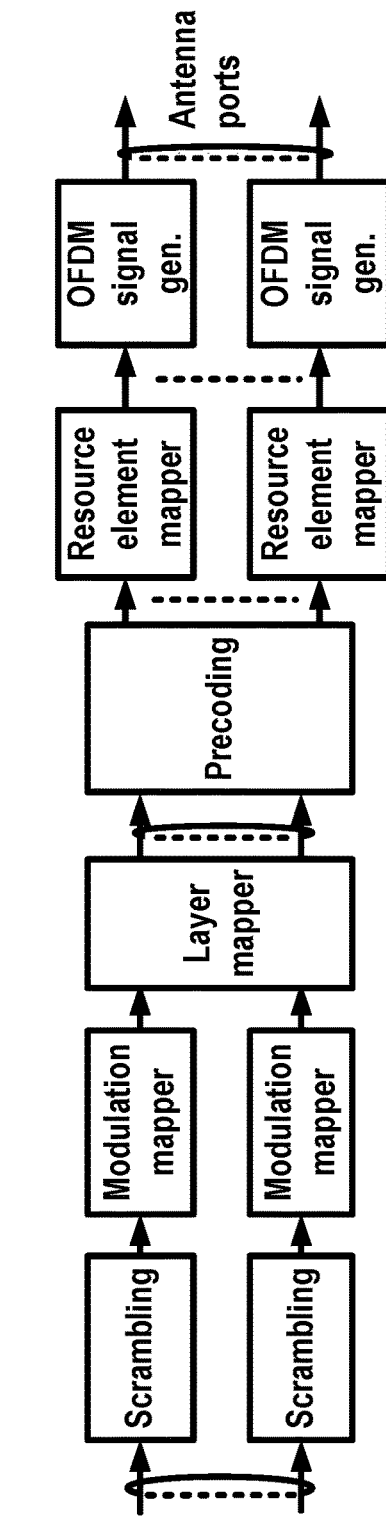
FIG. 4C

```
┌─────────────────────────────────────────────────────────┐
│ Receive RRC message(s) from a first base station,       │
│ indicating a handover from a first cell of the first    │
│ base station to a second cell of a second base station  │
└─────────────────────────────────────────────────────────┘
                            │
                            ▼
┌─────────────────────────────────────────────────────────┐
│        Receive a DCI from the second base station       │
└─────────────────────────────────────────────────────────┘
                            │
                            ▼
┌─────────────────────────────────────────────────────────┐
│    Determine a random access channel occasion (RO)      │
│           of the second cell based on the DCI           │
└─────────────────────────────────────────────────────────┘
                            │
                            ▼
┌─────────────────────────────────────────────────────────┐
│   Transmit a preamble to the second base station via    │
│                         the RO                          │
└─────────────────────────────────────────────────────────┘
                            │
                            ▼
┌─────────────────────────────────────────────────────────┐
│ Transmit, based on receiving a response to the preamble,│
│ a message to the second base station indicating a       │
│ completion of the handover                              │
└─────────────────────────────────────────────────────────┘
```

FIG. 26

```
┌─────────────────────────────────────────────┐
│ Transmit, to a first base station, a first message indicating an
│ acknowledgement of a handover request for a wireless device
│ from a first cell of the first base station to a second cell of the
│ second base station
└─────────────────────────────────────────────┘
                        │
                        ▼
┌─────────────────────────────────────────────┐
│ Transmit, to the wireless device, a DCI indicating a random
│ access channel occasion (RO) of the second cell
└─────────────────────────────────────────────┘
                        │
                        ▼
┌─────────────────────────────────────────────┐
│ Receive a preamble from the wireless device via the RO
└─────────────────────────────────────────────┘
                        │
                        ▼
┌─────────────────────────────────────────────┐
│ Transmit, to the wireless device, a response of the preamble
└─────────────────────────────────────────────┘
                        │
                        ▼
┌─────────────────────────────────────────────┐
│ Receive a second message, from the wireless device,
│ indicating a completion of the handover
└─────────────────────────────────────────────┘
```

FIG. 27

HANDOVER IN UNLICENSED BAND

CROSS-REFERENCE TO RELATED APPLICATIONS

This application claims the benefit of U.S. Provisional Application No. 62/818,345, filed Mar. 14, 2019, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 26 is a flow diagram of an example embodiment for a wireless device scheduled with dynamic random access channel resources during a handover in unlicensed bands as per an aspect of the present disclosure.

FIG. 27 is a flow diagram of an example embodiment for a base station dynamically scheduling random access channel resources during a handover in unlicensed bands as per an aspect of the present disclosure.

DETAILED DESCRIPTION OF EMBODIMENTS

Figure 1:
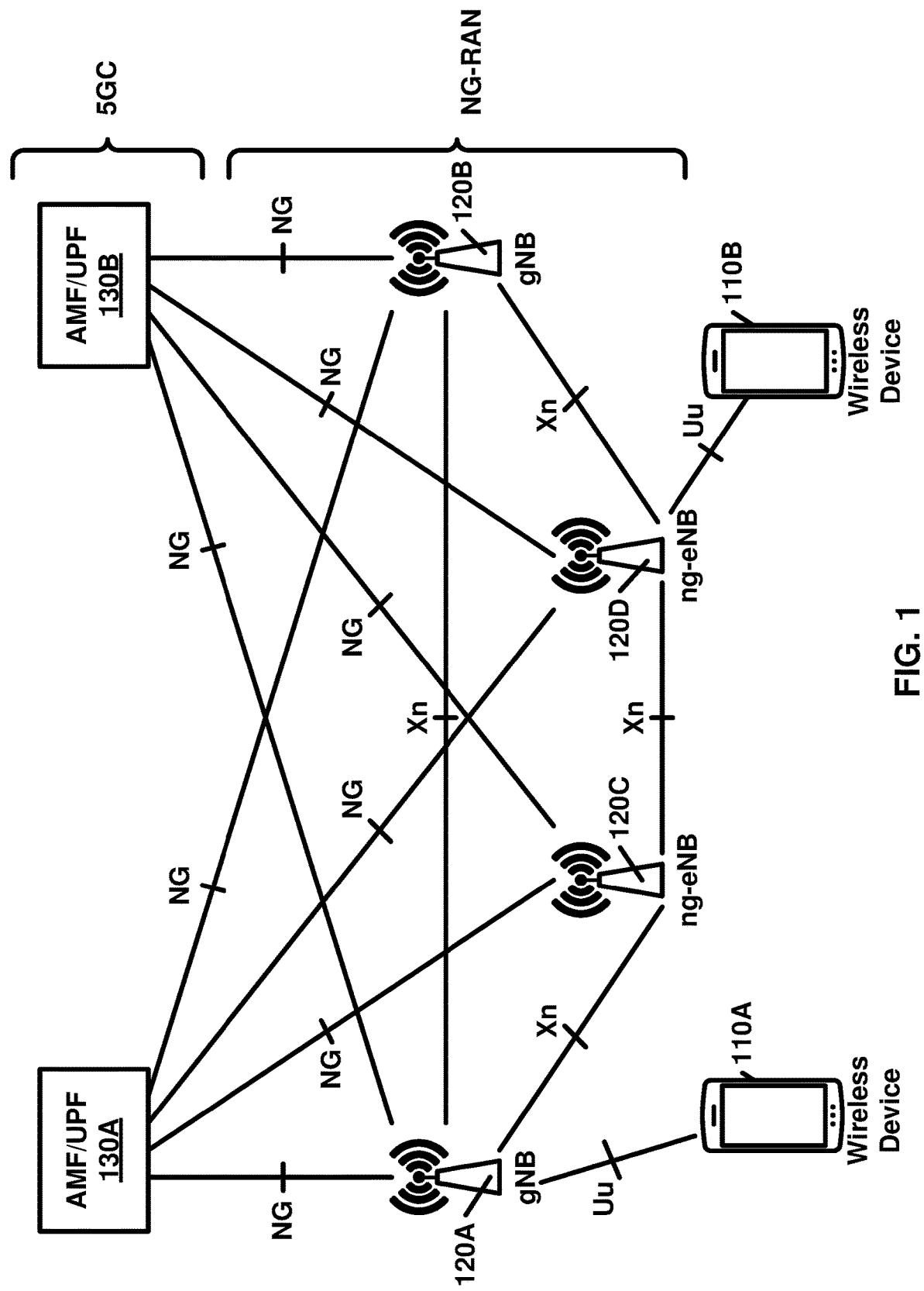
FIG. 1 is a diagram of an example RAN architecture as per an aspect of an embodiment of the present disclosure.

Example embodiments of the present disclosure enable operation of handover in unlicensed band. Embodiments of the technology disclosed herein may be employed in the technical field of multicarrier communication systems. More particularly, the embodiments of the technology disclosed herein may relate to dynamic scheduling of random access for handover in unlicensed band in a multicarrier communication system.

The following Acronyms are used throughout the present disclosure:
3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix—Orthogonal Frequency Division Multiplex C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control CHannel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic CHannel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel IDentifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank Indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 120C, 120D), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface.

A gNB or an ng-eNB may host functions such as radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
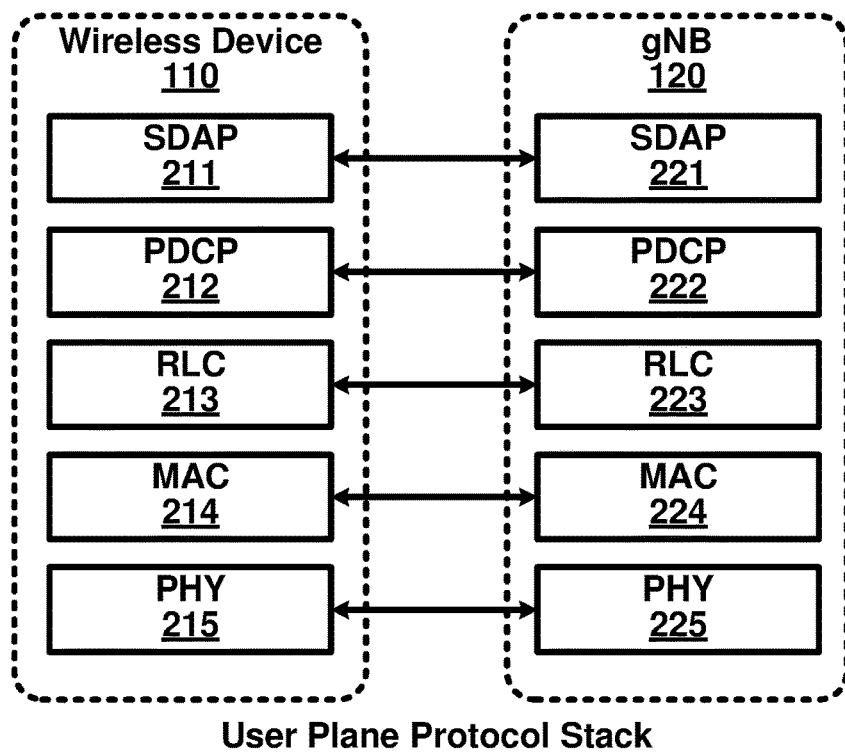
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC and/or RRC). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer.

In an example, services and functions of SDAP may comprise mapping Quality of Service Indicator (QFI) in DL and UL packets. In an example, a protocol entity of SDAP may be configured for an individual PDU session.

Figure 2B:
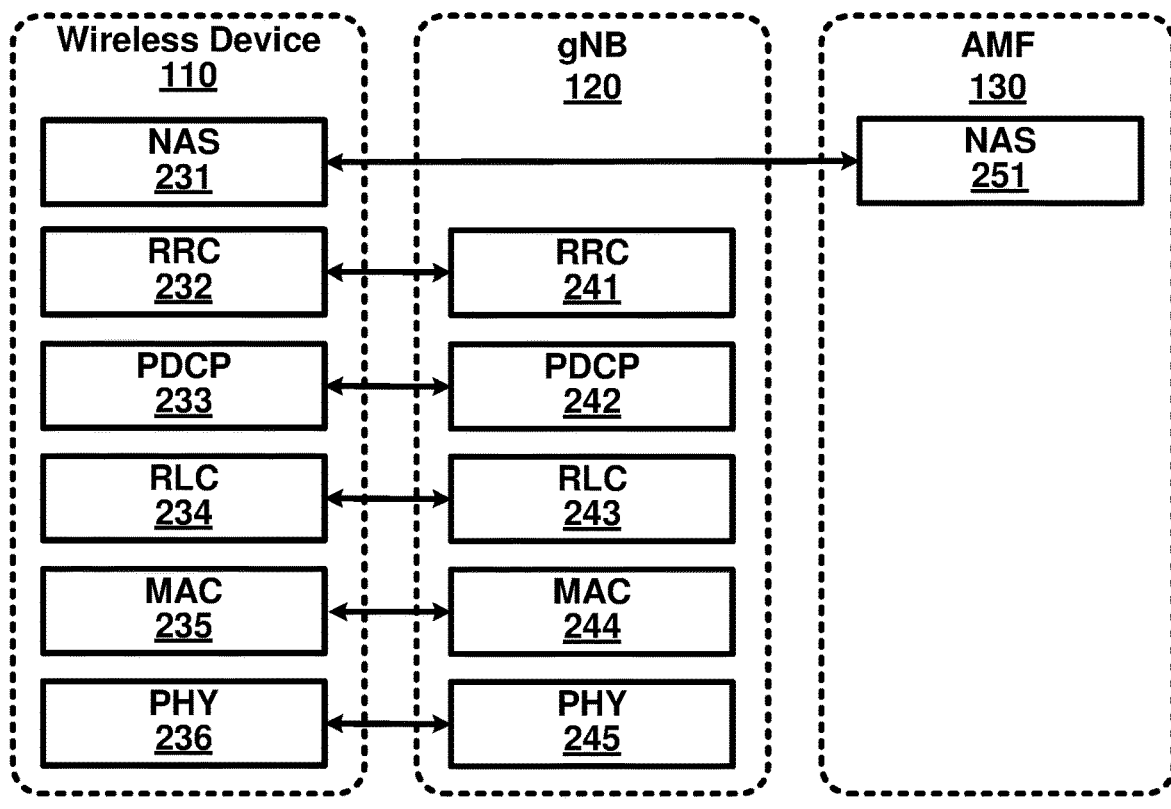
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/semi-statically configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
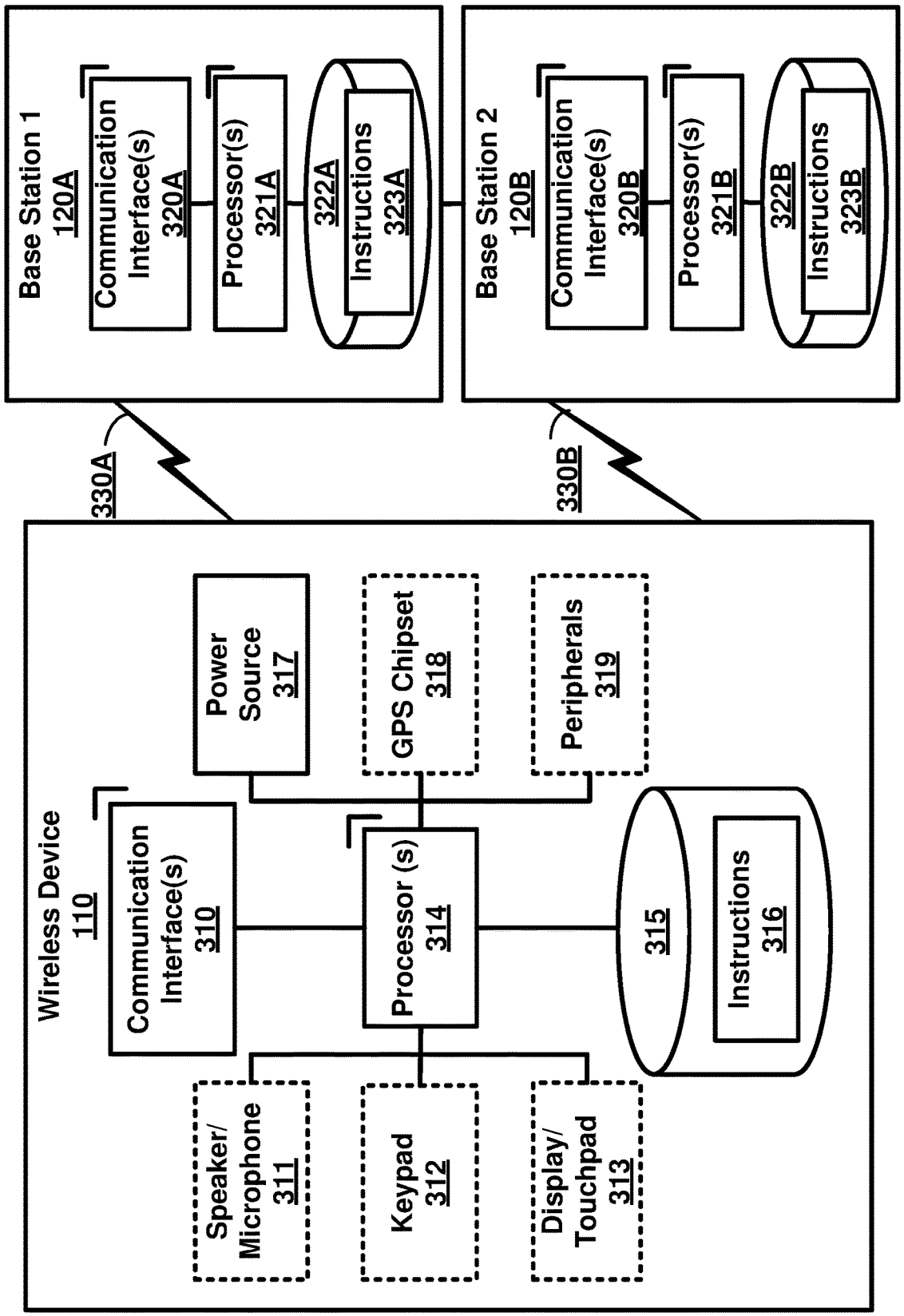
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
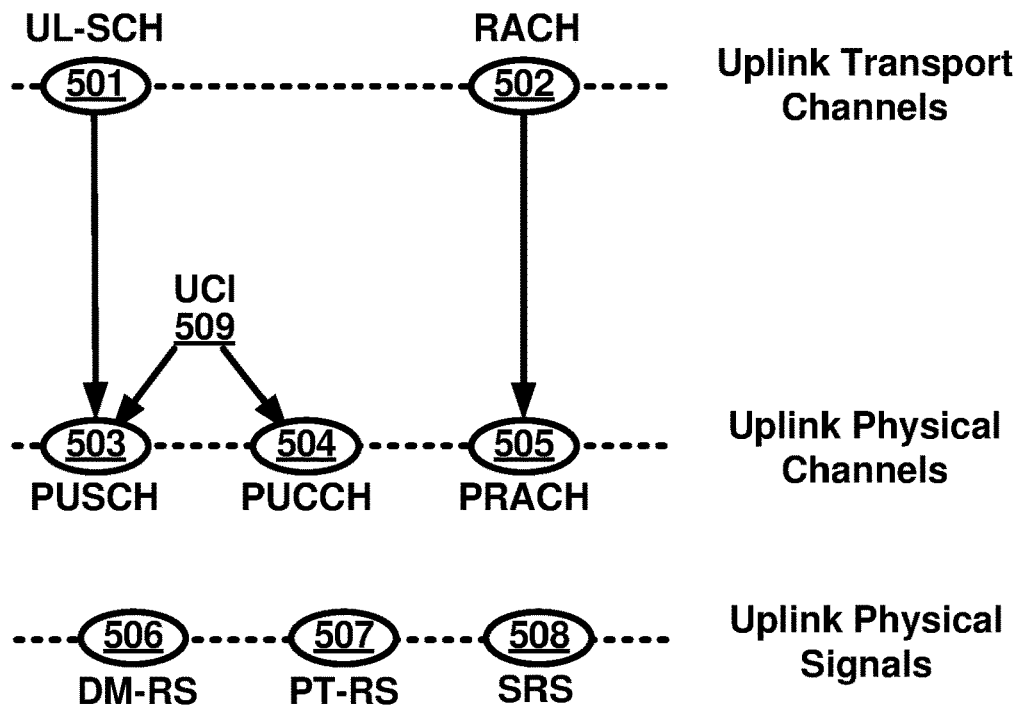
FIG. 5A is a diagram of an example uplink channel mapping and example uplink physical signals as per an aspect of an embodiment of the present disclosure.
Figure 5B:
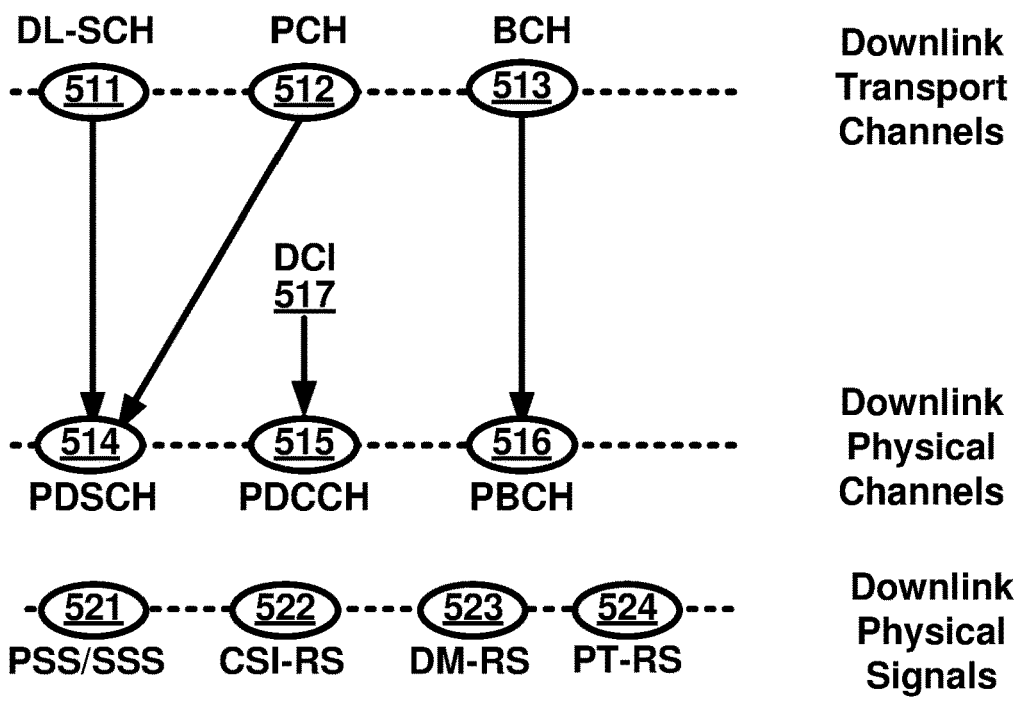
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statically configure a UE with one or more CSI-RS resource sets. One or more CSI-RS resources may be allocated from one or more CSI-RS resource sets to one or more UEs. For example, a base station may semi-statically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
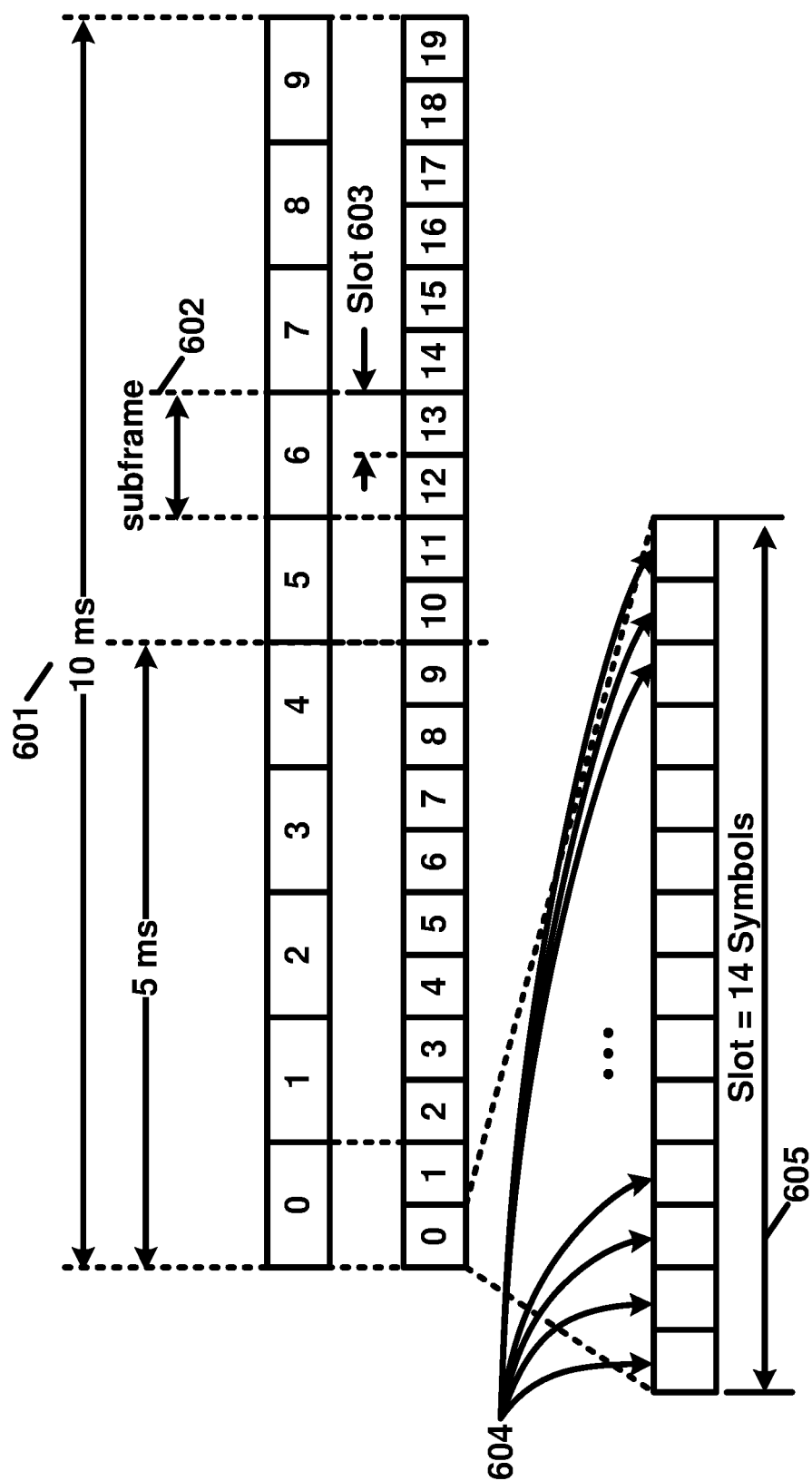
FIG. 6 is a diagram depicting an example frame structure as per an aspect of an embodiment of the present disclosure.

FIG. 6 is a diagram depicting an example frame structure for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame structure. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
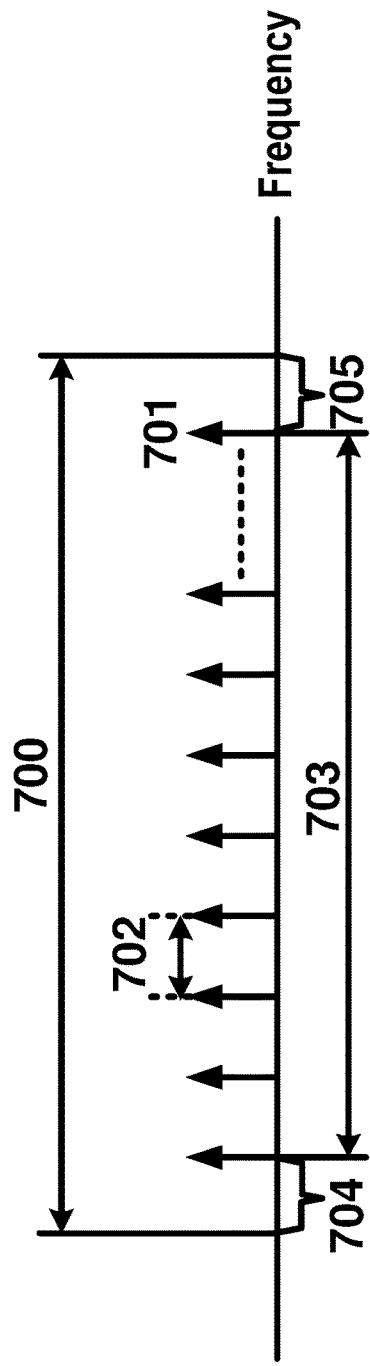
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
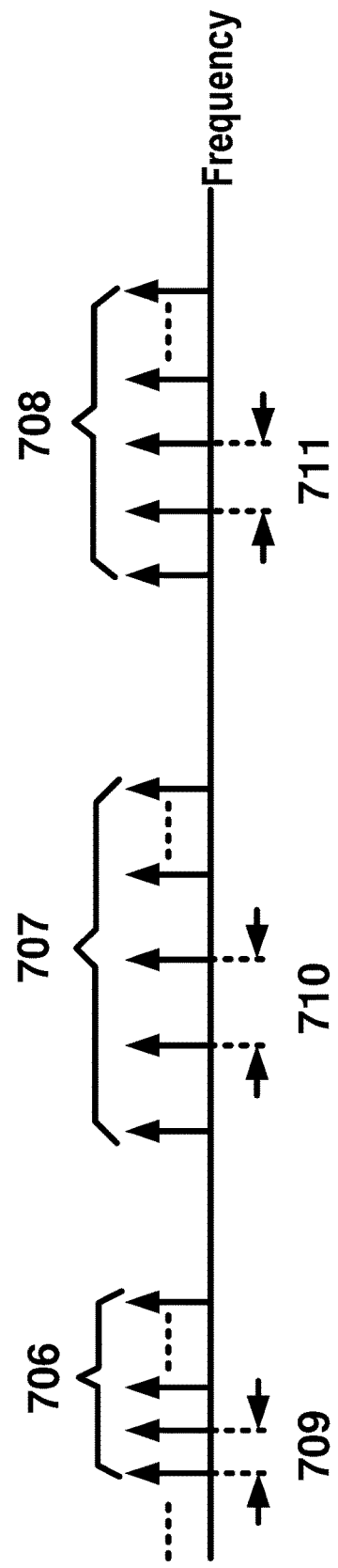

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
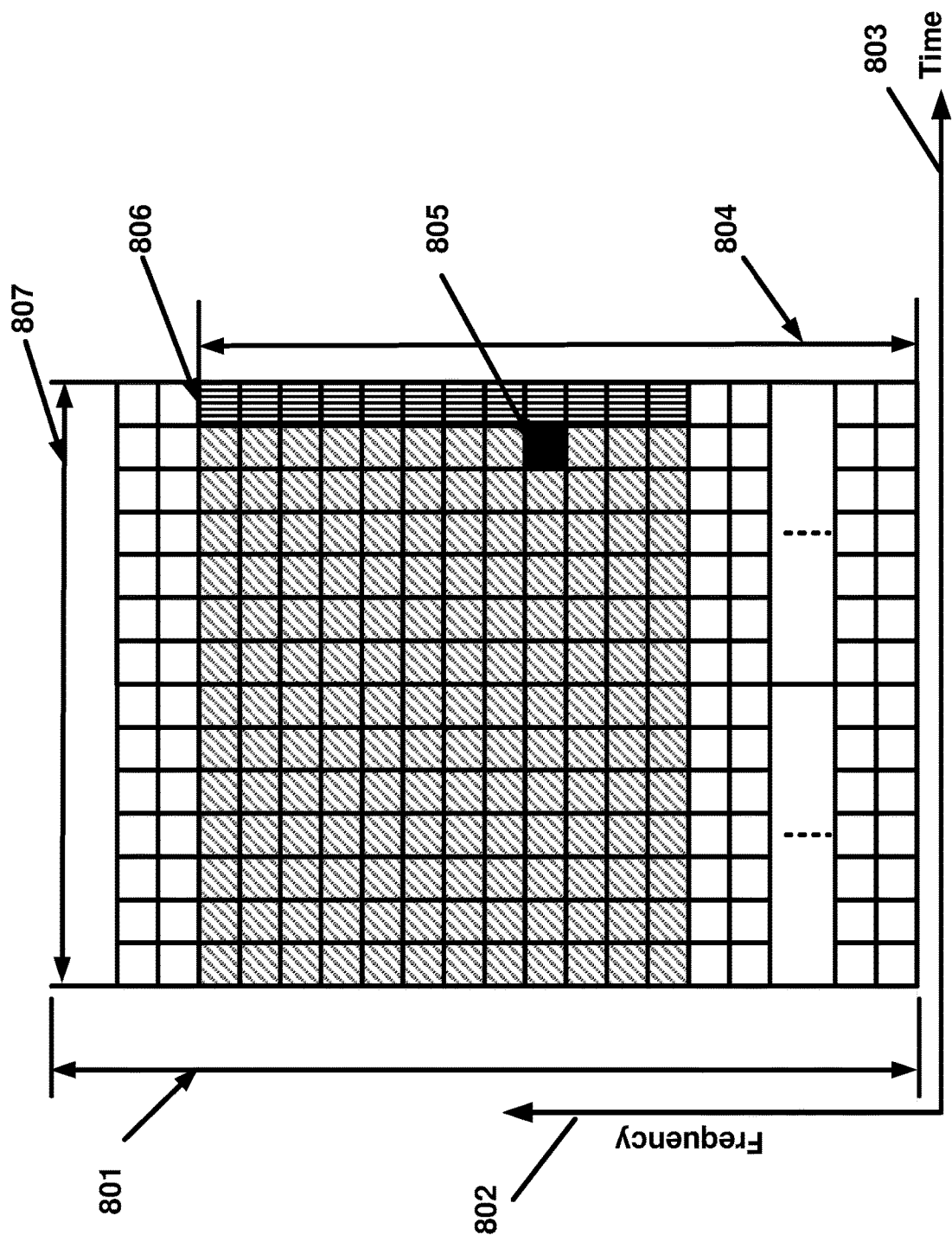
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message (s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a semi-statically configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCL-ed with the DM-RS antenna port(s). Different set of DM-RS antenna port(s) for a DL data channel may be indicated as QCL with different set of the RS antenna port(s).

Figure 9A:
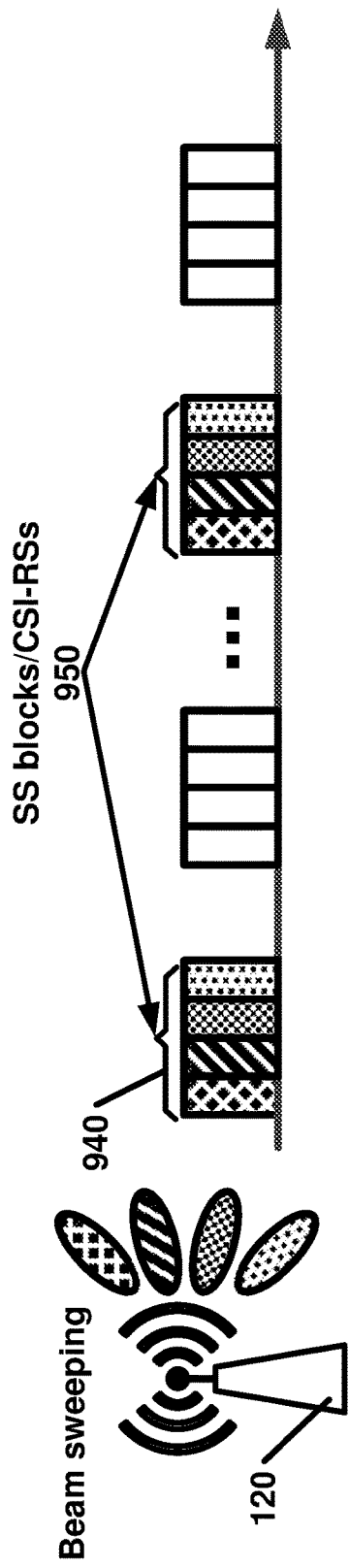
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
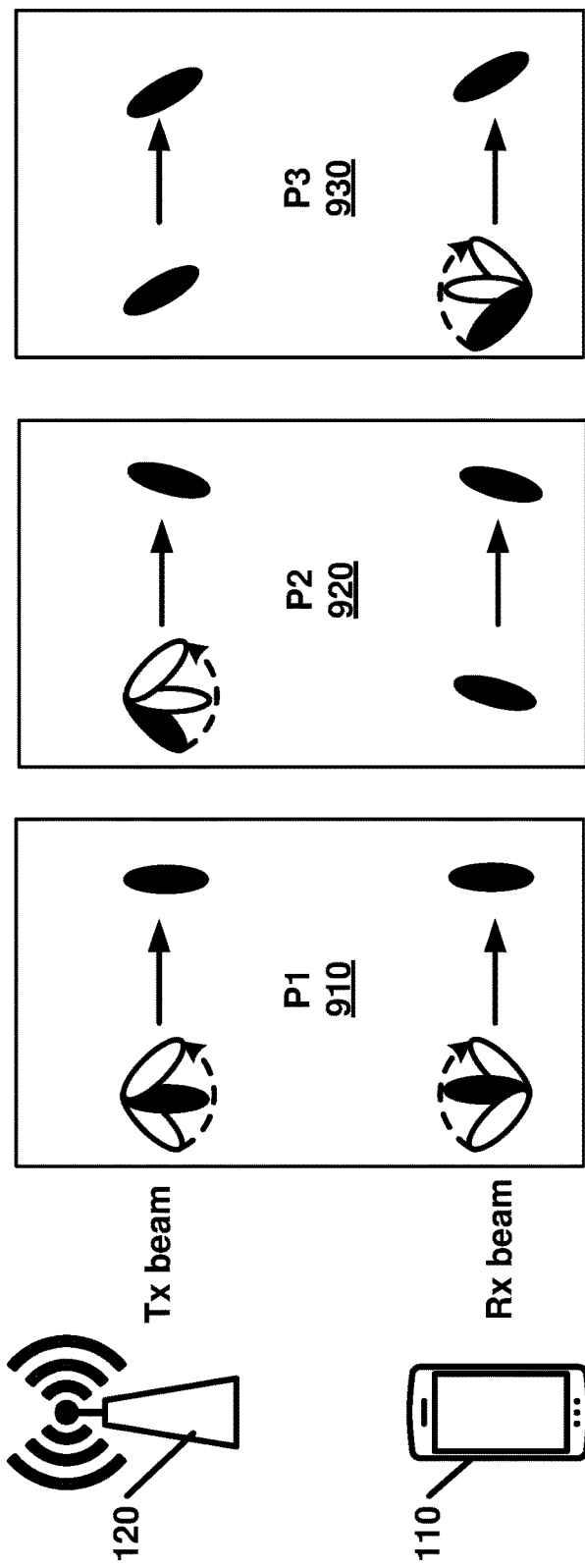
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
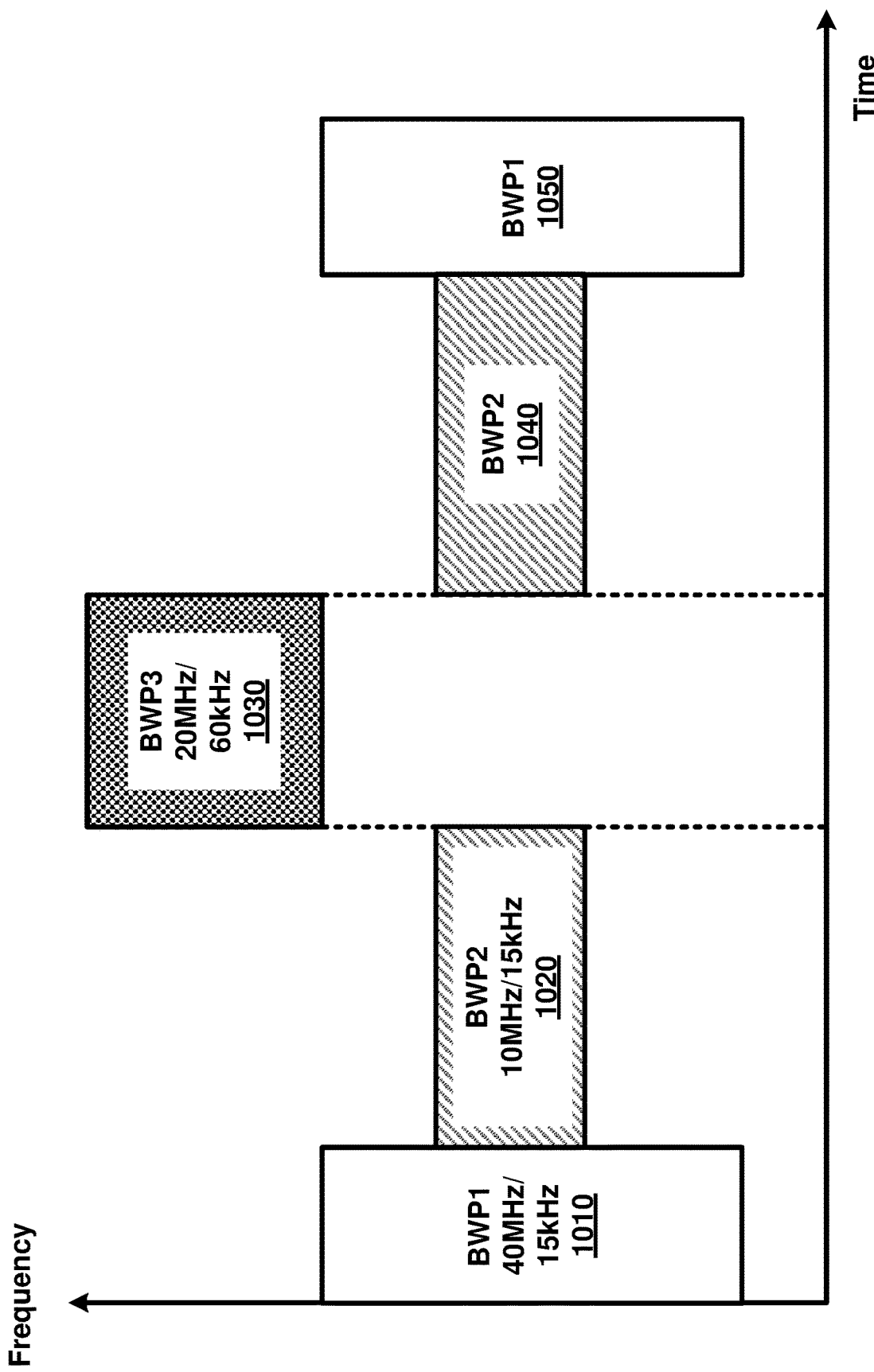
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
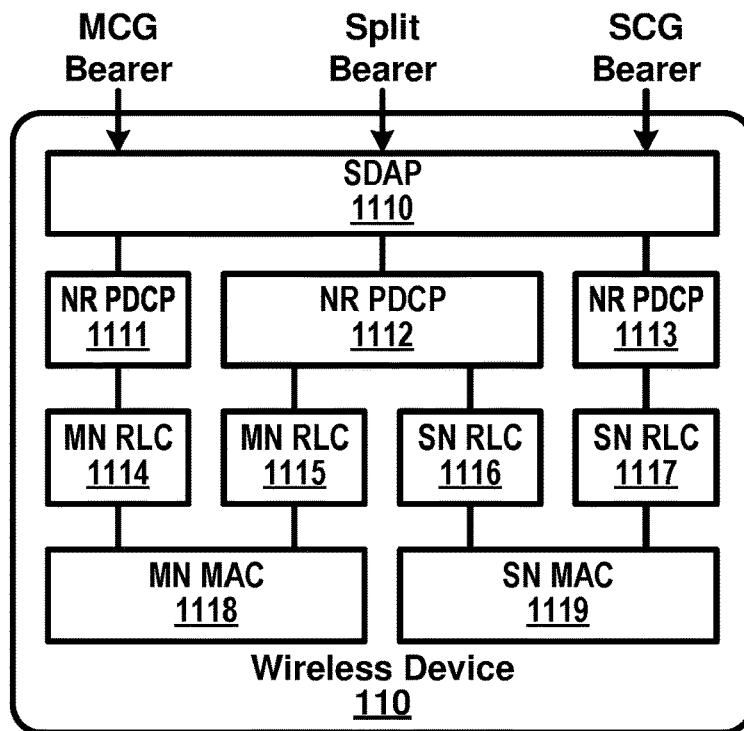
FIG. 11A and FIG. 11B are diagrams of an example multi connectivity as per an aspect of an embodiment of the present disclosure.
Figure 11B:
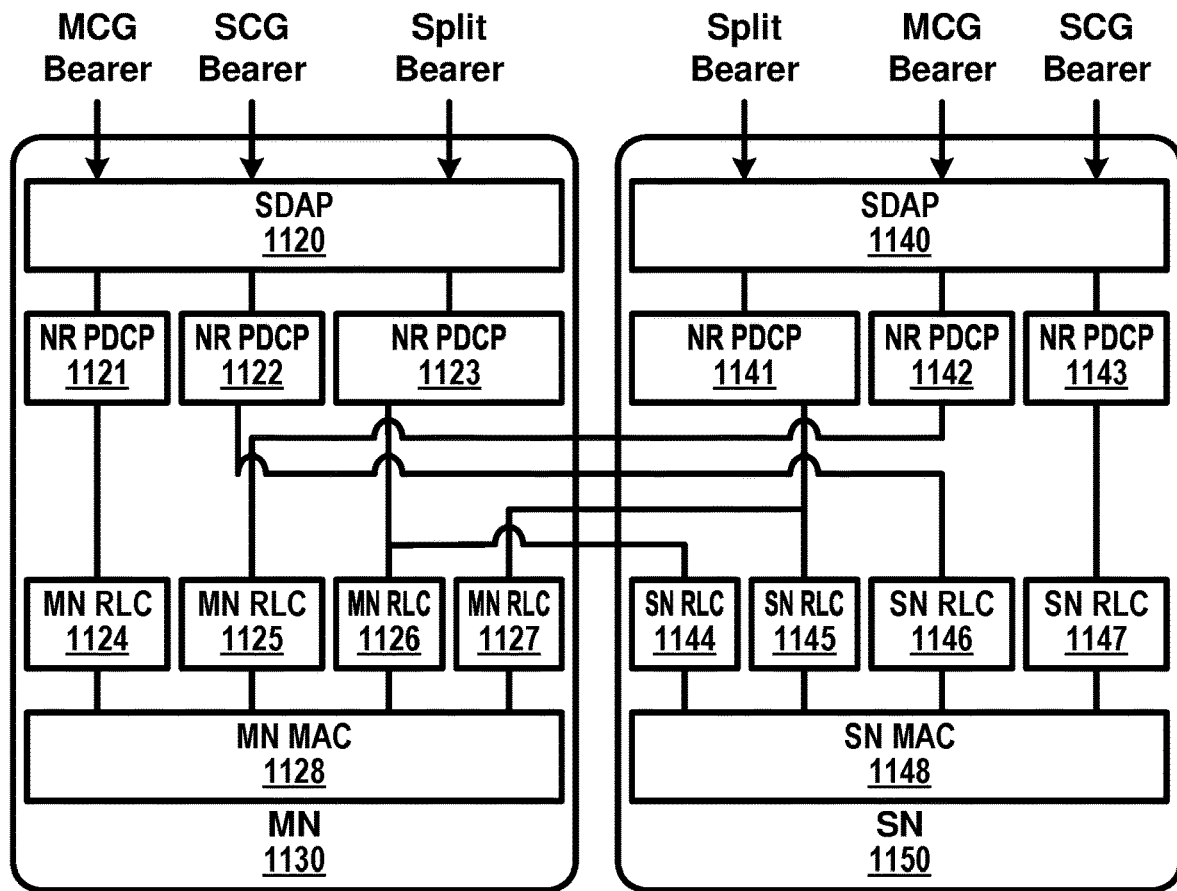

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations.

Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
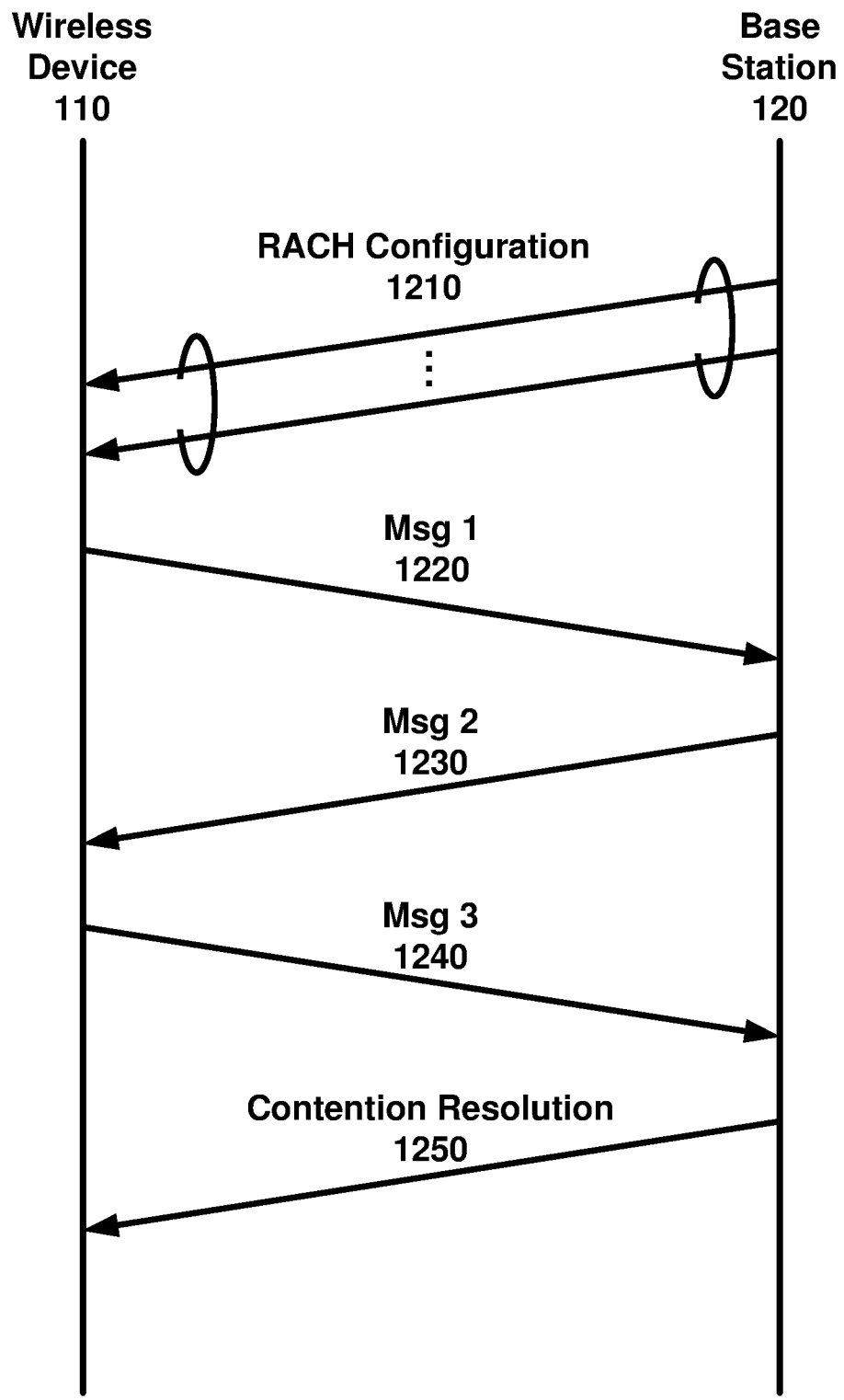
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response (s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-Response Window) to monitor a random access response. For beam failure recovery request, a base station may configure a UE with a different time window (e.g., bfr-ResponseWindow) to monitor response on beam failure recovery request. For example, a UE may start a time window (e.g., ra-ResponseWindow or bfr-Response Window) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
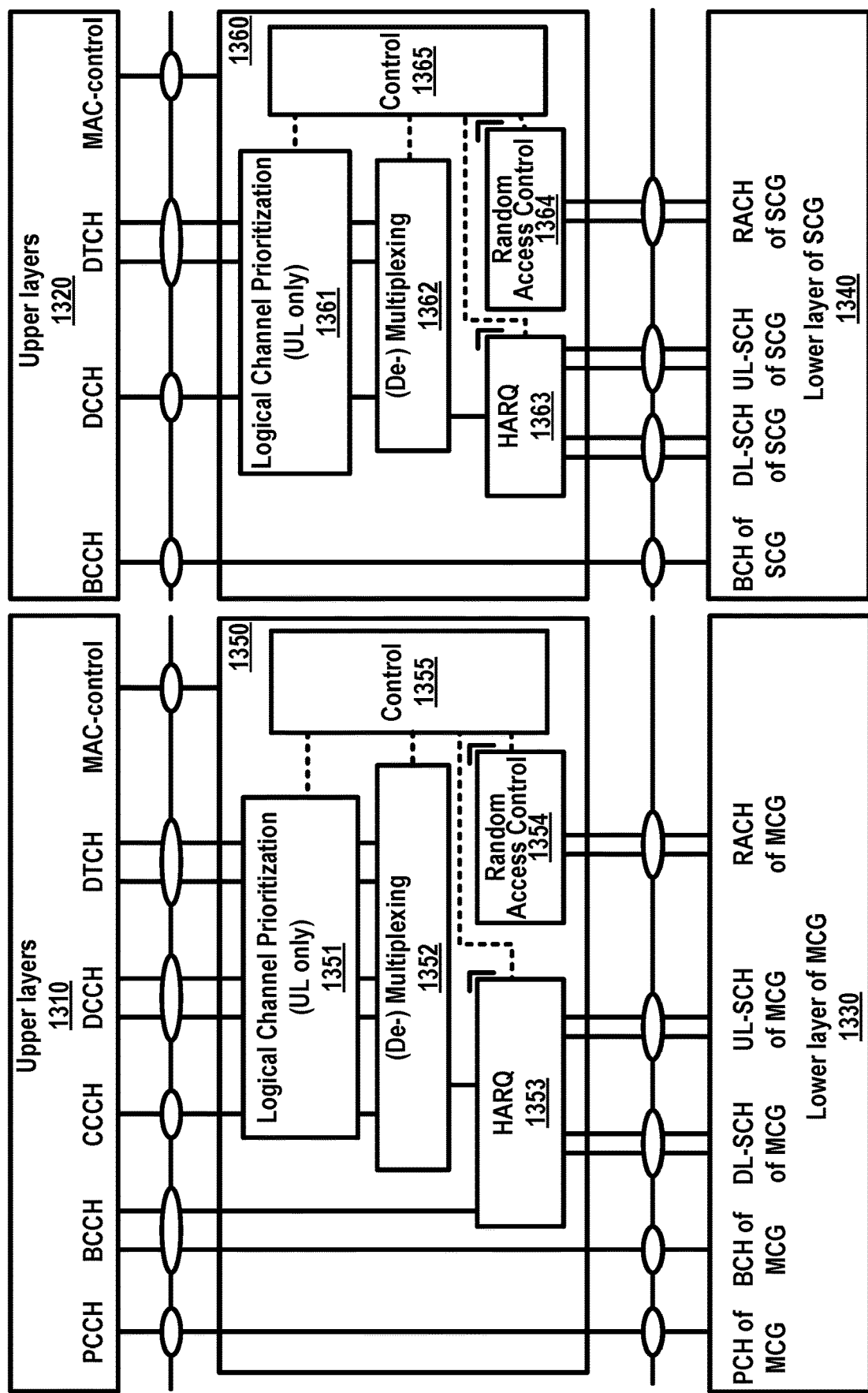
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
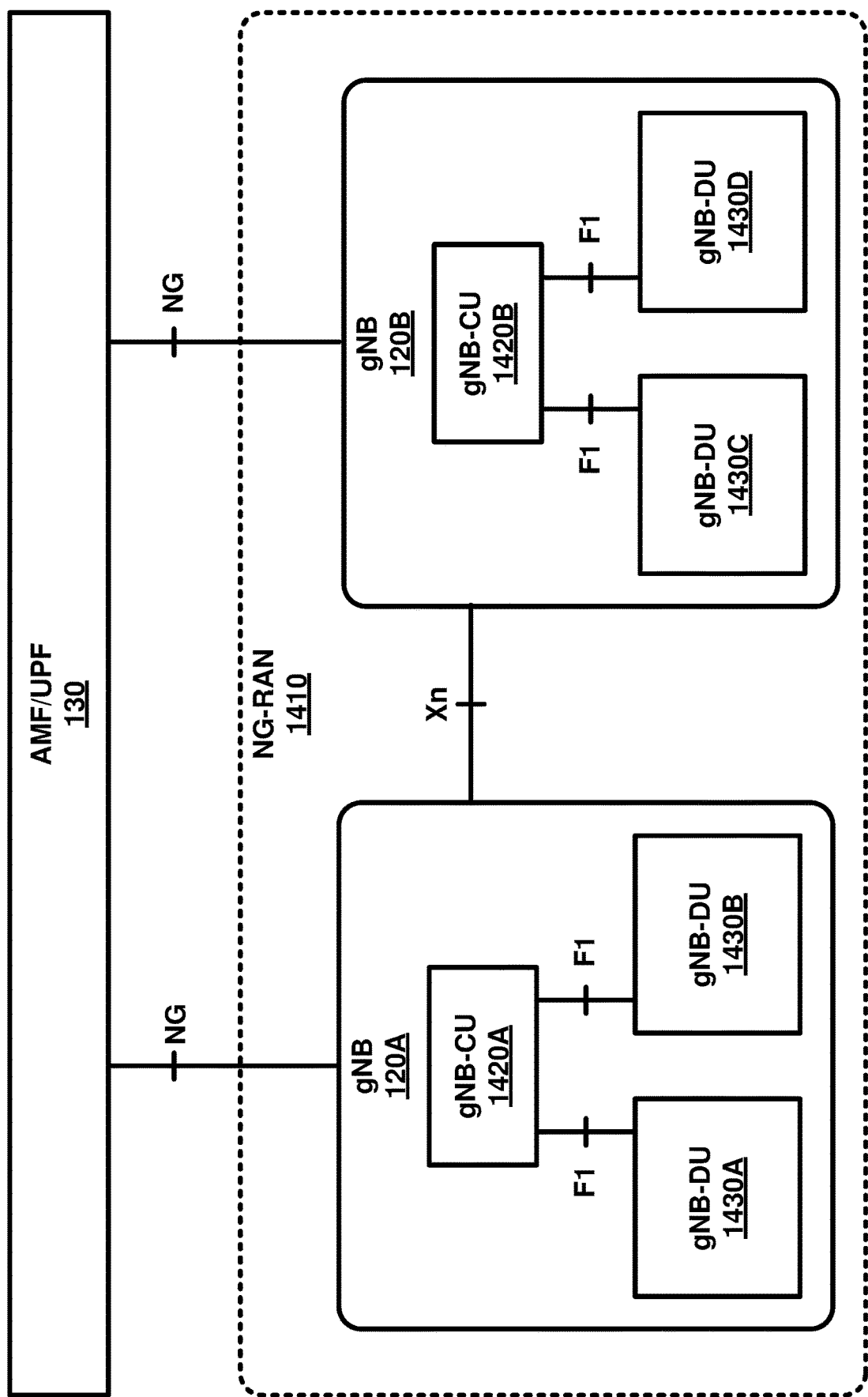
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. gNB 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
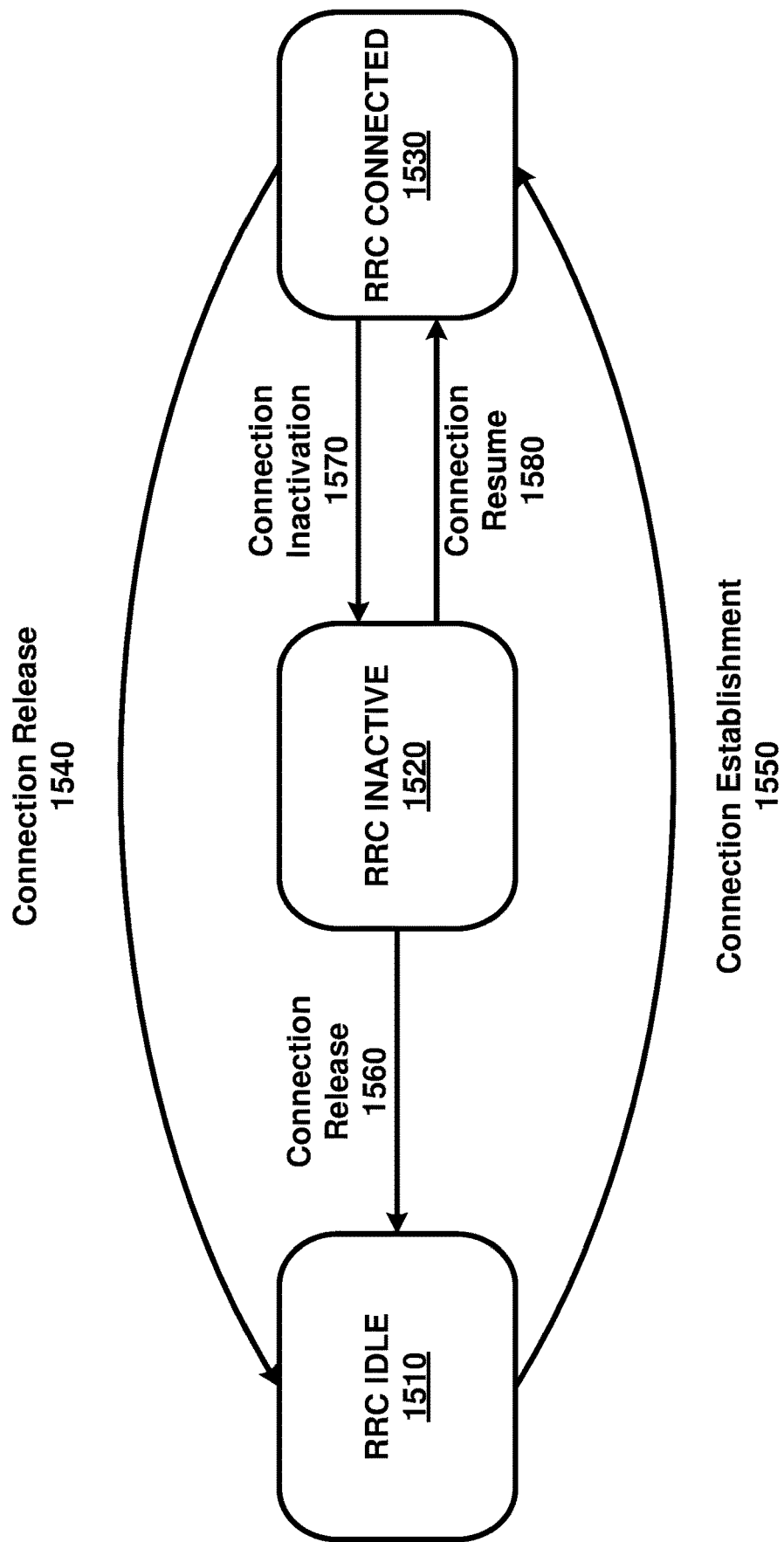
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

Random access (RA) procedures may be used to establish communications between a wireless device and a base station in a cell. Prior to initiation of a RA procedure, a base station may transmit one or more RRC messages to configure the wireless device with one or more parameters of RACH configuration. The base station may broadcast or multicast the one or more RRC messages to one or more wireless devices. The one or more RRC messages may be wireless device-specific messages, e.g., dedicated RRC messages transmitted to a wireless device in RRC INACTIVE 1520 or RRC CONNECTED 1530. The one or more RRC messages may comprise one or more parameters required for transmitting at least one preamble via one or more random access resources. For example, the one or more parameters may indicate at least one of the following: PRACH resource allocation, preamble format, SSB information (e.g., total number of SSBs, downlink resource allocation of SSB transmission, transmission power of SSB transmission, and/or other information), and/or uplink radio resources for one or more transport block transmissions.

A base station may transmit one or more downlink reference signals. For example, one or more downlink reference signals may comprise one or more discovery reference signals. A wireless device may select a first downlink reference signal among the one or more downlink reference signals. For example, the first downlink reference signal may comprise one or more synchronization signals and a physical broadcast channel (SS/PBCH). For example, the wireless device may adjust a downlink synchronization based on the one or more synchronization signals. For example, the one or more downlink reference signals may comprise one or more channel state information-reference signals (CSI-RS).

One or more RRC messages may further comprise one or more parameters indicating one or more downlink control channels, for example, PDDCH. Each of the one or more downlink control channels may be associated with at least one of the one or more downlink reference signals. For example, the first downlink reference signal may comprise one or more system information (e.g., master information block (MIB) and/or system information block (SIB)). A base station may transmit the one or more system information, for example, on a physical broadcast channel (PBCH), a physical downlink control channel (PDCCH), and/or a physical downlink shared channel (PDSCH).

One or more system information may comprise at least one information element (e.g., PDCCH-Config, PDCCH-ConfigSIB1, PDCCH-ConfigCommon). The at least one information element may be used, for example, to configure a wireless device with, among other things, one or more control parameters. The one or more control parameters may comprise one or more parameters of one or more control resource sets (CORESET). For example, the one or more control parameters may comprise the parameters of a first common CORESET #0 (controlResourceSetZero), and/or a first common CORESET (commonControlResourceSet). The one or more control parameters may further comprise one or more search space sets. For example, the one or more control parameters may comprise the parameters of a first search space for the system information block (searchSpaceSIB1), and/or a first common search space #0 (searchSpaceZero), and/or a first random access search space (ra-SearchSpace), and/or a first paging search space (pagingSearchSpace). For example, the wireless device may use the one or more control parameters to acquire the one or more downlink control channels.

For example, a wireless device may monitor a set of candidates for the one or more downlink control channels in the one or more control resource sets. The one or more control resource sets may be on a first active downlink frequency band, e.g., an active bandwidth part (BWP), on a first activated serving cell. For example, the first activated serving cell may be configured with the one or more control parameters according to the one or more search space sets. For example, the wireless device may decode each of the one or more downlink control channels in the set of candidates for the one or more downlink control channels according to a first format of a first downlink control information (DCI). For example, the set of candidates for the one or more downlink control channels may be defined in terms of the one or more search space sets. For example, the one or more search space sets may be one or more common search space sets (e.g., Type0-PDCCH, Type0A-PDCCH, Type1-PDCCH, Type2-PDCCH, Type3-PDCCH), and/or one or more wireless device-specific search space sets.

For example, a wireless device may monitor a set of candidates for the one or more downlink control channels in a Type0-PDCCH common search space set. For example, a Type0-PDCCH common search space set may be configured by at least one information element, e.g., PDCCH-ConfigSIB1 in a MIB. For example, the Type0-PDCCH common search space set may be configured by one or more search space sets, e.g., a searchSpaceSIB1 in PDCCH-ConfigCommon, or searchSpaceZero in PDCCH-ConfigCommon. For example, the Type0-PDCCH common search space set may be configured for a first format of a first downlink control information scrambled by a first radio network temporary identifier, e.g., a system information-radio network temporary identifier (SI-RNTI).

For example, a wireless device may monitor a set of candidates for one or more downlink control channels in a Type1-PDCCH common search space set. For example, the Type1-PDCCH common search space set may be configured by one or more search space sets, e.g., a ra-searchSpace in a PDCCH-ConfigCommon. For example, the Type1-PDCCH common search space set may be configured for a second format of a second downlink control information scrambled by a second radio network temporary identifier, e.g., a random access-radio network temporary identifier (RA-RNTI), or a temporary cell-radio network temporary identifier (TC-RNTI).

A wireless device may determine, for example during a cell search, that a first control resource set for a first common search space (e.g., Type0-PDCCH) is present. The first control resource set may comprise one or more resource blocks and one or more symbols. One or more RRC messages may comprise one or more parameters indicating one or more monitoring occasions of the one or more downlink control channels. For example, the wireless device may determine a number of consecutive resource blocks and a number of consecutive symbols for the first control resource set of the first common search space. For example, one or more bits (e.g., a four most significant bits) of the at least one information element (e.g., PDCCH-ConfigSIB1) may indicate the number of consecutive resource blocks and the number of consecutive symbols. For example, the wireless device may determine the one or more monitoring occasions of the one or more downlink control channels from one or more bits (e.g., a four least significant bits) of the at least one information element (e.g., PDCCH-ConfigSIB1). For example, the one or more monitoring occasions of the one or more downlink control channels associated with the first downlink reference signal may be determined based on one or more system frame numbers and one or more slot indexes of the first control resource set. For example, the first downlink reference signal with a first index may overlap in time with the first frame number and the first slot index.

A wireless device may determine a first downlink channel among the one or more downlink control channels, based on a first downlink reference signal. For example, the first downlink channel may be a first downlink control channel, or a first system information block (e.g., SIB1). The wireless device may assume that a demodulation reference signal antenna port associated with a reception of the first downlink channel is quasi co-located (QCL) with the first downlink reference signal. For example, the demodulation reference signal antenna port associated with the reception of the first downlink channel and the first downlink reference signal (e.g., the corresponding SS/PBCH block) may be quasi co-located with respect to at least one of the following: an average gain, QCL-TypeA, and/or QCL-TypeD.

A physical layer of the wireless device may receive from higher layers, among other information, one or more SS/PBCH block indexes. For example, the physical layer may receive one or more configuration parameters of one or more physical random access channel (PRACH) transmission parameters (e.g., the one or more PRACH transmission parameters may indicate PRACH preamble format, preamble index, a corresponding RA-RNTI, time resources, and/or frequency resources for PRACH transmission), and/or parameters for determining one or more sequences and their shifts in the PRACH preamble sequence set (e.g., set type). The physical layer may provide to higher layers one or more corresponding sets of reference signal received power (RSRP) measurements.

A random access procedure may comprise one or more transmissions of a random access preamble (e.g., Msg1) in one or more PRACH occasions. The random access procedure may further comprise one or more transmissions of one or more random access response (RAR) messages, for example, with one or more physical downlink channels (e.g., Msg2). The random access procedure may further comprise one or more Msg3 in one or more physical uplink channels (e.g., PUSCH), and one or more physical downlink channels (PDSCH) for contention resolution. The random access procedure may be triggered upon request of one or more PRACH transmissions, for example, by higher layers or by one or more control orders (e.g., PDCCH order).

A MAC entity of the wireless device may select one or more random access resources for a random access procedure initiated. The MAC entity may select a first downlink reference signal. For example, the MAC entity may select the first downlink reference signal (e.g., a first SS/PBCH block (SSB), or a first channel state information-reference signal (CSI-RS)) with the first reference signal received power (RSRP) above a first reference signal received power threshold. For example, the first reference signal received power threshold may be defined per a type of reference signal (e.g., rsrp-ThresholdSSB may for a SSB, and rsrp-ThresholdCSI-RS for a CSI-RS). The first reference signal received power threshold may be broadcast, semi-statically configured, and/or predefined. For example, the MAC entity may select the first downlink reference signal for contention-free random access procedure, for example for beam failure recovery, or system information request. For example, the MAC entity may select the first downlink reference signal for contention-based random access procedure.

A wireless device may select one or more random access resources. The one or more random access resources may, for example, comprise one or more random access preambles, one or more time resources, and/or one or more frequency resources for PRACH transmission. The one or more random access resources may be predefined. The one or more random access resources may be provided by one or more RRC messages. The one or more random access resources may be provided by one or more downlink control orders (e.g., PDCCH order). The one or more random access resources may be determined based on the first downlink reference signal. For example, the wireless device may set a first preamble index to a parameter (e.g., ra-PreambleIndex) corresponding to the first downlink reference signal.

A wireless device may transmit at least one random access preamble in one or more random access resources. For example, the wireless device may transmit a first preamble with a first preamble index. The first preamble may be transmitted using a first PRACH format with a first transmission power on one or more PRACH resources. The one or more PRACH resources may comprise one or more PRACH occasions.

One or more RRC messages may comprise one or more random access parameters. For example, a cell specific random access configuration message (e.g., RACH-Config-Common and/or RACH-ConfigGeneric) may comprise, among other parameters, at least one of following: a total number of random access preambles (e.g., totalNumberOfRA-Preambles), one or more PRACH configuration index (e.g., prach-ConfigurationIndex), a number of PRACH occasions that may be multiplexed in frequency domain (FDMed) in a time instance (e.g., msg1-FDM), an offset of a lowest PRACH occasion in frequency domain with respect to a first resource block (e.g., msg1-FrequencyStart), a power ramping step for PRACH (e.g., powerRampingStep), a target power level at the network receiver side (preambleReceivedTargetPower), a maximum number of random access preamble transmission that may be performed (e.g., preambleTransMax), a window length for a random access response (i.e., RAR, e.g., Msg2) (e.g., ra-ResponseWindow), a number of SSBs per random access channel (RACH) occasion and a number of contention-based preambles per SSB (e.g., ssb-perRACH-OccasionAndCB-PreamblesPerSSB). For example, the total number of random access preambles may be a multiple of the number of SSBs per RACH occasion. For example, the window length for RAR may be in number of slots. For example, a dedicated random access configuration message (e.g., RACH-ConfigDedicated) may comprise, among other parameters, one or more RACH occasions for contention-free random access (e.g., occasions), and one or more PRACH mask index for random access resource selection (e.g., ra-ssb-OccasionMaskIndex).

One or more random access parameters (e.g., ssb-perRACH-OccasionAndCB-PreamblesPerSSB) may provide a wireless device with a first number (e.g., N) of one or more downlink reference signals (e.g., SS/PBCH blocks) that may be associated with a first PRACH occasion. The one or more random access parameters (e.g., ssb-perRACH-OccasionAndCB-PreamblesPerSSB) may provide the wireless device with a second number (e.g., R) of the one or more random access preambles for a first downlink reference signal and for a first PRACH occasion. The one or more random access preambles may be contention based preambles. The first downlink reference signal may be a first SS/PBCH block. For example, according to the first number (e.g., if N<1), the first SS/PBCH block may be mapped to at least one (e.g., 1/N) consecutive valid PRACH occasions. For example, according to the second number (e.g., R), at least one preamble with consecutive indexes associated with the first SS/PBCH block may start from the first preamble index for the first valid PRACH occasion.

For example, one or more PRACH configuration indexes (e.g., prach-ConfigurationIndex), may indicate, among other things, a preamble format, a periodicity for one or more PRACH time resources, one or more PRACH subframe numbers, a number of PRACH slots within the one or more PRACH subframes, a PRACH starting symbol number, and a number of time domain PRACH occasions within first PRACH slot.

One or more random access parameters may further comprise an association period for mapping one or more SS/PBCH blocks to one or more PRACH occasions. For example, one or more SS/PBCH block indexes may be mapped to the one or more PRACH occasions based on an order. For example, the order may be as follows: In increasing order of indexes of at least one preamble in a first PRACH occasion. In increasing order of indexes of one or more frequency resources (e.g., for frequency multiplexed PRACH occasions). In increasing order of indexes of one or more time resources (e.g., for time multiplexed PRACH occasions) in the first PRACH slot. In increasing order of indexes for one or more PRACH slots.

A base station may trigger a PRACH transmission by transmitting one or more control orders (e.g., PDCCH order). One or more PRACH mask indexes (e.g., ra-ssb-OccasionMaskIndex) may indicate one or more PRACH occasions. The one or more PRACH occasions may be associated with a first SS/PBCH block index indicated by the one or more control orders. The one or more PRACH occasions may be mapped (e.g., consecutively) for the first SS/PBCH block index. The wireless device may select a first PRACH occasion indicated by a first PRACH mask index value for the first SS/PBCH block index in the first association period. The first association period may be a first mapping cycle. The wireless device may reset the one or more indexes of the one or more PRACH occasions for the first mapping cycle.

A wireless device may determine a first PRACH occasion for transmitting a first preamble. The wireless device may determine a random access-radio network temporary identifier (e.g., RA-RNTI) associated with the first PRACH occasion. The a random access-radio network temporary identifier may be, among other things, a function of at least one of PRACH symbol, and a slot index of a PRACH occasion in a system frame, and a frequency index of the PRACH occasion in frequency domain, and an uplink carrier index. For example, the random access-radio network temporary identifier may be computed as: RA-RNTI=1+ s_id+14×t_id+14×80×f_id+14×80×8×ul_carrier_id. For example, s_id may be a PRACH starting symbol, t_id may be an index of a first slot of a first PRACH occasion I a system frame, f_id may be an index of the first PRACH occasion in frequency domain, and ul_carrier_id may be an uplink carrier index.

A wireless device may determine a parameter indicating a first preamble target power (e.g., PREAMBLE_RECEIVED_TARGET_POWER). The wireless device may transmit a first preamble using a first PRACH occasion, with a first preamble transmission power (e.g., $P_{PRACH,b,f,c}(i)$). The first preamble transmission power may be determined based on the first preamble target power.

In response to a PRACH transmission, a wireless device may receive one or more random access responses (RARs) (e.g., Msg2). The one or more random access responses may be scrambled by a particular radio network temporary identifier (e.g., RA-RNTI). The wireless device may monitor a search space set (e.g., the Type1-PDCCH common search space) for a first downlink control information (e.g., DCI format 1_0). The first downlink control information may comprise the one or more RARs. For example, a base station may transmit the one or more RARs in a form of DCI format 1_0 for a random access procedure initiated by PDCCH order, MAC layer, and/or RRC layer. For example, the DCI format 1_0 may comprise at least one of the following fields: one or more random access preamble index, SS/PBCH index, PRACH mask index, UL/SUL indicator, frequency and time domain resource assignments, modulation and/or coding schemes.

A wireless device may monitor for a first downlink control information (e.g., DCI format 1_0) during a time window. The time window may be indicated by the one or more RRC messages. The time window may start at a first symbol of a first control resource set. The wireless device may be configured by the one or more parameters in the one or more RRC messages to receive the first downlink control information on the first control resource set. The wireless device may determine a length of the time window based on the one or more parameters in the one or more RRC messages (e.g., ra-ResponseWindow). The length of the time window may be in number of slots.

A wireless device may stop a time window after or in response to a reception of one or more random access responses being determined as successful. A reception of the one or more random access responses may be determined as successful, for example, when the one or more random access responses comprise a preamble index (e.g., a random access preamble identity: RAPID) corresponding to a preamble that the wireless device transmits to a base station. For example, the RAPID may be associated with the PRACH transmission. The one or more random access responses may comprise an uplink grant indicating one or more uplink resources granted for the wireless device. The wireless device may transmit one or more transport blocks (e.g., Message 3) via the one or more uplink resources.

In an example, a gNB may transmit a DCI via a PDCCH for at least one of: scheduling assignment/grant; slot format notification; pre-emption indication; and/or power-control commends. More specifically, the DCI may comprise at least one of: identifier of a DCI format; downlink scheduling assignment(s); uplink scheduling grant(s); slot format indicator; pre-emption indication; power-control for PUCCH/PUSCH; and/or power-control for SRS.

In an example, a downlink scheduling assignment DCI may comprise parameters indicating at least one of: identifier of a DCI format; PDSCH resource indication; transport format; HARQ information; control information related to multiple antenna schemes; and/or a command for power control of the PUCCH.

In an example, an uplink scheduling grant DCI may comprise parameters indicating at least one of: identifier of a DCI format; PUSCH resource indication; transport format; HARQ related information; and/or a power control command of the PUSCH.

In an example, different types of control information may correspond to different DCI message sizes. For example, supporting multiple beams and/or spatial multiplexing in the spatial domain and noncontiguous allocation of RBs in the frequency domain may require a larger scheduling message, in comparison with an uplink grant allowing for frequency-contiguous allocation. DCI may be categorized into different DCI formats, where a format corresponds to a certain message size and/or usage.

In an example, a wireless device may monitor one or more PDCCH for detecting one or more DCI with one or more DCI format, in common search space or wireless device-specific search space. In an example, a wireless device may monitor PDCCH with a limited set of DCI format, to save power consumption. The more DCI format to be detected, the more power be consumed at the wireless device.

In an example, the information in the DCI formats for downlink scheduling may comprise at least one of: identifier of a DCI format; carrier indicator; frequency domain resource assignment; time domain resource assignment; bandwidth part indicator; HARQ process number; one or more MCS; one or more NDI; one or more RV; MIMO related information; Downlink assignment index (DAI); PUCCH resource indicator; PDSCH-to-HARQ_feedback timing indicator; TPC for PUCCH; SRS request; and padding if necessary. In an example, the MIMO related information may comprise at least one of: PMI; precoding information; transport block swap flag; power offset between PDSCH and reference signal; reference-signal scrambling sequence; number of layers; and/or antenna ports for the transmission; and/or Transmission Configuration Indication (TCI).

In an example, the information in the DCI formats used for uplink scheduling may comprise at least one of: an identifier of a DCI format; carrier indicator; bandwidth part indication; resource allocation type; frequency domain resource assignment; time domain resource assignment; MCS; NDI; Phase rotation of the uplink DMRS; precoding information; CSI request; SRS request; Uplink index/DAI; TPC for PUSCH; and/or padding if necessary.

In an example, a gNB may perform CRC scrambling for a DCI, before transmitting the DCI via a PDCCH. The gNB may perform CRC scrambling by binary addition of multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, or TPC-SRS-RNTI) and the CRC bits of the DCI. The wireless device may check the CRC bits of the DCI, when detecting the DCI. The wireless device may receive the DCI when the CRC is scrambled by a sequence of bits that is the same as the at least one wireless device identifier.

In an example, in order to support wide bandwidth operation, a gNB may transmit one or more PDCCH in different control resource sets (coresets). A gNB may transmit one or more RRC message comprising configuration parameters of one or more coresets. A coreset may comprise at least one of: a first OFDM symbol; a number of consecutive OFDM symbols; a set of resource blocks; a CCE-to-REG mapping. In an example, a gNB may transmit a PDCCH in a dedicated coreset for particular purpose, for example, for beam failure recovery confirmation.

In an example, a wireless device may monitor PDCCH for detecting DCI in one or more configured coresets, to reduce the power consumption.

In an example, a DCI format (e.g., DCI format 1_0) may be used for a scheduling of PDSCH in one DL cell. The DCI format for downlink scheduling may comprise CRC bits scrambled by at least one wireless device identifier (e.g., C-RNTI, CS-RNTI, or MCS-C-RNTI). The information in the DCI format for downlink scheduling may comprise at least one of: identifier of a DCI format; frequency domain resource assignment; time domain resource assignment; VRB-to-PRB mapping; modulation and coding scheme; new data indicator; redundancy version; HARQ process number; downlink assignment index; TPC command for scheduled PUCCH; PUCCH resource indicator; and/or PDSCH-to-HARQ_feedback timing indicator.

In an example, a DCI format for downlink scheduling may be for random access procedure initiated by a PDCCH order. For example, the CRC bits of the DCI format for downlink scheduling may be scrambled by a first radio network temporary identifier (e.g., C-RNTI), and the frequency domain resource assignment field may be a first value (e.g., all ones), indicating that the DCI format is for random access procedure. The information in the DCI format may then comprise at least one of: identifier for DCI format; frequency domain resource assignments; random access preamble index; UL/SUL indicator; SS/PBCH index; PRACH mask index; and/or reserved bits. The random access preamble index field may indicate a preamble sequence to be used for the random access procedure. The SS/PBCH index field may indicate the SS/PBCH (SSB) that may be used to determine one or more RACH occasions for the PRACH transmission. The PRACH mask index field may indicate the one or more RACH occasions associated with the SS/PBCH indicated by the SS/PBCH index for PRACH transmission.

A random access procedure may be initiated by a PDCCH order, or by a MAC entity, or by RRC. There may be only one random access procedure ongoing at a time in a MAC entity. The random access procedure on an SCell may only be initiated by the PDCCH order with a first random access preamble index field, wherein the first random access preamble index field may not be all zeros. For example, when a new random access procedure is triggered while another is already ongoing in the MAC entity, it may be up to a wireless device implementation whether to continue with the ongoing procedure or start with the new procedure (e.g. for SI request).

A wireless device may receive one or more RRC messages for a random access procedure comprising at least one of parameters: PRACH configuration index (prach-ConfigurationIndex; one or more PRACH occasions for a transmission of a random access preamble); initial random access preamble power (preambleReceivedTargetPower); a list of one or more reference signals (CSI-RS and/or SSB) identifying one or more candidate beams for recovery and/or the random access parameters (candidateBeamRSList); RSRP threshold for selection of a reference downlink signal (e.g., SSB, and/or CSI-RS); a search space identity for monitoring a response of a beam failure recovery request; a power-ramping factor (powerRampingStep); a scaling factor for a prioritized random access procedure (scalingFactorBI); a random access preamble (ra-PreambleIndex); an association between the one or more PRACH occasions and the reference signal (CSI-RS and/or SSB: ra-ssb-OccasionMaskIndex/ra-OccasionList); a maximum number of random access preamble transmission (reambleTransMax); and/or a first number of SSBs mapped to each one of the one or more PRACH occasions and a second number of contention-based random access preambles mapped to each one of the one or more SSBs (ssb-perRACH-OccasionAndCB-PreamblesPerSSB). At least one of the following wireless device variables may be used for the random access procedure: preamble index (PREAMBLE_INDEX); preamble transmission counter (PREAMBLE_TRANSMISSION_COUNTER); transmission power ramping counter (PREAMBLE_POWER_RAMPING_COUNTER); preamble power ramping step (PREAMBLE_POWER_RAMPING_STEP); preamble received target power (PREAMBLE_RECEIVED_TARGET_POWER); preamble backoff (PREAMBLE_BACKOFF); maximum transmission power (PCMAX); scaling factor for backoff indicator (SCALING_FACTOR_BI); and/or temporary identifier (TC-RNTI).

In an example, a random access procedure may be initiated on a serving cell. A MAC entity of a wireless device may initialize one or more random access parameters. The wireless device may then perform a random access resource selection procedure.

In an example, a random access procedure may be initiated by a PDCCH order. The PDCCH order may comprise a random access preamble index. The wireless device may set the preamble index to the random access preamble index signaled by the PDCCH order. The wireless device may select an SSB signaled by the PDCCH order.

In an example, a contention-free random access procedure may be initiated, wherein a wireless device receives one or more messages comprising parameters of contention-free random access resources. The contention-free random access resources may be associated with one or more reference signals (CSI-RS and/or SSB), wherein at least one reference signal of the one or more reference signals may have RSRP above a threshold. The wireless device may select a reference signal (CSI-RS and/or SSB) amongst the at least one reference signals with RSRP above the threshold. The wireless device may set a preamble index to a random access preamble index corresponding to the reference signal (CSI-RS and/or SSB).

In an example, a contention-based random access procedure may be initiated, wherein a wireless device receives one or more messages comprising parameters of contention-based random access resources. The wireless device may select an SSB from one or more SSBs, wherein the one or more SSBs have RSRP above a threshold, or may select any SSB. The wireless device may select a random access preamble, for example randomly with equal probability, from one or more random access preambles associated with the SSB.

A wireless device may determine a first PRACH occasion from one or more PRACH occasions corresponding to a first SSB or a first CSI-RS. For example, the first SSB may be quasi-colocated with the first CSI-RS. For example, the one or more PRACH occasions may be configured by RRC messages comprising parameters indicating an association between the one or more PRACH occasions and the first SSB or the first CSI-RS. For example, the one or more random access occasions may be indicated by PDCCH. A MAC entity of the wireless device may select a PRACH occasion, for example randomly with equal probability, amongst one or more consecutive PRACH occasions corresponding to the first SSB or the first CSI-RS. The MAC entity may consider a possible occurrence of measurement gaps when determining the first PRACH occasion from the one or more PRACH occasions corresponding to the first SSB or the first CSI-RS. The wireless device may then perform a random access preamble transmission procedure.

A MAC entity of a wireless device may perform a random access preamble transmission procedure for each one of one or more random access preambles. The MAC entity may increment a preamble power ramping counter (PREAMBLE_POWER_RAMPING_COUNTER) by one. The MAC entity may select a delta preamble value (DELTA_PREAMBLE) for a power offset. The MAC entity may set a preamble received target power (PREAMBLE_RECEIVED_TARGET_POWER) to preambleReceivedTargetPower+DELTA_PREAMBLE+(PREAMBLE_POWER_RAMPING_COUNTER−1)× PREAMBLE_POWER_RAMPING_STEP, wherein the parameters of preamble transmission power are configured as described above. The wireless device may determine a random access radio network temporary identifier (RA-RNTI) associated with a first PRACH occasion in which the random access preamble is transmitted. The RA-RNTI associated with the first PRACH occasion in which the random access preamble is transmitted is computed as: RA-RNTI=1+s_id+14×t_id+14×80×f_id+14×80×8×ul_carrier_id, where s_id is an index of a first OFDM symbol of the first PRACH occasion ($0 \leq s\_id \leq 14$), t_id is an index of a first slot of the first PRACH occasion in a system frame ($0 \leq t\_id \leq 80$), f_id is an index of the first PRACH occasion in the frequency domain ($0 \leq f\_id \leq 8$), and ul_carrier_id is an UL carrier used for Random Access Preamble transmission (0 for NUL carrier, and 1 for SUL carrier). The MAC entity may instruct the physical layer to transmit the random access preamble via the first PRACH occasion, corresponding RA-RNTI, preamble index (PREAMBLE_INDEX), and PREAMBLE_RECEIVED_TARGET_POWER. Once a random access preamble is transmitted, a MAC entity may start a random access response window (ra-ResponseWindow) configured by RRC at a first PDCCH occasion. The MAC entity may monitor the PDCCH for random access response(s) (RAR) identified by the corresponding RA-RNTI, for example, while the random access response window is running. The MAC entity may receive a downlink assignment (the RAR message) on the PDCCH for the RA-RNTI and may successfully decode the received TB. The random access response (RAR message) may comprise a MAC subPDU with a random access preamble identifier corresponding to the preamble index (PREAMBLE_INDEX), and may consider the RAR reception successful. The RAR message may comprise a timing advance command. The MAC entity may process the timing advance command and may consider the random access procedure successfully completed, for example, for a contention-free random access procedure. For a contention-based random access procedure, the RAR message may comprise an UL grant, and the MAC entity may proceed with transmission of Msg3 for contention resolution.

Figure 16:
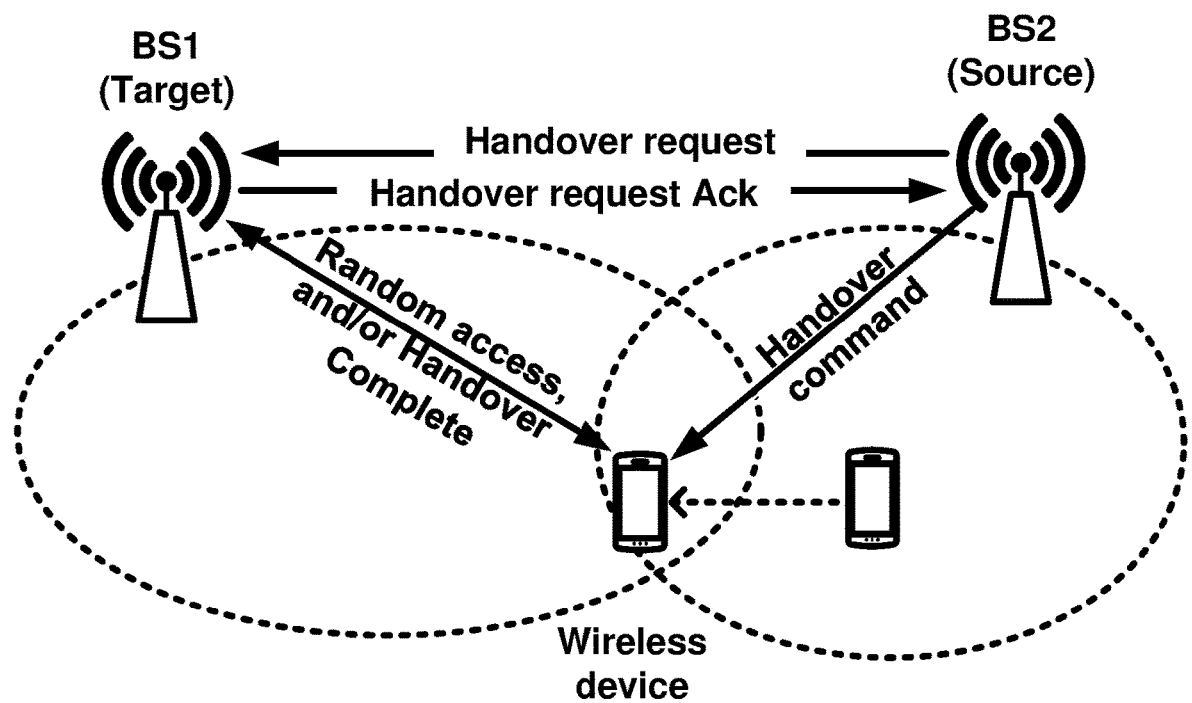
FIG. 16 is a diagram of example handover procedure as per an aspect of an embodiment of the present disclosure.

In RRC_CONNECTED state, the network may control wireless device mobility. For example, the network may decide when the wireless device connects to which cell(s) (e.g., E-UTRA cell(s), and/or NR cell(s), and/or inter-RAT cell(s)). Cell level mobility may require explicit RRC signaling to be triggered, e.g., handover. For network controlled mobility in cell level in RRC_CONNECTED, the PCell may be changed using an RRC Connection Reconfiguration message. The SCell(s) may be changed using the RRC Connection Reconfiguration message. For inter-BS handover, as shown in FIG. 16, the signaling procedure may comprise at least one of the following: Handover Request; Handover Request Acknowledgement; Handover Command; Random Access and Handover Complete. A source base station (BS) may initiate handover and send, to a target BS, a Handover Request over a network interface (e.g., Xn and/or X2). The target BS may perform an admission control and provide a RRC configuration as part of the Handover Acknowledgement. The source BS may provide the RRC configuration to the wireless device in the Handover Command. The handover command message may comprise cell ID and all information required to access the target cell. The wireless device may access the target cell and may not need to read the system information of the target cell. For example, the information required for contention-based and contention-free random access can be included in the Handover Command message. The access information to the target cell may comprise beam specific information, if any. The wireless device may move the RRC connection to the target BS via initiating a random access procedure. The wireless device may reply the Handover Complete message to the target BS. The wireless deice may also send user data if a grant is available.

The radio access network handover may perform the preparation and execution phase of the handover procedure without involvement of the core network, e.g., preparation messages may be directly exchanged between BSs. The target BS may trigger the release of the resources at the source BS during the handover completion phase.

The network may trigger the handover procedure, e.g., based on radio conditions, load, QoS, wireless device category/capability, and/or the like. To facilitate this, the network may configure the wireless device to perform measurement reporting (possibly including the configuration of measurement gaps). The network may also initiate handover blindly, for example, without having received measurement reports from the wireless device.

Before sending the handover message to the wireless device, the source BS may prepare one or more target cells. The source BS may select the target PCell. The source BS may also provide the target BS with a list of best cells on each frequency for which measurement information is available, for example, in order of decreasing RSRP. The source BS may also include available measurement information for the cells provided in the list. The target BS may decide which SCells are configured for use after handover, which may include cells other than the ones indicated by the source BS.

According to some of the various aspects of embodiments, the target BS may generate a message used to configure the wireless device for the handover. For example, the message may include the access stratum configuration to be used in the target cell(s). The source BS may transparently (for example, does not alter values/content) forward the handover message/information received from the target BS to the wireless device. When appropriate, the source BS may initiate data forwarding for (a subset of) the dedicated radio bearers. After receiving the handover message, the wireless device may attempt to access the target PCell at the available RACH occasion according to a random access resource selection. When allocating a dedicated preamble for the random access in the target PCell, the network (e.g., NR and/or E-UTRA) may ensure the preamble is available from the first RACH occasion the wireless device may use. Upon successful completion of the handover, the wireless device may send a message used to confirm the handover to the target BS.

According to some of the various aspects of embodiments, if the target BS does not support the release of RRC protocol which the source BS used to configure the wireless device, the target BS may be unable to comprehend the wireless device configuration provided by the source BS. In this case, the target BS may use the full configuration option to reconfigure the wireless device for handover and re-establishment. Full configuration option includes an initialization of the radio configuration, which makes the procedure independent of the configuration used in the source cell(s) with the exception that the security algorithms are continued for the RRC re-establishment.

According to some of the various aspects of embodiments, the handover mechanism triggered by RRC may require the wireless device to reset the MAC entity and re-establish RLC. RRC managed handovers with and without PDCP entity re-establishment may both be supported. After the successful completion of handover, PDCP SDUs may be re-transmitted in the target cell(s). This may apply for dedicated radio bearers using RLC-AM mode and/or for handovers not involving full configuration option. For DRBs using RLC AM mode, PDCP may either be re-established together with a security key change or initiate a data recovery procedure without a key change. For DRBs using RLC UM mode and for SRBs, PDCP may either be re-established together with a security key change or remain as it is without a key change. Data forwarding, in-sequence delivery and duplication avoidance at handover may be guaranteed when the target BS uses the same DRB configuration as the source BS. After the successful completion of handover not involving full configuration option, the SN (sequence number) and/or the HFN (hyper frame number) may be reset for some radio bearers. For the dedicated radio bearers using RLC-AM mode both SN and HFN may continue. For reconfigurations involving the full configuration option, the PDCP entities may be newly established (SN and HFN may not continue) for dedicated radio bearers irrespective of the RLC mode. The wireless device behavior to be performed upon handover may be the same regardless of the handover procedures used within the network (e.g. whether the handover includes X2/Xn or N2/S1 signaling procedures).

The network may support timer based handover failure procedure. RRC connection re-establishment procedure may be used for recovering from handover failure. The source BS may, for some time, maintain a context to enable the wireless device to return in case of handover failure. After having detected handover failure, the wireless device may attempt to resume the RRC connection either in the source PCell or in another cell using the RRC re-establishment procedure. This connection resumption may succeed if the accessed cell is prepared. For example, when the access cell is a cell of the source BS or of another BS towards which handover preparation has been performed. The cell in which the re-establishment procedure succeeds becomes the PCell while SCells, if configured, may be released.

Normal measurement and mobility procedures may be used to support handover to cells broadcasting a CSG (closed subscriber group) identity. In addition, a network (e.g., E-UTRAN/NR) may configure the wireless device to report that it is entering or leaving the proximity of cell(s) included in its CSG whitelist. a network (e.g., E-UTRAN/NR) may request the wireless device to provide additional information broadcast by the handover candidate cell e.g. cell global identity, CSG identity, CSG membership status. A network (e.g., E-UTRAN/NR) may use the proximity report to configure measurements as well as to decide whether or not to request additional information broadcast by the handover candidate cell. The additional information may be used to verify whether or not the wireless device is authorized to access the target PCell and may also be needed to identify handover candidate cell. This may involve resolving PCI confusion, for example, when the physical layer identity that is included in the measurement report may not uniquely identify the cell.

The purpose of RRC connection reconfiguration procedure may be to modify an RRC connection, e.g. to establish, modify and/or release RBs, to perform handover, to setup, modify, and/or release measurements, to add, modify, and/or release SCells. As part of the procedure, NAS dedicated information may be transferred from a network (e.g., E-UTRAN/NR) to the wireless device. If the received RRC Connection Reconfiguration message includes the sCellToReleaseList, the wireless device performs SCell release. If the received RRC Connection Reconfiguration message includes the sCellToAddModList, the wireless device performs SCell additions or modification.

The wireless device context within the source BS may comprise information regarding roaming/handover/access restrictions which may be provided either at connection establishment or at the last TA (registration/tracking area) update process. The source BS may configure the wireless device measurement procedures employing at least one RRC connection reconfiguration message. The wireless device may be triggered to send at least one measurement report by the rules set by, for example, system information, RRC configuration, and/or the like. The source BS may make a handover decision based on many parameters, for example, the measurement reports, RRM information, traffic and load, a combination of the above, and/or the like. The source BS may initiate the handover procedure by sending a handover request message to one or more potential target BSs. When the source BS sends the handover request message, it may start a handover preparation timer. Upon reception of the handover request acknowledgement message the source BS may stop the handover preparation timer.

In a network interface (e.g. X2/Xn) handover process, the source BS (e.g. eNB/gNB) may transmit a handover request message to one or more potential target BSs to initiate the handover. The handover request message may comprise a transparent RRC container with necessary information to prepare the handover at the target side. In an example embodiment, a handover request message may comprise: a target cell ID, a C-RNTI of the wireless device in the source BS, RRM-configuration including wireless device inactive time, basic AS-configuration including antenna information and DL carrier frequency, the current QoS flow to DRB mapping rules applied to the wireless device, the SIB1 from source BS, the wireless device capabilities for different RATs, and PDU session related information. In an example embodiment, handover request message may further comprise the wireless device reported measurement information including beam-related information if available. After issuing a handover request, the source BS may not reconfigure the wireless device.

In a core network interface (e.g., S1/N2, and/or NG interface that may comprise an NG user-plane part and/or an NG control-plane part) handover process without AMF/MME relocation, the source BS may transmit a handover required message to an AMF/MME for one or more potential target BSs, and the AMF/MME may transmit a handover request message to the potential target BSs. The handover required message and/or the handover request message may pass information to prepare the handover at the target side. In a core network interface (e.g., S1/N2, and/or NG interface) handover process relocating an AMF/MME, a source BS may transmit a handover required message to a source AMF/MME for one or more potential target BSs, the source AMF/MME may transmit a forward relocation request message to one or more potential target AMFs/MMEs serving the potential target BSs, and the potential target AMFs/MMEs may transmit a handover request message to the potential target BSs. The handover required message, the forward relocation request message, and/or the handover request message may pass information to prepare the handover at the target side. During the handover preparation phase, the serving BS may transmit the handover request message to one or more potential target BSs. This information may be employed, at least in part, by the potential target BS, for example, to configure the wireless device after completing the handover.

A target BS may employ admission control in order to properly prepare before the wireless device connects to the target BS. Handover admission control may be performed by the target BS depending on many factors, e.g., QoS required for wireless device bearers, wireless device capabilities, wireless device configuration, target BS load, a combination of the above, and/or the like. The target BS may configure the required resources according to the received information from the serving (source) BS and may reserve a C-RNTI and/or a RACH preamble. The access stratum configuration to be used in the target cell may be specified independently (for example, as an establishment) or as a delta compared to the access stratum-configuration used in the source cell (for example as a reconfiguration). Slice-aware admission control may be performed if the slice information is sent to the target BS. The target BS may reject PDU sessions, for example when the PDU sessions are associated with non-supported slices.

A target BS may prepare handover with L1/L2 and may send the handover request acknowledge message to the source BS. In an X2/Xn handover procedure, the handover request acknowledge message may include a transparent container to be sent to the wireless device as an RRC message to perform the handover. In an S1/N2 handover procedure without MME/AMF relocation, the handover request acknowledge message from the target BS to the MME/AMF and/or the handover command message from the MME/AMF to the source BS may include a transparent container to be sent to the wireless device as an RRC message to perform the handover. In an S1/N2 handover procedure relocating an MME/AMF, the handover request acknowledge message from the target BS to the target MME/AMF, the forward relocation response message from the target MME/AMF to the source MME/AMF, and/or the handover command message from the source MME/AMF to the source BS may include a transparent container to be sent to the wireless device as an RRC message to perform the handover. The container may include a new C-RNTI, target BS security algorithm identifiers for the selected security algorithms, a dedicated RACH preamble, access parameters, SIBs, and/or other configuration parameters. The target BS may generate the RRC message to perform the handover, for example, RRC connection reconfiguration message including the mobility control information. The RRC message may be sent by the source BS towards the wireless device.

The source BS may trigger the wireless device handover by sending an RRC reconfiguration message to the wireless device, comprising the information required to access the target cell, e.g., target cell ID, new C-RNTI, target BS security algorithm identifiers for the selected security algorithms. The RRC reconfiguration message may also comprise at least one of following: a set of dedicated RACH resources, the association between RACH resources and SSB(s), the association between RACH resources and wireless device-specific CSI-RS configuration(s), common RACH resources, and/or system information of the target cell.

The source BS may send SN status transfer message to the target BS. The source BS may perform the necessary integrity protection and ciphering of the message. The wireless device may receive the RRC connection reconfiguration message from the source BS and may start performing the handover. The wireless device may not need to delay the handover execution for delivering the HARQ/ARQ responses to the source BS.

After receiving the RRC connection reconfiguration message that may include the mobility control information, the wireless device may perform synchronization to the target BS and access the target cell via RACH on the primary cell. The wireless device Random access procedure may employ a contention-free procedure if a dedicated RACH preamble was indicated in the RRC connection reconfiguration message. The wireless device random access procedure may employ a contention-based procedure if no dedicated preamble was indicated. The wireless device may derive target BS specific keys and may configure the selected security algorithms to be used in the target cell. The target BS may respond with uplink allocation and timing advance.

After the wireless device has successfully accessed the target cell, the wireless device may complete the RRC handover procedure by sending an RRC connection reconfiguration complete message (C-RNTI) to the target BS to confirm the handover and to indicate that the handover procedure is completed for the wireless device. The wireless device may transmit a MAC uplink Buffer Status Report (BSR) Control Element (CE) along with the uplink RRC Connection Reconfiguration Complete message or may transmit a MAC uplink BSR CE whenever possible to the target BS. The target BS may verify the C-RNTI sent in the RRC Connection Reconfiguration Complete message. The target BS may now begin sending data to the wireless device and receiving data from the wireless device.

The target BS may send a path switch request message to AMF/MME to trigger the core network (e.g., 5GC) to switch the DL data path towards the target BS and to establish an interface (e.g., NG-C interface) towards the target BS. The core network may switch the DL data path towards the target BS. The UPF may send one or more end marker packets on the old path to the source BS per PDU session/tunnel and then may release any U-plane/TNL resources towards the source BS. The AMF/MME may confirm the path switch request message with a path switch request acknowledgement message. Upon reception of the path switch request acknowledgment message from the AMF/MME, the target BS may send the wireless device context release to inform the source BS about the success of the handover. The source BS may then release radio and C-plane related resources associated to the wireless device context. Any ongoing data forwarding may continue.

The RRM configuration may include both beam measurement information (for layer 3 mobility) associated to SSB(s) and CSI-RS(s) for the reported cell(s) if both types of measurements are available. Also, if CA is configured, the RRM configuration may comprise the list of best cells on each frequency for which measurement information is available. And the RRM measurement information may also comprise the beam measurement for the listed cells that belong to the target BS.

The common RACH configuration for beams in the target cell may only be associated to the SSB(s). The network may have dedicated RACH configurations associated to the SSB(s) and/or have dedicated RACH configurations associated to CSI-RS(s) within a cell. The target BS may only include one of the following RACH configurations in the Handover Command to enable the wireless device to access the target cell: common RACH configuration; Common RACH configuration+Dedicated RACH configuration associated with SSB; Common RACH configuration+Dedicated RACH configuration associated with CSI-RS. The dedicated RACH configuration allocates RACH resource(s) together with a quality threshold to use them. When dedicated RACH resources are provided, they are prioritized by the wireless device and the wireless device may not switch to contention-based RACH resources as long as the quality threshold of those dedicated resources is met. The order to access the dedicated RACH resources may be up to wireless device implementation.

Figure 17:
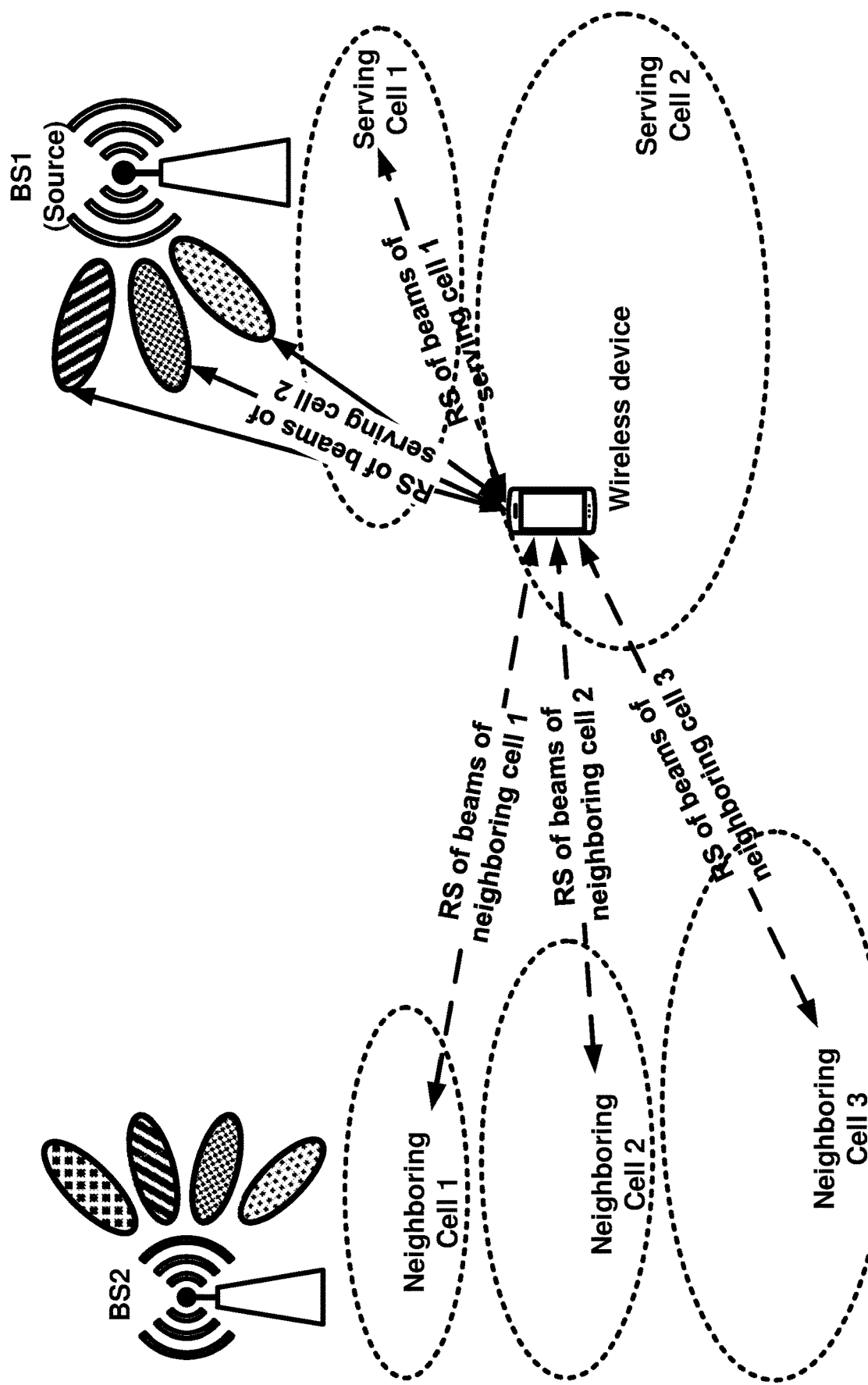
FIG. 17 is a diagram of example cell and/or beam measurements as per an aspect of an embodiment of the present disclosure.

As shown in FIG. 17, the wireless device may measure at least one beam of a cell (e.g., serving cell and/or neighboring non-serving cell(s)). The measurement results (e.g., RSRP values) may be averaged to derive the cell quality. The wireless device may be configured to consider a subset of the detected beams. The wireless device may perform filtering at two different levels: at the physical layer to derive beam quality and then at RRC level to derive cell quality from the at least on beam. Cell quality from beam measurements is derived in the same way for the serving cell(s) and for the non-serving cell(s). Measurement reports may contain the measurement results of the X best beams if the wireless device is configured to do so by the BS.

Figure 18:
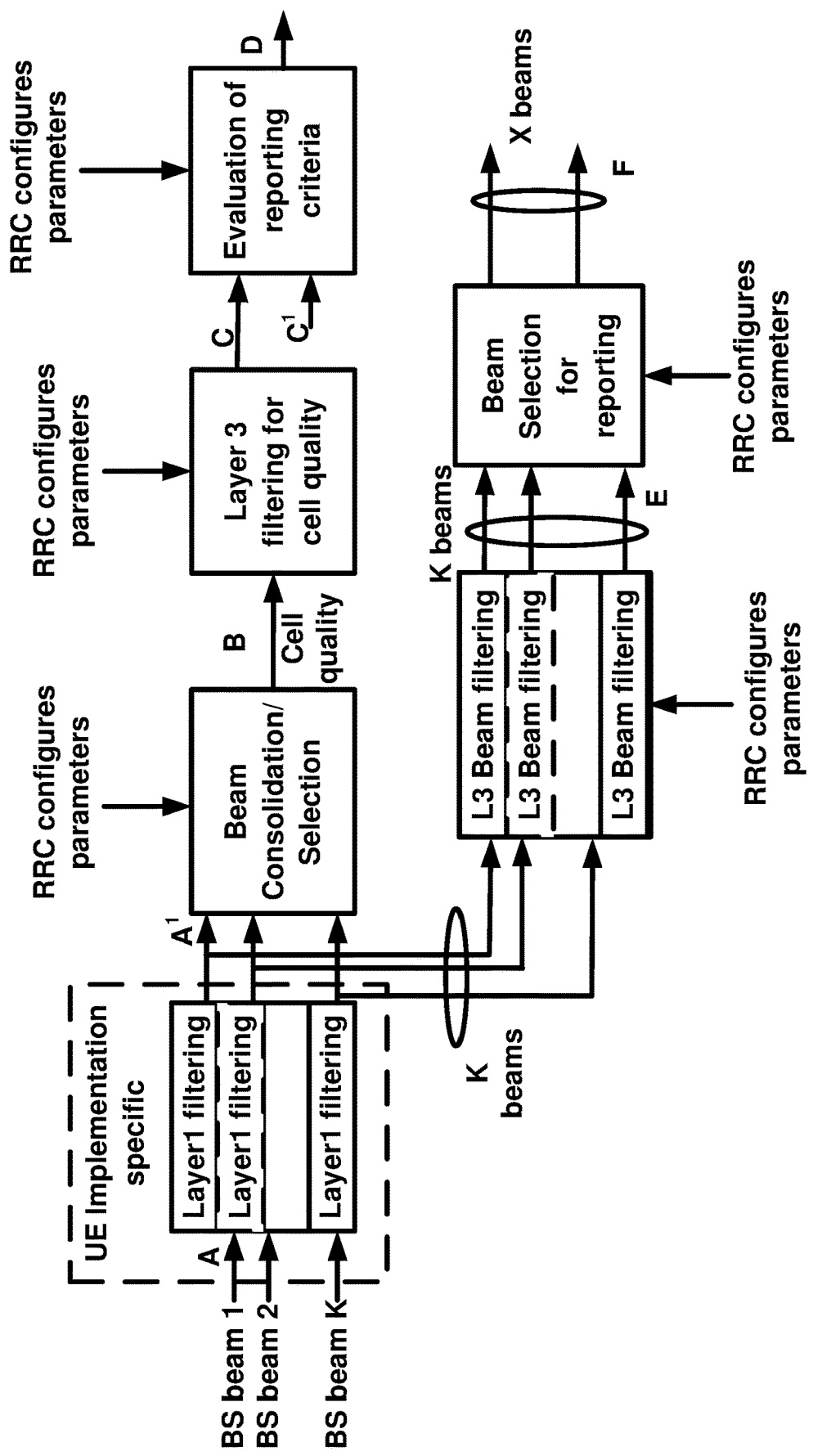
FIG. 18 is a diagram of example beam-based measurement model as per an aspect of an embodiment of the present disclosure.

FIG. 18 demonstrates a high-level measurement model. K beams may correspond to the measurements on SSB and/or CSI-RS resources configured for L3 mobility by BS and detected by the wireless device at L1. As shown in FIG. 18, at point A measurements (e.g., beam specific samples) may inter to the physical layer. The inputs measures at point A may inter layer 1 filtering. The exact filtering may be implementation dependent. Measurements (e.g., beam specific measurements) may be reported by layer 1 to layer 3 after layer 1 filtering at point $A^1$. beam specific measurements may be consolidated to derive cell quality. The behavior of the Beam consolidation/selection may be standardized and the configuration of this module is provided by RRC signaling. Reporting period at B may equal one measurement period at A1. A measurement (e.g. cell quality) derived from beam-specific measurements may be reported to layer 3 after beam consolidation/selection at point B. Filtering may be performed on the measurements provided at point B. The behavior of the Layer 3 filters may be standardized and the configuration of the layer 3 filters may be provided by RRC signaling. Filtering reporting period at C may equal one measurement period at B. A measurement after processing in the layer 3 filter is at point C. The reporting rate is identical to the reporting rate at point B. This measurement may be used as input for one or more evaluation of reporting criteria. The one or more evaluation of reporting criteria may check whether actual measurement reporting is necessary at point D. The evaluation may be based on more than one flow of measurements at reference point C, e.g. to compare between different measurements. This is illustrated by input C and C1. The wireless device may evaluate the reporting criteria at least every time a new measurement result is reported at point C, C1. The reporting criteria may be standardized and the configuration is provided by RRC signaling (wireless device measurements). Measurement report information (message) may be sent on the radio interface at point D. Filtering performed on the measurements (e.g., beam specific measurements) may be provided at point A1. The behavior of the beam filters may be standardized and the configuration of the beam filters may be provided by RRC signaling. Filtering reporting period at E may equal one measurement period at A1. A measurement (e.g. beam-specific measurement) after processing in the beam filter is at point E. The reporting rate may be identical to the reporting rate at point A1. This measurement may be used as input for selecting the X measurements to be reported. Beam Selection for beam reporting may select the X measurements from the measurements provided at point E. The behavior of the beam selection may be standardized and the configuration of this module may be provided by RRC signaling. Beam measurement information may be included in measurement report (sent) on the radio interface at point F.

Layer 1 filtering may introduce a certain level of measurement averaging. How and when the wireless device may perform the required measurements may be implementation specific to the point that the output at B fulfils the performance. Layer 3 filtering for cell quality and related parameters used may not introduce any delay in the sample availability between B and C. Measurement at point C, C1 may be the input used in the event evaluation. L3 Beam filtering and related parameters used may not introduce any delay in the sample availability between E and F. Measurement reports may be characterized by the following: Measurement reports may include the measurement identity of the associated measurement configuration that triggered the reporting; Cell and beam measurement quantities to be included in measurement reports may be configured by the network; The number of non-serving cells to be reported may be limited through configuration by the network; Cells belonging to a blacklist configured by the network may not be used in event evaluation and reporting, and conversely when a whitelist is configured by the network, only the cells belonging to the whitelist may be used in event evaluation and reporting; Beam measurements to be included in measurement reports may be configured by the network (beam identifier only, measurement result and beam identifier, or no beam reporting). Intra-frequency neighbor (cell) measurements and inter-frequency neighbor (cell) measurements may be defined as follows: SSB based intra-frequency measurement: a measurement may be defined as an SSB based intra-frequency measurement provided the center frequency of the SSB of the serving cell and the center frequency of the SSB of the neighbor cell are the same, and the subcarrier spacing of the two SSBs is also the same. SSB based inter-frequency measurement: a measurement may be defined as an SSB based inter-frequency measurement provided the center frequency of the SSB of the serving cell and the center frequency of the SSB of the neighbor cell are different, or the subcarrier spacing of the two SSBs is different. For SSB based measurements, one measurement object may correspond to one SSB and the wireless device may consider different SSBs as different cells. CSI-RS based intra-frequency measurement: a measurement may be defined as a CSI-RS based intra-frequency measurement provided the bandwidth of the CSI-RS resource on the neighbor cell configured for measurement is within the bandwidth of the CSI-RS resource on the serving cell configured for measurement, and the subcarrier spacing of the two CSI-RS resources is the same. CSI-RS based inter-frequency measurement: a measurement may be defined as a CSI-RS based inter-frequency measurement provided the bandwidth of the CSI-RS resource on the neighbor cell configured for measurement is not within the bandwidth of the CSI-RS resource on the serving cell configured for measurement, or the subcarrier spacing of the two CSI-RS resources is different.

The amount of data traffic carried over cellular networks is expected to increase for many years to come. The number of users/devices is increasing, and each user/device accesses an increasing number and variety of services, e.g. video delivery, large files, images. This requires not only high capacity in the network, but also provisioning of very high data rates to meet customer expectations on interactivity and responsiveness. More spectrum is therefore needed for cellular operators to meet the increasing demand Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of interworking solutions with Wi-Fi, e.g., LTE/WLAN interworking. This interest indicates that unlicensed spectrum, when present, may be an effective complement to licensed spectrum for cellular operators to address the traffic explosion in some scenarios, such as hotspot areas. For example, licensed assisted access (LAA) and/or new radio on unlicensed band(s) (NR-U) may offer an alternative for operators to make use of unlicensed spectrum while managing one radio network, thus offering new possibilities for optimizing the network's efficiency.

In an example embodiment, listen-before-talk (LBT) may be implemented for transmission in an unlicensed cell. The unlicensed cell may be referred to as a LAA cell and/or a NR-U cell. The unlicensed cell may be operated as non-standalone with an anchor cell in a licensed band or standalone without an anchor cell in a licensed band. LBT may comprise a clear channel assessment (CCA).

In an example embodiment, discontinuous transmission on an unlicensed band with limited maximum transmission duration may be enabled. Some of these functions may be supported by one or more signals to be transmitted from the beginning of a discontinuous downlink transmission in the unlicensed band. Channel reservation may be enabled by the transmission of signals, by an NR-U node, after or in response to gaining channel access based on a successful LBT operation. Other nodes may receive the signals (e.g., transmitted for the channel reservation) with an energy level above a certain threshold that may sense the channel to be occupied. Functions that may need to be supported by one or more signals for operation in unlicensed band with discontinuous downlink transmission may comprise one or more of the following: detection of the downlink transmission in unlicensed band (including cell identification) by wireless devices; time & frequency synchronization of wireless devices.

In an example embodiment, downlink transmission and frame structure design for operation in an unlicensed band may employ subframe, (mini-)slot, and/or symbol boundary alignment according to timing relationships across serving cells aggregated by carrier aggregation. This may not imply that base station transmissions start at the subframe, (mini-)slot, and/or symbol boundary. Unlicensed cell operation (e.g., LAA and/or NR-U) may support transmitting PDSCH, for example, when not all OFDM symbols are available for transmission in a subframe according to LBT. Delivery of necessary control information for the PDSCH may also be supported.

An LBT procedure may be employed for fair and friendly coexistence of a 3GPP system (e.g., LTE and/or NR) with other operators and technologies operating in unlicensed spectrum. For example, a node attempting to transmit on a carrier in unlicensed spectrum may perform a CCA as a part of an LBT procedure to determine if the channel is free for use. The LBT procedure may involve energy detection to determine if the channel is being used. For example, regulatory requirements in some regions, e.g., in Europe, specify an energy detection threshold such that if a node receives energy greater than the threshold, the node assumes that the channel is being used and not free. While nodes may follow such regulatory requirements, a node may optionally use a lower threshold for energy detection than that specified by regulatory requirements. A radio access technology (e.g., LTE and/or NR) may employ a mechanism to adaptively change the energy detection threshold. For example, NR-U may employ a mechanism to adaptively lower the energy detection threshold from an upper bound. An adaptation mechanism may not preclude static or semi-static setting of the threshold. In an example Category 4 LBT (CAT4 LBT) mechanism or other type of LBT mechanisms may be implemented.

Various example LBT mechanisms may be implemented. In an example, for some signals, in some implementation scenarios, in some situations, and/or in some frequencies no LBT procedure may be performed by the transmitting entity. In an example, Category 1 (CAT1, e.g., no LBT) may be implemented in one or more cases. For example, a channel in unlicensed band may be hold by a first device (e.g., base station for DL transmission), and a second device (e.g., a wireless device) takes over the for a transmission without performing the CAT1 LBT. In an example, Category 2 (CAT2, e.g. LBT without random back-off and/or one-shot LBT) may be implemented. The duration of time determining that the channel is idle may be deterministic (e.g., by a regulation). A base station may transmit an uplink grant indicating a type of LBT (e.g., CAT2 LBT) to a wireless device. CAT1 LBT and CAT2 LBT may be employed for Channel occupancy time (COT) sharing. For example, a base station (a wireless device) may transmit an uplink grant (resp. uplink control information) comprising a type of LBT. For example, CAT1 LBT and/or CAT2 LBT in the uplink grant (or uplink control information) may indicate, to a receiving device (e.g., a base station, and/or a wireless device) to trigger COT sharing. In an example, Category 3 (CAT3, e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (CAT4, e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N may be used in the LBT procedure to determine the duration of time that the channel is sensed to be idle before the transmitting entity transmits on the channel.

In an example, a wireless device may employ uplink (UL) LBT. The UL LBT may be different from a downlink (DL) LBT (e.g. by using different LBT mechanisms or parameters) for example, since the NR-U UL may be based on scheduled access which affects a wireless device's channel contention opportunities. Other considerations motivating a different UL LBT comprise, but are not limited to, multiplexing of multiple wireless devices in a subframe (slot, and/or mini-slot).

In an example, DL transmission burst(s) may be a continuous (unicast, multicast, broadcast, and/or combination thereof) transmission by a base station (e.g., to one or more wireless devices) on a carrier component (CC). UL transmission burst(s) may be a continuous transmission from one or more wireless devices to a base station on a CC. In an example, DL transmission burst(s) and UL transmission burst(s) on a CC in an unlicensed spectrum may be scheduled in a TDM manner over the same unlicensed carrier. Switching between DL transmission burst(s) and UL transmission burst(s) may require an LBT (e.g., CAT1 LBT, CAT2 LBT, CAT3 LBT, and/or CAT4 LBT). For example, an instant in time may be part of a DL transmission burst or an UL transmission burst.

Channel occupancy time (COT) sharing may be employed in NR-U. COT sharing may be a mechanism by which one or more wireless devices share a channel that is sensed as idle by at least one of the one or more wireless devices. For example, one or more first devices may occupy a channel via an LBT (e.g., the channel is sensed as idle based on CAT4 LBT) and one or more second devices may share the channel using an LBT (e.g., 25 us LBT) within a maximum COT (MCOT) limit. For example, the MCOT limit may be given per priority class, logical channel priority, and/or wireless device specific. COT sharing may allow a concession for UL in unlicensed band. For example, a base station may transmit an uplink grant to a wireless device for a UL transmission. For example, a base station may occupy a channel and transmit, to one or more wireless devices a control signal indicating that the one or more wireless devices may use the channel. For example, the control signal may comprise an uplink grant and/or a particular LBT type (e.g., CAT1 LBT and/or CAT2 LBT). The one or more wireless device may determine COT sharing based at least on the uplink grant and/or the particular LBT type. The wireless device may perform UL transmission(s) with dynamic grant and/or configured grant (e.g., Type 1, Type2, autonomous UL) with a particular LBT (e.g., CAT2 LBT such as 25 us LBT) in the configured period, for example, if a COT sharing is triggered. A COT sharing may be triggered by a wireless device. For example, a wireless device performing UL transmission (s) based on a configured grant (e.g., Type 1, Type2, autonomous UL) may transmit an uplink control information indicating the COT sharing (UL-DL switching within a (M)COT). A starting time of DL transmission(s) in the COT sharing triggered by a wireless device may be indicated in one or more ways. For example, one or more parameters in the uplink control information indicate the starting time. For example, resource configuration(s) of configured grant(s) configured/activated by a base station may indicate the starting time. For example, a base station may be allowed to perform DL transmission(s) after or in response to UL transmission(s) on the configured grant (e.g., Type 1, Type 2, and/or autonomous UL). There may be a delay (e.g., at least 4 ms) between the uplink grant and the UL transmission. The delay may be predefined, semi-statically configured (via an RRC message) by a base station, and/or dynamically indicated (e.g., via an uplink grant) by a base station. The delay may not be accounted in the COT duration.

In an example, single and multiple DL to UL and UL to DL switching within a shared COT may be supported. Example LBT requirements to support single or multiple switching points, may comprise: for a gap of less than 16 us: no-LBT may be used; for a gap of above 16 us but does not exceed 25 us: one-shot LBT may be used; for single switching point, for a gap from DL transmission to UL transmission exceeds 25 us: one-shot LBT may be used; for multiple switching points, for a gap from DL transmission to UL transmission exceeds 25 us, one-shot LBT may be used.

In an example, a signal that facilitates its detection with low complexity may be useful for wireless device power saving, improved coexistence, spatial reuse at least within the same operator network, serving cell transmission burst acquisition, etc. In an example, a radio access technology (e.g., LTE and/or NR) may employ a signal comprising at least SS/PBCH block burst set transmission. Other channels and signals may be transmitted together as part of the signal. In an example, the signal may be a discovery reference signal (DRS). There may be no gap within a time span that the signal is transmitted at least within a beam. In an example, a gap may be defined for beam switching. In an example, a block-interlaced based PUSCH may be employed. In an example, the same interlace structure for PUCCH and PUSCH may be used. In an example, interlaced based PRACH may be used.

In an example, initial active DL/UL BWP may be approximately 20 MHz for a first unlicensed band, e.g., in a 5 GHz unlicensed band. An initial active DL/UL BWP in one or more unlicensed bands may be similar (e.g., approximately 20 MHz in a 5 GHz and/or 6 GHz unlicensed spectrum), for example, if similar channelization is used in the one or more unlicensed bands (e.g., by a regulation).

In an example, HARQ acknowledge and negative acknowledge (A/N) for the corresponding data may be transmitted in a shared COT (e.g., with a CAT2 LBT). In some examples, the HARQ A/N may be transmitted in a separate COT (e.g., the separate COT may require a CAT4 LBT). In an example, when UL HARQ feedback is transmitted on unlicensed band, a radio access technology (e.g., LTE and/or NR) may support flexible triggering and multiplexing of HARQ feedback for one or more DL HARQ processes. HARQ process information may be defined independent of timing (e.g., time and/or frequency resource) of transmission. In an example, UCI on PUSCH may carry HARQ process ID, NDI, RVID. In an example, Downlink Feedback Information (DFI) may be used for transmission of HARQ feedback for configured grant.

In an example, CBRA and CFRA may be supported on SpCell. CFRA may be supported on SCells. In an example, an RAR may be transmitted via SpCell, e.g., non-standalone scenario. In an example, an RAR may be transmitted via SpCell and/or SCell, e.g., standalone scenario. In an example, a predefined HARQ process ID for an RAR.

In an example, carrier aggregation between licensed band NR (PCell) and NR-U (SCell) may be supported. In an example, NR-U SCell may have both DL and UL, or DL-only. In an example, dual connectivity between licensed band LTE (PCell) and NR-U (PSCell) may be supported. In an example, Stand-alone NR-U where all carriers are in one or more unlicensed bands may be supported. In an example, an NR cell with DL in unlicensed band and UL in licensed band or vice versa may be supported. In an example, dual connectivity between licensed band NR (PCell) and NR-U (PSCell) may be supported.

In an example, a radio access technology (e.g., LTE and/or NR) operating bandwidth may be an integer multiple of 20 MHz, for example, if absence of Wi-Fi cannot be guaranteed (e.g. by regulation) in an unlicensed band (e.g., 5 GHz, 6 GHZ, and/or sub-7 GHz) where the radio access technology (e.g., LTE and/or NR) is operating. In an example, a wireless device may performance or more LBTs in units of 20 MHz. In an example, receiver assisted LBT (e.g., RTS/CTS type mechanism) and/or on-demand receiver assisted LBT (e.g., for example receiver assisted LBT enabled only when needed) may be employed. In an example, techniques to enhance spatial reuse may be used.

In an operation in an unlicensed band (e.g., LTE eLAA/ feLAA and/or NR-U), a wireless device may measure (averaged) received signal strength indicator (RSSI) and/or may determine a channel occupancy (CO) of one or more channels. For example, the wireless device may report channel occupancy and/or RSSI measurements to the base station. It may be beneficial to report a metric to represent channel occupancy and/or medium contention. The channel occupancy may be defined as a portion (e.g., percentage) of time that RSSI was measured above a configured threshold. The RSSI and the CO measurement reports may assist the base station to detect the hidden node and/or to achieve a load balanced channel access to reduce the channel access collisions.

Channel congestion may cause an LBT failure. The probability of successful LBT may be increased for random access and/or for data transmission if, for example, the wireless device selects the cell/BWP/channel with the lowest channel congestion or load. For example, channel occupancy aware RACH procedure may be considered to reduce LBT failure. For example, the random access backoff time for the wireless device may be adjusted based on channel conditions (e.g., based on channel occupancy and/or RSSI measurements). For example, a base station may (semi-statically and/or dynamically) transmit a random access backoff. For example, the random access backoff may be predefined. For example, the random access backoff may be incremented after or in response to one or more random access response reception failures corresponding to one or more random access preamble attempts.

Semi-static resource allocation of PRACH resources may be supported for an operation of a radio access technology (e.g., LTE and/or NR) in an unlicensed band. A base station may semi-statically configure a wireless device with one or more random access resources, e.g., one or more time resources, one or more frequency resources, and one or more preambles. One or more PRACH periodicities may be supported, e.g., 10, 20, 40, 60, and 160 ms. A wireless device may wait until the next configured RACH occasion without transmitting a random access preamble, for example, if the wireless device determines an LBT failure, which may result in an increased latency associated with a random access procedure for the wireless device.

There may be one or more enhancements implemented in a radio access technology (e.g., LTE and/or NR) for an operation in an unlicensed band. In an example, one or more transmission opportunities for PRACH may be configured in time, frequency, code, and/or a combination thereof. For example, a base station may configure a wireless device, for contention-free and/or contention-based RA, with one or more PRACH resources across one or more LBT sub-bands/carriers. For example, in the time domain, a base station may configure a wireless device with one or more PRACH resources dynamically, e.g., via DCI for connected mode wireless device. For example, PRACH resources configured for a wireless device may comprise one or more first PRACH resources dynamically configured (e.g., via DCI) and/or one or more second PRACH resource semi-statically configured (e.g., via an RRC message). For example, a base station may dynamically configure one or more PRACH resources within a COT where the base station transmits one or more SSBs. For example, the one or more PRACH resources may be dynamically scheduled e.g., via paging for idle mode wireless device and/or via DCI (or any control signal) for a connected mode wireless device. For example, the one or more PRACH resources may follow one or more SSBs (e.g., DRS transmission).

A wireless device may perform LBT for accessing a channel before transmitting PRACH in an unlicensed band. The wireless device may transmit the PRACH, for example, if the channel is free. The wireless device may postpone the PRACH transmission, for example, if the channel is busy. A base station may reserve a time duration for the wireless device before transmitting PRACH to perform LBT, e.g., an LBT gap for RACH occasion (RO). The base station may dynamically schedule RACH occasions via a DCI. The wireless device may transmit at least one preamble via the RACH occasions without LBT (or with performing a particular LBT, e.g., CAT2 LBT), for example, if the gap between DL/UL switching point (e.g., between the last DL symbol and a selected RACH occasion) is small (e.g., less than 16 micro seconds or between 16 and 25 micro seconds).

A base station may share an acquired COT with a wireless device for random access procedure. The base station may allow the wireless device to multiplex PRACH resources in UL portion of an acquired COT. For example, the base station may transmit, to one or more wireless device, an indication via a group-common PDCCH (GC-PDCCH) to schedule PRACH resources within the acquired COT, e.g., for connected, inactive, and/or idle mode wireless device(s). In an example, the base station may transmit the PDCCH (e.g., GC-PDCCH) to schedule resources after one or more SSBs (e.g., in an RMSI and/or in a DCI). In an example, the wireless device may perform one-shot (CAT2) LBT or no LBT for random access preamble (Msg1) and Msg3 transmission in the COT acquired by the base station, for example, the wireless device receives the indication.

Dynamic PRACH resource allocation may be complementary considered in addition to the semi-statically allocated PRACH resources. In an example, scheduling of PRACH may be triggered by DCI, e.g., a group common PDCCH. The scheduling information may comprise time and frequency resource allocation for PRACH. In an example, to reduce signaling overhead, only parameters subject to LBT results may be configured in DCI, e.g., starting OFDM symbol and frequency resources. For example, one or more parameters comprising PRACH periodicity, preamble format, and RO number per PRACH slot may be acquired by RMSI. The DCI trigger scheme may be used for connected mode wireless devices. The DCI trigger scheme may provide robustness against LBT failures, for example by allowing PRACH resources being multiplexed in UL portion of a shared COT acquired by the base station. A GC-PDCCH may be used to schedule PRACH resources in the COT. The DCI trigger scheme may be used for idle mode wireless devices. The COT may be shared between the PRACH resource trigger (e.g., the DCI or the DRS) and the preamble transmission. The COT sharing for PRACH transmission may reduce the effect of a first wireless device performing LBT blocking a second wireless device (inter-wireless device blocking).

PRACH resources may be located inside or outside a base station-initiated COT. PRACH transmissions may follow a first type of LBT mechanism (e.g., CAT-2 or CAT-4 LBT) accordingly. The base station may indicate whether RACH occasion is located inside or outside the COT to the base station. For example, COT length indication may be signaled in a DCI that precedes the RACH occasion. For example, the DCI may be used to indicate COT reservation to cover the RACH occasions. The wireless device may select an LBT type in accordance with the indication.

A base station may configure one or more wireless devices to share one or more PRACH resources in unlicensed bands. The one or more wireless devices may block each other, for example, if the one or more wireless devices transmit one or more preambles without UL synchronization in the same PRACH resource. For example, a preamble transmission time may vary between wireless devices, for example, if the wireless devices are not UL-synchronized, and/or if the wireless devices select different values of backoff timers. The base station may perform an LBT to reserve PRACH resources. The PRACH resources may be within the base-station-initiated COT. The channel prior to the PRACH resource may be occupied by the base station. The wireless device may assume that the channel is reserved by the base station for PRACH transmission and may skip LBT, for example when the channel prior to the PRACH resource is occupied by the serving base station, and/or the PRACH resource is within the COT of the base station. The base station may indicate the above information to the wireless device, for example using an initial signal or a DCI. The initial signal or the DCI may comprise COT sharing indication.

A random access procedure may be of high priority (e.g., for beam failure recovery, handover) or low priority (e.g., for initial access, timing alignment, RRC reconfiguration). Channel access priority class (CAPC) for LBT type (e.g., sensing duration, contention window size, etc.) for RACH may be based on the purpose of the RACH. High priority CAPC (e.g., shorter sensing period) may be chosen for handover and beam failure and low priority (e.g., longer sensing period) for other use cases. For example, in the handover procedure, the PRACH transmission may be allowed as early as possible to avoid running into a handover failure/RLF condition. For example, the wireless device may perform channel access type 2 (short LBT) or type 1 (no LBT) for PRACH messages. The PRACH signal and waveform may be designed such that a type 2 or type 1 LBT is allowed.

Handover in high radio frequency range with beamforming may increase mobility interruption time due to beam sweep delay. Mobility interruption time may refer to a time (e.g., a shortest time) duration that the network may support during which a wireless device may not exchange user plane packets with any base station during transitions. It may be of interest to minimize the mobility interruption time (e.g., to 0 ms). Reliability of communications may be reduced due to beamforming characteristics providing smaller coverage. The wireless device may experience very fast signal degradation when moving or rotating Channel condition may vary significantly in high frequency. For example, pathloss fluctuation may be tens of dB different in signal strength in beams, or between line of sight (LoS) and non-LoS, which may result in higher handover failure and large ping-pong rate.

Mobility performance is one of the most important performance metrics for radio access technologies (e.g., LTE, NR). It is important to identify handover solutions to achieve high handover performance with low mobility interruption time (e.g., 0 ms), low latency (e.g., an average time between a transmission of a packet and a reception of an acknowledgement), and high reliability to provide seamless handover experience for the wireless device. Low mobility interruption time may be achieved by using intra-cell beam mobility and/or addition/release of SCell(s) for CA operation. Even though these techniques may reduce mobility interruption time, there is still a need to further reduce mobility interruption time in many instances (e.g., for ultra-reliable low-latency communications (URLLC) type of service), which may require low end-to-end delay (e.g., 1 ms). Therefore, radio technologies may require reduced handover (HO)/SCG change mobility interruption time and improved handover reliability. The mobility enhancement may be applied to both inter-/intra-frequency HO/SCG change. The mobility enhancements may not be limited to high frequency range. Solutions to reduce HO/SCG change mobility interruption time and to improve HO reliability may also be beneficial to high speed trains and aerial use case where channel situation becomes challenging in terms of HO performance.

Existing solutions to reduce mobility interruption time during HO/SCG change may comprise: HO/SCG change with simultaneous connectivity with source cell and target cell; make-before-break; RACH-less handover. Existing solutions to improve HO/SCG change reliability and robustness may comprise: conditional handover; fast handover failure recovery.

A wireless device may perform a RACH procedure during handover to obtain a timing advance (TA) value and an UL grant for PUSCH transmission (e.g., RRC reconfiguration complete message) to the target cell. In a RACH-less handover, the wireless device may skip the RACH procedure during handover. A RACH-less handover may be used to eliminate RACH related latencies during HO and thus reduce mobility interruption time. RACH-less handover may be used, for example, in synchronous deployments, scenarios when the target cell TA is zero, or scenarios when the target cell TA is the same as the source cell TA.

A wireless device configured to perform a RACH-less handover may access the target cell via an uplink grant pre-allocated to the wireless device in a message (e.g., RRC reconfiguration message). The wireless device may monitor the PDCCH of a target cell to obtain the UL grant when, for example, the preconfigured UL grant is not provided. However, in many deployment scenarios RACH-less handover may not be feasible when, for example, the target cell TA is not zero or is not the same as the source cell TA. This may result in increased handover latency, leading to handover failure and/or an RLF condition. This may be especially true for unlicensed bands, where the wireless device may perform LBT and find the channel busy and not succeed in transmitting a preamble in the semi-statically configured PRACH transmission occasions, resulting in significantly increased RACH related latency.

In order to enhance random access transmission opportunities in unlicensed bands, a base station may dynamically schedule one or more first PRACH transmission occasions. For example, a base station may schedule the one or more first PRACH transmission occasions during a COT (e.g., in at least one symbol of the slot) that the base station acquires. For example, the one or more first PRACH transmission occasions may not be overlapped with one or more second PRACH transmission occasions that are semi-statically configured by the base station (e.g., via broadcast message(s)). In an existing radio access technology (e.g., 4G and/or 5G), a dynamic assignment of one or more PRACH transmission occasions is not supported. In an unlicensed band, a wireless device may transmit and/or receive any message (Msg1 1220, Msg 2 1230, Msg 3 1230, and/or contention resolution 1250), for example, when an LBT is successful in the unlicensed band. This may result in reduced random access opportunities for the wireless devices and increased latency in the random access procedures, leading to a long delay for the wireless device to camp on a cell configured in the unlicensed band.

The long delay may depend on a result of LBT performed by the wireless device and/or a level of congestion on the unlicensed band. Thus, there is a need to reduce the long delay occurring in existing radio access technologies. During a handover procedure in unlicensed bands, there is a need to reduce the long delay in the random access procedure to avoid handover failure and RLF conditions.

Embodiments of the present disclosure may provide one or more mechanisms and/or parameters to enhance the random access procedure within a handover procedure. Embodiments of the present disclosure may improve a likelihood that a random access procedure is successfully completed in an unlicensed band, resulting in an enhanced handover performance with low mobility interruption time, low latency, and high reliability. Thereby, a battery power consumption of the wireless device may be improved.

A wireless device may receive one or more messages from a source base station that semi-statically configures the wireless device with information required to access a target cell on a target base station (e.g., the RRC reconfiguration message (the handover command)). The information may comprise at least one of the following: a radio network identifier (e.g., a C-RNTI); system information of the target cell (e.g., SIBs); a list of candidate beams for preamble transmission to the target cell; PRACH resource configuration parameters (e.g., that indicate a set of dedicated and/or common PRACH resources); and/or an association between PRACH resources and beams. The wireless device may use the information to initiate a random access procedure by transmitting a preamble to the target base station. For example, the wireless device may transmit the preamble via a semi-static RACH occasion configured based on PRACH resource configuration parameters in the information. In unlicensed bands, the wireless device may perform an LBT and transmit the preamble after the LBT is successfully completed. The wireless device may not be able to transmit the preamble via the semi-statically configured RACH occasion, for example, if the channel is occupied and the LBT fails. The wireless device may need to wait for a next semi-statically configured RACH occasion, which will result in increased delay in the overall handover procedure and, potentially, handover failure. Therefore, there is a need to provide additional random access opportunities in the unlicensed bands.

A target base station may dynamically provide PRACH resources (e.g., preamble, RACH occasion, beam association, etc.) to a wireless device for a handover procedure. For example, the target base station may perform an LBT on a channel and, in response to the channel being idle and the LBT successfully completing, the target base station may transmit a downlink control signal (e.g., a DCI) to the wireless device to dynamically schedule RACH occasions and/or trigger a random access procedure. In order to receive the downlink control signal, the wireless device may monitor one or more PDCCH candidates in one or more control resource sets of a target cell of the target base station. The wireless device may transmit at least one preamble to the target cell in response to receiving the downlink control signal. However, existing radio access technologies (e.g., 4G and/or 5G) do not support configuration of the wireless device for monitoring the control resource set of the target cell before a preamble transmission.

Dynamically scheduled RACH occasions may be scheduled before and/or after semi-statically configured RACH occasions. The dynamically scheduled RACH occasions may be scheduled to not overlap with the semi-statically configured RACH occasions. The dynamically scheduled RACH occasions may be determined based on the semi-statically configured RACH occasions. For example, the dynamically scheduled RACH occasions may be determined by shifting the semi-statically configured RACH occasions in the time domain and/or the frequency domain. The dynamically scheduled RACH occasions may provide more random access opportunities for the wireless device in unlicensed bands and, thereby, increase the likelihood of a successful LBT being performed for the unlicensed bands. This may further result in reduced mobility interruption time. For example, the downlink control signal may initiate a COT. For example, the downlink control signal may indicate the COT structure information. The downlink control signal may indicate the LBT type that the wireless device may perform to transmit a preamble.

An RRC reconfiguration message may comprise information required for monitoring and receiving the downlink control signal during a handover procedure (e.g., before a preamble transmission). The wireless device may monitor one or more configured sets of PDCCH candidates in one or more control resource sets of the target cell, before the random access preamble transmission, to receive the downlink control signal that schedules dynamic PRACH resources. The RRC reconfiguration message may comprise a parameter indicating the presence of the downlink control signal.

Figure 19:
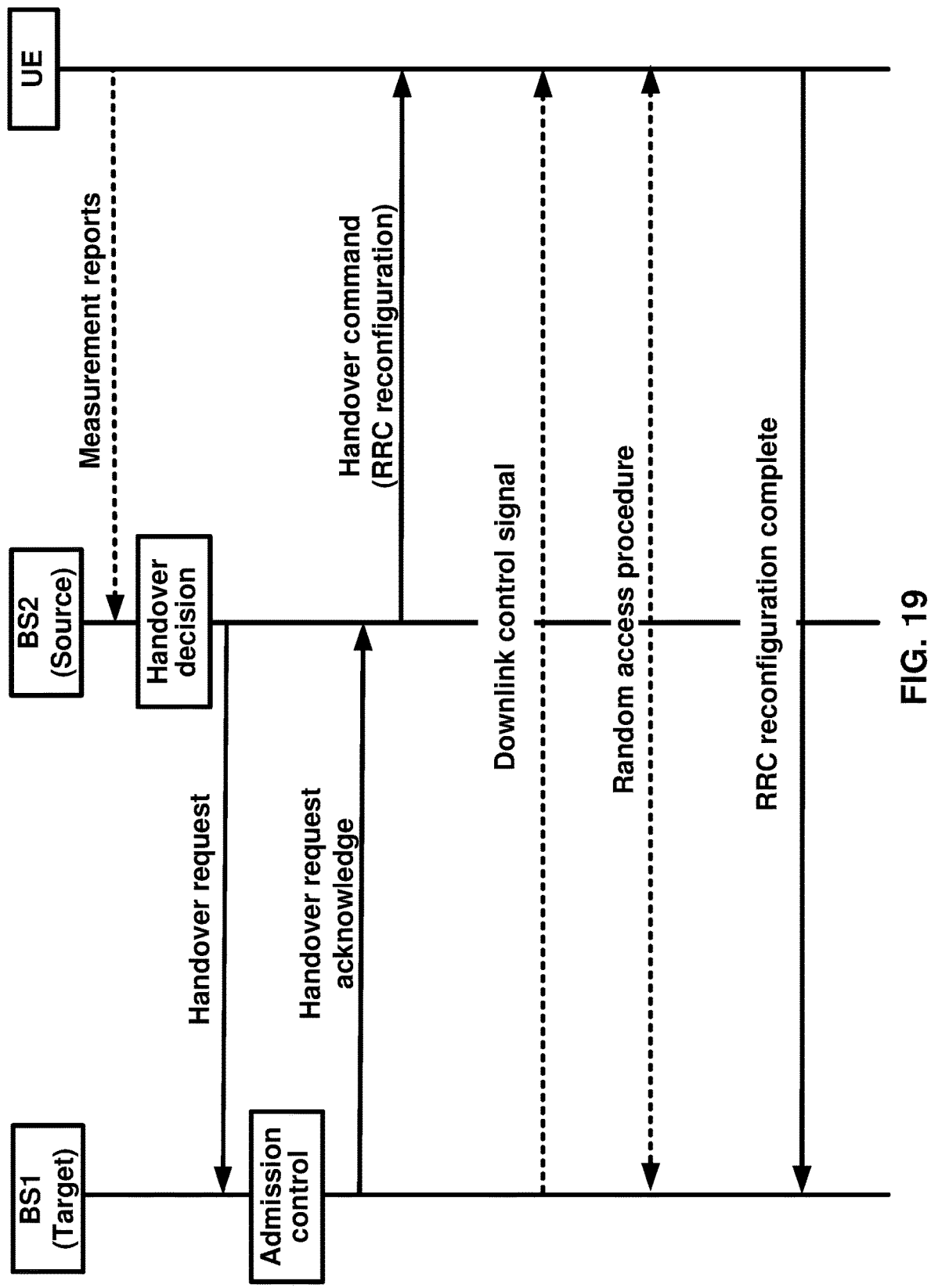
FIG. 19 is a diagram of example signaling for handover procedure with dynamic PRACH scheduling as per an aspect of an embodiment of the present disclosure.

FIG. 19 shows an example handover procedure in accordance with embodiments of the present disclosure. In FIG. 19, a source base station (BS2) may determine to handover a wireless device (UE) to a different, target base station (BS1). For example, the source base station may determine to handover the wireless to the target base station based on measurement reports received from the wireless device. The wireless device may measure received power from neighboring cells and include these measurements in the measurement reports. After determining to handover the wireless device to the target base station, the source base station may send a handover request message to the target base station. The target base station may perform an admission control process and may confirm the handover request by sending a handover request acknowledgement, comprising an RRC reconfiguration message, to the source base station. The source base station may forward the RRC reconfiguration message (handover command) to the wireless device. The wireless device may be configured with parameters of one or more PRACH resources of a target cell of the target base station, and parameters required for monitoring and receiving a downlink control signal (e.g., PRACH trigger signal and/or DCI). The wireless device may receive the downlink control signal from the target cell. The wireless device may determine one or more random access occasions and/or a random access preamble based on the downlink control signal and/or the RRC reconfiguration message. The wireless device may initiate the random access process for accessing the target cell. After successfully completing the random access process, the wireless device may transmit an RRC reconfiguration complete message to the target cell.

Figure 20:
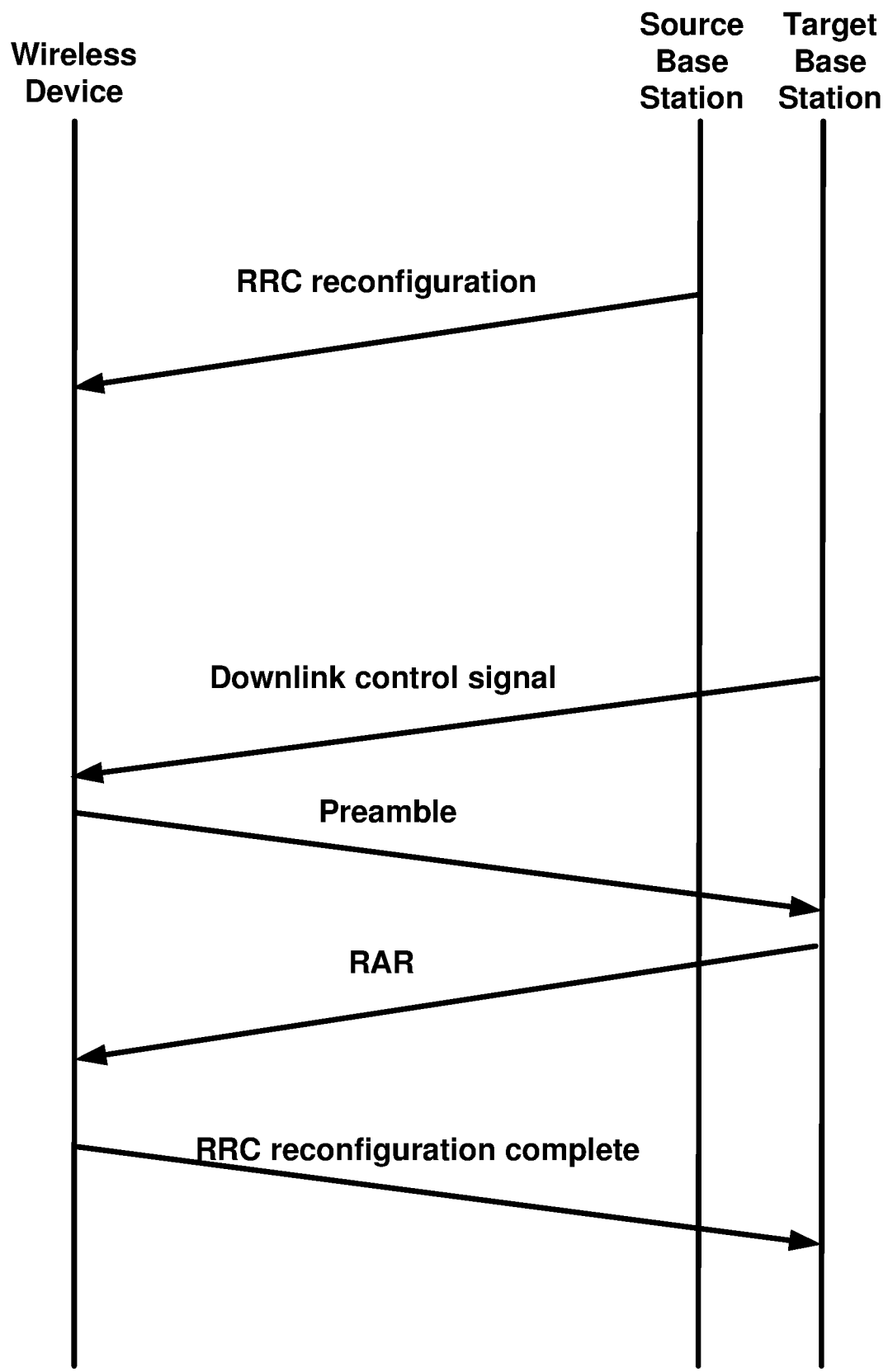
FIG. 20 is a diagram of example signaling for random access procedure triggered by a handover with dynamic PRACH scheduling as per an aspect of an embodiment of the present disclosure.

FIG. 20 shows example signaling that may be used during the handover procedure discussed above in FIG. 19 in accordance with embodiments of the present disclosure. After receiving the RRC reconfiguration message, the wireless device may determine at least one beam and associated SSB(s), and the frame timing for DL synchronization. The wireless device may be configured by the RRC reconfiguration message to monitor one or more sets of PDCCH candidates in one or more control resource sets to receive the downlink control signal (e.g., PRACH trigger signal and/or DCI). After receiving the downlink control signal, the wireless device may transmit the preamble to the target base station via a random access occasion determined based on the downlink control signal to initiate a random access. The target base station may transmit a random access response (RAR) to the wireless device, indicating one or more UL grants and/or a TA value. The wireless device may synchronize (e.g., in the UL direction based on the TA value) to the target cell. In case of contention-based random access, the wireless device may transmit a Msg3 to the target base station and receive a Msg4 from the target base station (not shown in FIG. 20) to resolve the contention. The wireless device may transmit an RRC reconfiguration complete message to the target base station to confirm successful connection and handover completion.

Figure 21:
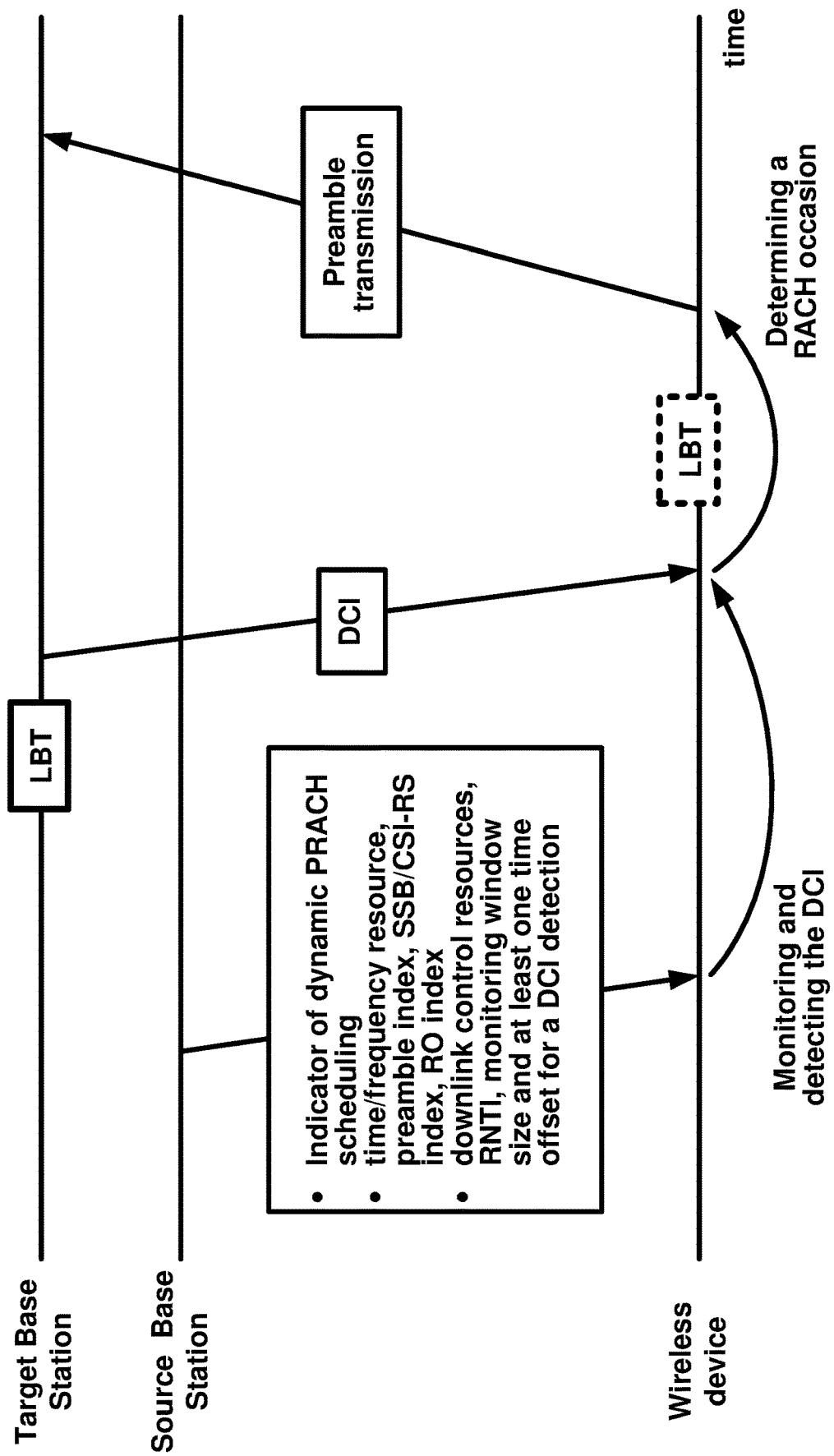
FIG. 21 is a diagram of example dynamic PRACH scheduling for handover procedure as per an aspect of an embodiment of the present disclosure.

As shown in FIG. 21, the source base station may transmit to the wireless device, one or more messages (e.g., one or more RRC reconfiguration messages) in accordance with embodiments of the present disclosure. The one or more messages may comprise: an indicator indicating a presence of a dynamic PRACH scheduling and/or a PRACH trigger (e.g., via a DCI); one or more parameters of PRACH resource configuration; and/or one or more parameters of monitoring for receiving the PRACH trigger (the downlink control signal or the DCI).

One or more parameters of PRACH resource configuration may comprise contention-free random access (CFRA) configuration and/or contention-based random access (CBRA) configuration. The one or more parameters of PRACH resource configuration may comprise at least one of following: a PRACH configuration index (e.g., prach-ConfigurationIndex); a number of PRACH transmission occasions FDMed in one time instance (e.g., msg1-FDM); an offset of a lowest PRACH transmission occasion in frequency domain with respect to PRB 0 (e.g., msg1-FrequencyStart); a target power level at the network receiver side (e.g., preambleReceivedTargetPower); a maximum number of preamble transmission performed before declaring a failure (e.g., preambleTransMax); a power ramping step for PRACH (e.g., powerRampingStep); a Msg2 (RAR) window length in number of slots (e.g., ra-ResponseWindow); a number of SSBs per RACH occasion (e.g., ssb-perRACH-Occasion); an index of an SSB/CSI-RS (e.g., SSB-Index and/or CSI-RS-Index); a preamble index that the wireless device may use to perform CFRA upon selecting the candidate beam(s) identified by a corresponding SSB/CSI-RS (e.g., ra-PreambleIndex); and/or a PRACH mask index for RA resource selection associated with the corresponding SSB/CSI-RS. The PRACH configuration index may indicate at least one of following: a preamble format; at least one system frame number; at least one subframe number; at least one starting symbol; a number of PRACH slots within a subframe; and/or a number of time-domain RACH occasions (ROs) within a PRACH slot. The wireless device may determine a first RACH occasion (RO) based on the one or more parameters of PRACH resource configuration.

One or more parameters of monitoring for receiving the PRACH trigger signal (the downlink control signal or the DCI) may indicate: one or more downlink control resources (CORESETs) of the target cell; a radio network identifier (RNTI) for the downlink control signal (the DCI); a monitoring window; and at least one time offset indicating a start of the monitoring window. The one or more downlink control resources may comprise one or more resource blocks and one or more symbols, comprising one or more monitoring occasions of the DCI. The search space set comprising the one or more downlink control resources of the target cell may be the search space set configured for receiving the RAR message (e.g., Type1-PDCCH common search space set configured by ra-SearchSpace for a DCI format with CRC scrambled by a RA-RNTI or C-RNTI or TC-RNTI). The target base station may transmit the downlink control signal via a beam that the target base station transmits a reference signal (e.g., SSB and/or CSI-RS) associated with the wireless device. The demodulation reference signal antenna port associated with the reception of the downlink control signal via the one or more downlink control resources may be quasi co-located with a first downlink reference signal (e.g., SSB and/or CSI-RS) indicated by the one or more parameters of PRACH resource configuration. The radio network identifier of the DCI may be predefined or configured by RRC or determined based on some parameters (e.g., RA-RNTI or C-RNTI or TC-RNTI). The size/duration of the monitoring window may be indicated in ms, or number of slots, or symbols. The at least one time offset may be indicated in ms, or number of slots, or symbols.

The wireless device may determine when to start to monitor the one or more downlink control resources (e.g., search space sets) of the target cell. A first protocol layer of the wireless device (e.g., RRC layer) processing a handover command may not control a downlink control channel monitoring. For example, an RRC layer of a wireless device may receive and process a handover command A physical layer of the wireless device may determine a downlink control channel monitoring procedure. There may be a need for a mechanism and/or procedure to determine, based on the handover command, the downlink control channel monitoring.

Figure 22:
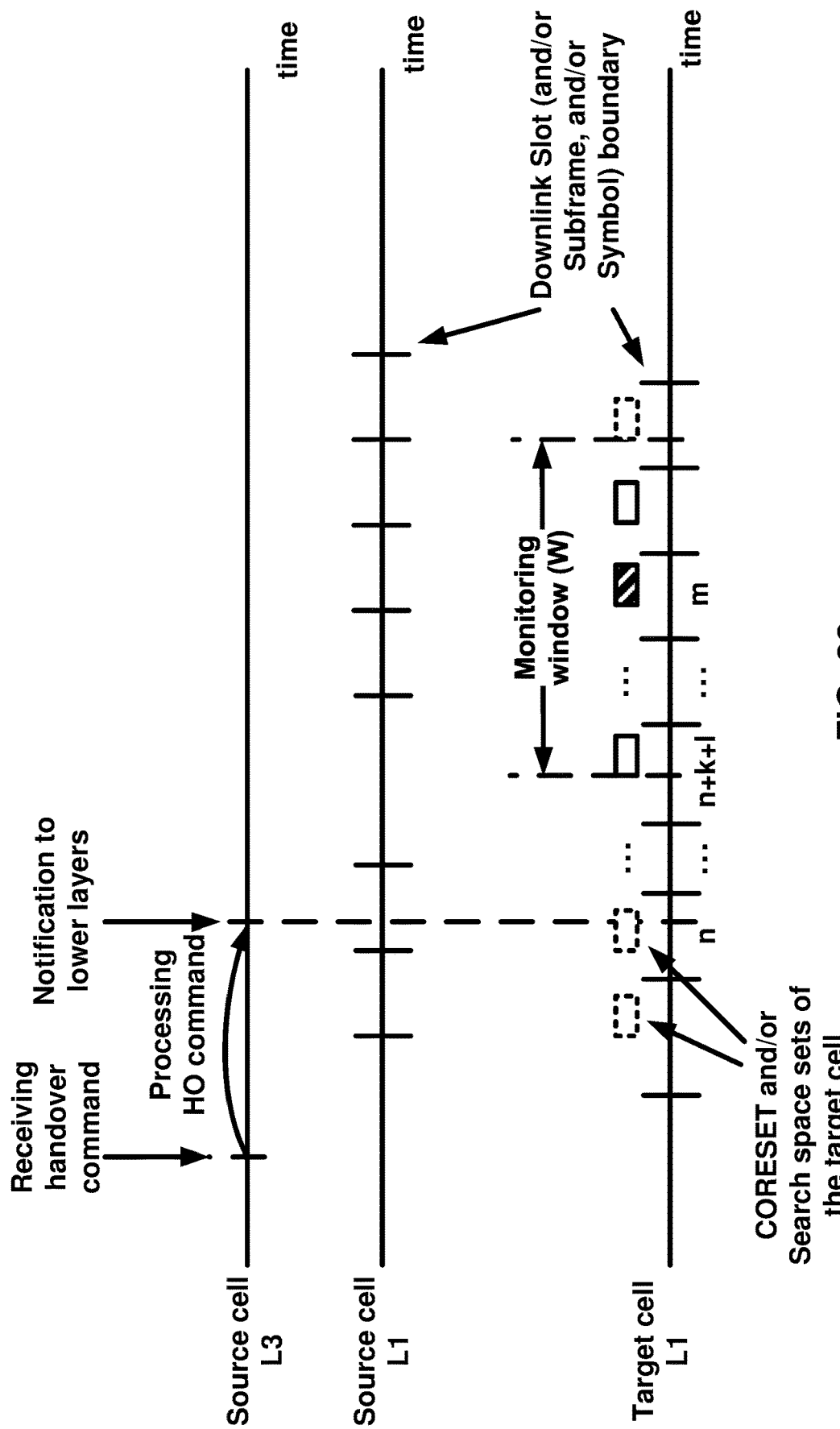
FIG. 22 is a diagram of example monitoring steps for handover procedure with dynamic PRACH scheduling as per an aspect of an embodiment of the present disclosure.

As illustrated in FIG. 22, a wireless device may be configured to monitor one or more downlink control resource sets (CORESETs) and/or search space sets (CORESET/search space sets) of a target cell. The CORESET/search space sets of the target cell may be semi-statically configured with a period. A physical layer of the wireless device may receive a notification of a handover command (e.g., after reception and processing of an RRC reconfiguration message) from higher layers (e.g., L3 (RRC layer)). For example, the physical layer of the wireless device may receive a notification of the handover command from one or more higher layers in subframe/slot/symbol "n", according to a downlink reception timing of the target cell. The wireless device may synchronize to the downlink reception timing of the target cell based on one or more reference signals transmitted by the target cell. The downlink reception timing of the target cell may be different than a downlink reception timing of the source cell, for example, due to the different distances of the source base station and the target base station to the wireless device. The physical layer of the wireless device may determine, based on a reception time of the notification, a starting time for monitoring the downlink control channel of the target cell. For example, the physical layer of the wireless device may start monitoring for the PRACH trigger signal (e.g., a DCI) in the earliest CORESET/search space set, and/or a semi-statically configured CORESET/search space set of the target cell, in response to a notification being received from a higher layer (e.g., RRC layer) of the wireless device. For example, a first time offset "k" may be indicated by the handover command (or RRC reconfiguration message) to determine the earliest CORESET/search space set of the target cell. For example, a wireless device capability (e.g., DL/UL switching time, BWP switching time, DL preparation time, and/or measurement gap) may indicate a second time offset "l" to determine the earliest CORESET/search space set, and/or the semi-statically configured CORESET/search space set of the target cell. The wireless device may employ the first time offset "k" and/or the second time offset "l" to monitor for the PRACH trigger signal (e.g., DCI) in a CORESET/search space set. For example, in FIG. 22, upon detection of a notification of HO command in subframe/slot/symbol "n" with indication of a dynamic PRACH trigger signal (e.g., DCI) and/or configuration of monitoring for the dynamic PRACH trigger signal (e.g., DCI), the wireless device may start to monitor for the PRACH trigger signal in subframe/slot/symbol "n+k+l" (e.g., k>=1 may be the first time offset indicated by the handover command (RRC reconfiguration message), and l>=1 may be the second time offset determined based on wireless device capability).

Figure 23:
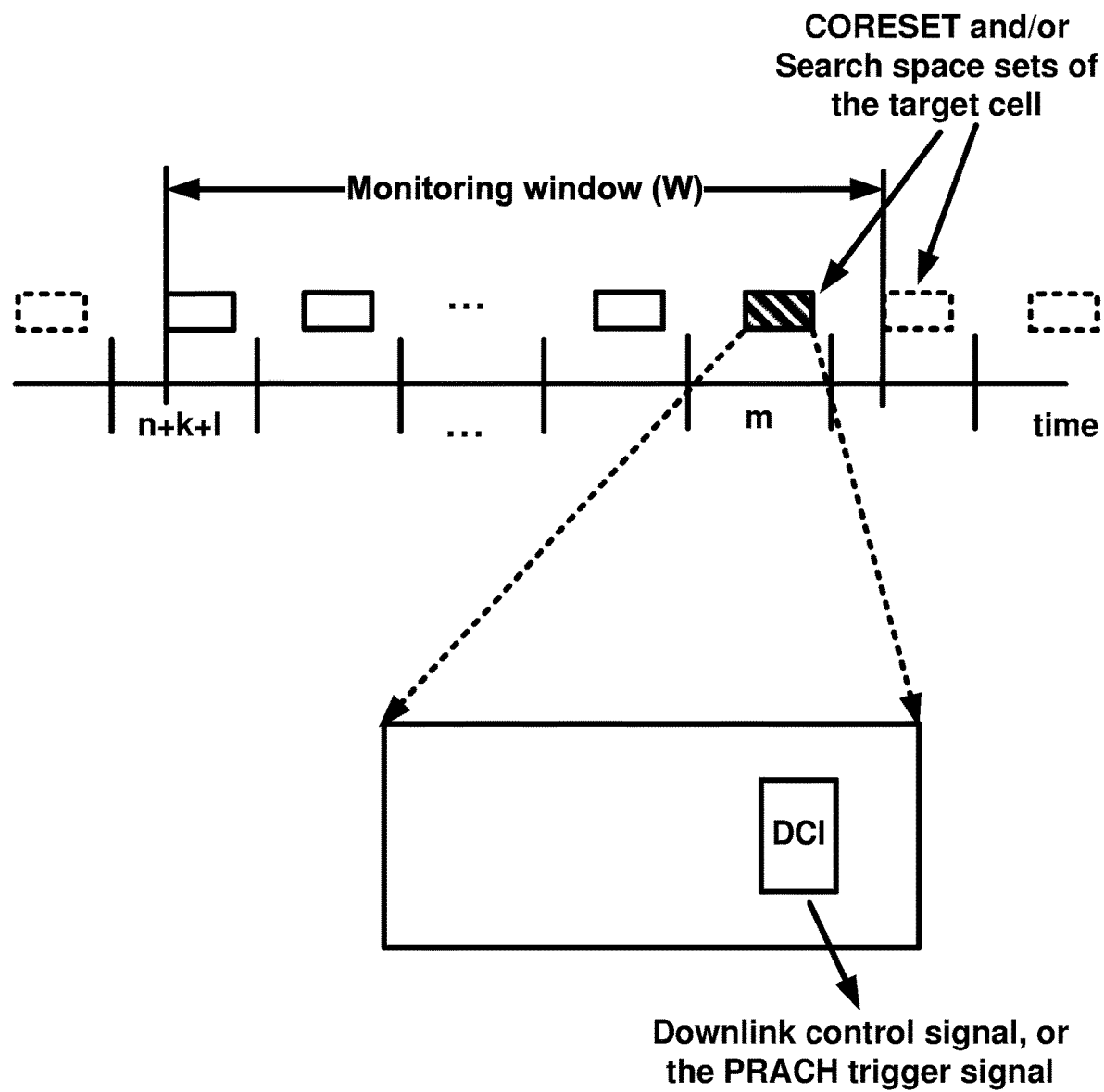
FIG. 23 is a diagram of example monitoring for receiving a PRACH trigger signal (DCI) as per an aspect of an embodiment of the present disclosure.

As shown in FIG. 23, the wireless device may start monitoring the CORESET/search space set in subframe/slot/symbol "n+k+l" according to a first and a second predefined/semi-statically configured time offset (e.g., k and/or l). For example, the wireless device may start monitoring in slot/subframe/symbol "n+k+l" of the configured CORESET/search space set of the target cell. The wireless device may monitor the CORESET/search space set for a duration based on a pre-defined/semi-statically configured monitoring window, "W". "W" may be indicated in ms and/or number of slots/subframes/symbols. The wireless device may detect a PRACH trigger signal (e.g., a DCI) in one or more CORESET/search space set/PDCCH monitoring occasions of the target cell during the monitoring window. For example, as shown in FIG. 23, the wireless device may receive the downlink control signal in subframe/slot/symbol "m" from the target base station. The CRC of the downlink control signal/PRACH trigger signal (the DCI) may be scrambled by a radio network identifier indicated by the HO command (RRC reconfiguration message).

The downlink control signal (e.g., PRACH trigger signal and/or DCI) may comprise a third time offset to indicate a dynamically scheduled RACH occasion (RO) for the wireless device to transmit a preamble to the target base station. For example, the third time offset may be indicated as "i" (i>=0), where "i" may be in ms and/or number of slots/subframes/symbols. The value of "i" may be determined based on the wireless device capability. The value of "i" may be pre-defined. The value of "i" may be configured by RRC. The downlink control signal may also comprise a frequency offset to indicate the dynamically scheduled RO. The wireless device may determine the dynamically scheduled RO based on a first RACH occasion configured semi-statically by the one or more parameters of RACH resource configuration in the HO command, and the third time offset and/or frequency offset indicated in the downlink control signal. The small amount of information carried by the downlink control signal may result in reduced power consumption by the wireless device to receive the downlink control signal.

Figure 24:
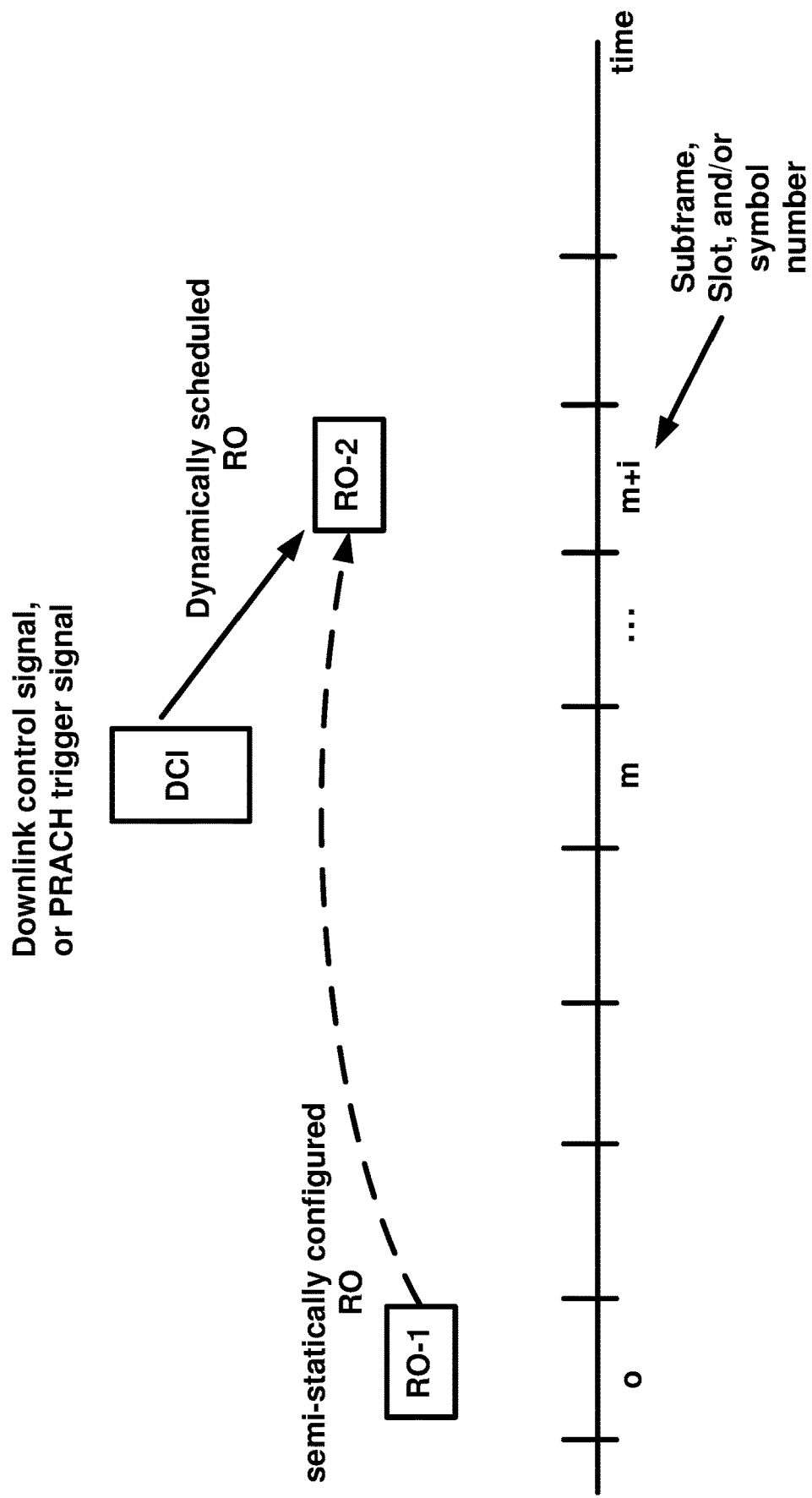
FIG. 24 is a diagram of example dynamic resource allocation for PRACH as per an aspect of an embodiment of the present disclosure.

In an example embodiment shown in FIG. 24, the wireless device may receive the downlink control signal from the target base station in subframe/slot/symbol "m". The downlink control signal may indicate a time offset "i". The wireless device may determine a first semi-statically configured RO based on one or more PRACH configuration parameters indicated by HO command (RRC reconfiguration message) in subframe/slot/symbol "o". Upon reception of the downlink control signal in subframe/slot/symbol "m" indicating the time offset "i", the wireless device may assume that a second RO with same/similar configurations as/to the first RO is dynamically scheduled in subframe/slot/symbol "m+i". In fact, the wireless device may shift the first configured RO in the time domain according to the third time offset indicated by the downlink control signal. The wireless device may also shift the first configured RO in the frequency domain according to the frequency offset indicated by the downlink control signal. The wireless device may determine the information of the second RO based on one or more PRACH configuration parameters in the RRC reconfiguration message, e.g., the PRACH configuration index, the number of PRACH transmission occasions FDMed in one time instance (msg1-FDM), the number of SSBs per RACH occasion (e.g., ssb-perRACH-Occasion), the index of an SSB/CSI-RS (e.g., SSB-Index and/or CSI-RS-Index), and/or the PRACH mask index associated with the corresponding SSB/CSI-RS. The wireless device may determine the time (and frequency) resource of the second RO based on the reception time of the downlink control signal and the time (and frequency) offset value indicated by the downlink control signal. The wireless may transmit a preamble (e.g., the preamble with index indicated by the one or more PRACH configuration parameters) to the target base station via the second RO. The downlink control signal may indicate COT sharing indication. The wireless device may perform an LBT type, e.g., indicated by the downlink control signal, prior to transmitting the preamble. The wireless device may receive a RAR from the target base station after a successful preamble transmission. The parameters used for preamble transmission and RAR reception are determined based on the one or more PRACH configuration parameters.

The wireless device may be configured by the HO command (RRC reconfiguration message) to monitor one or more downlink control resources (e.g., search space sets) of the target cell to receive the downlink control signal. The HO command may comprise one or more parameters of monitoring for receiving the control signal from the target base station. The one or more parameters of monitoring may indicate the one or more downlink control resources. For example, the one or more parameters may comprise a first time offset "k" indicating a first monitoring occasion of a CORESET/search space set comprising the one or more downlink control resources. For example, a wireless device capability (e.g., DL/UL switching time, BWP switching time, DL preparation time, and/or measurement gap) may indicate a second time offset "l" to determine the first monitoring occasion of a CORESET/search space set comprising the one or more downlink control resources. The wireless device may determine the first monitoring occasion by applying the first time offset value and/or the second time offset value to a first (e.g., earliest, or latest) subframe/slot/symbol configured for reception of a reference signal (e.g., SSB/SCI-RS). The wireless device may determine the first monitoring occasion by applying the first time offset value and/or the second time offset value to a second (e.g., earliest, or latest) configured PRACH subframe/slot/symbol. The wireless device may determine the first monitoring occasion by applying the first time offset value and/or the second time offset value to a third (e.g., earliest, or latest) subframe/slot/symbol configured for RAR reception.

Figure 25:
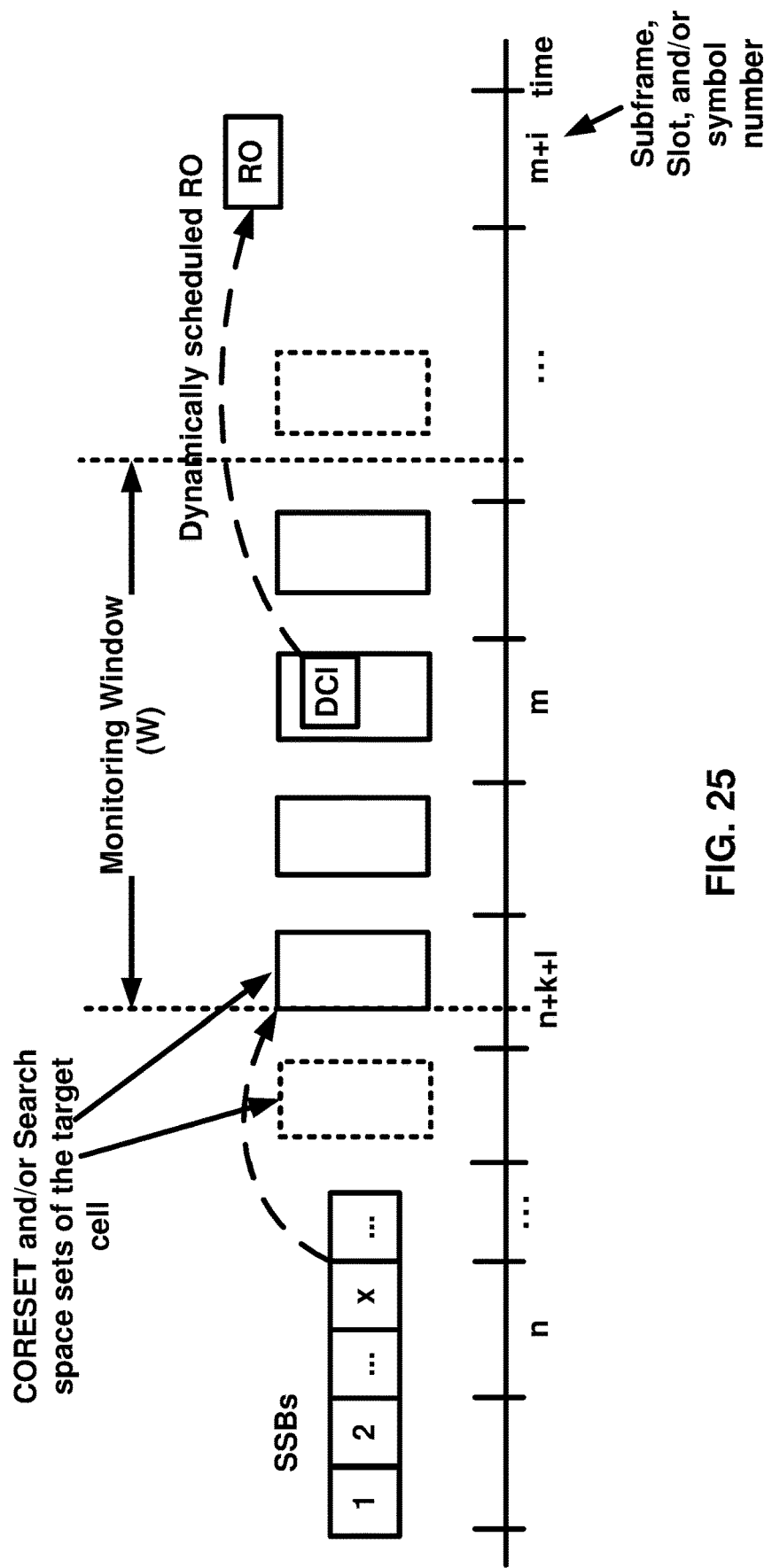
FIG. 25 is a diagram of example procedure for monitoring and receiving a dynamic PRACH trigger signal followed by determining a dynamically scheduled RACH occasion as per an aspect of an embodiment of the present disclosure.

In the example embodiment shown in FIG. 25, the wireless device may determine an SSB index (e.g., SSB #x of the target cell) in subframe/slot/symbol "n", according to a DL timing of the target cell. The wireless device may monitor for the PRACH trigger signal (DCI) in the CORESET/search space set of the target cell indicated by a first time offset "k" and/or a second time offset "l" applied to subframe/slot/symbol "n". For example, upon detection of the SSB #x (or a configured PRACH occasion #y) in subframe/slot/symbol "n", the wireless device may start a monitoring window for the downlink control signal (e.g., PRACH trigger signal and/or DCI) in subframe/slot/symbol "n+k+l", where "k" (k>=1) may be the first time offset indicated by the handover command (e.g., the RRC reconfiguration message), and "l" (l>=1) may be the second time offset determined based on the wireless device capability. The wireless device may monitor the search space set for a duration of "W" configured for the monitoring window by the HO command (RRC reconfiguration message). The wireless device may detect the downlink control signal in subframe/slot/symbol "m" within the monitoring window. The CRC of the downlink control signal/PRACH trigger signal (the DCI) may be scrambled by a radio network identifier indicated by the HO command (RRC reconfiguration message).

The downlink control signal may comprise one or more parameters of a random access procedure in the target cell. For example, the downlink control signal may comprise at least one of following: a random access preamble index; a SS/PBCH index (or a CSI-RS index) of the target cell; a PRACH mask index that indicates a RACH occasion (RO)

associated with the SS/PBCH (or the CSI-RS) indicated by the SS/PBCH index (or the CSI-RS index) for PRACH transmission. The downlink control signal may further comprise a third time offset to indicate the dynamically scheduled RO in the target cell. The wireless device may determine the dynamically scheduled RO based on the above parameters and one or more parameters of PRACH resource configuration indicated by the HO command (EEC reconfiguration message), and by applying the third time offset. For example, as shown by FIG. 25, upon receiving the downlink control signal in subframe/slot/symbol "m" indicating the third time offset "i", the wireless device may determine the dynamically scheduled RO in subframe/slot/symbol "m+i". The wireless may transmit the preamble (e.g., the preamble with index indicated by the downlink control signal) to the target base station via the dynamically scheduled RO.

The wireless device may transmit a preamble via a semi-statically configured RACH occasion, for example when the wireless device may not detect a downlink control signal for dynamic scheduling of PRACH, or for example, when the wireless device may not perform a successful LBT to access the channel via a dynamically scheduled RACH occasion. The wireless device may transmit the preamble via the dynamically scheduled RACH occasion, for example when the wireless device may not perform a successful LBT to access the channel via the semi-statically configured RACH occasion. The wireless device may not expect that the semi-statically configured RO overlap with the dynamically scheduled RO. The wireless device may successfully complete the random access procedure before the expiration of the HO timer (e.g., T304). The wireless device may fall back to a CBRA using the configured random access resources via HO command (RRC reconfiguration message), for example when the wireless device is not able to successfully complete the random access procedure via the dynamically scheduled resources.

FIG. 26 is a flow diagram of an example embodiment for a wireless device scheduled with dynamic random access channel resources during a handover in unlicensed bands as per an aspect of the present disclosure. As shown in FIG. 26, a wireless device may receive one or more (RRC) messages from a first base station, indicating a handover from a first cell of the first base station to a second cell of a second base station. The wireless device may receive a DCI form the second base station. The DCI may indicate a random access channel occasion (RO). The wireless device may determine the RO based on the DCI. The wireless device may transmit a preamble to the second base station via the RO. The wireless device may receive a response to the preamble from the second base station. The wireless device may transmit, based on receiving response to the preamble, a second message to the second base station indicating a completion of the handover.

According to various embodiments, the one or more messages may further comprise a parameter indicating a presence of the DCI in the second cell. The wireless device may determine second periodic ROs, indicated by the one or more messages. The second periodic ROs may not comprise the RO indicated by the DCI. The one or more messages may further indicate a downlink reference signal of the second cell. Demodulation reference signal antenna port associated with a reception of the DCI via one or more downlink control channels of the second cell may be quasi co-located with the downlink reference signal. The RO is associated with the downlink reference signal. The wireless device may determine, based on one or more time offsets, a first monitoring occasion of one or more downlink control channels. The wireless device may start a monitoring window at the first monitoring occasion. The wireless device may monitor, during the monitoring window, the one or more downlink control channels for the DCI identified by a radio network temporary identifier. The one or more messages may further indicate at least one of the one or more time offsets and/or a time duration for the monitoring window and/or the radio network temporary identifier. The first monitoring occasion may be an earliest monitoring occasion of the one or more downlink control channels after the one or more offsets from an end of a reception of the downlink reference signal. The one or more messages may comprise one or more parameters of random access resources of the second cell. The one or more parameters of the random access resources may comprise: one or more preambles comprising the preamble and/or one or more time domain resources of the RO and/or one or more frequency domain resources of the RO. The wireless device may determine the RO based on the one or more parameters of the random access resources indicated by the one or more messages. The wireless device may determine the RO based on the one or more time domain resources and/or the one or more frequency domain resources and/or at least one offset indicated by the DCI and/or a reception timing of the DCI. The wireless device may perform at least one channel access procedure to access a channel on which the preamble is transmitted, based on a type of the at least one channel access procedure, indicated by the DCI. The wireless device may determine that the channel is idle before transmitting the preamble.

FIG. 27 is a flow diagram of an example embodiment for a base station dynamically scheduling random access channel resources during a handover in unlicensed bands as per an aspect of the present disclosure. The base station may be a target base station. The base station may receive a request of a handover of a wireless device from a first cell of the first base station to a second cell of the second base station. As shown in FIG. 27, the (e.g. target) base station may transmit to the first (e.g. source) base station a first (RRC) message indicating an acknowledgement of the request of the handover for the wireless device. The base station may transmit, to the wireless device, a DCI indicating a random access channel occasion (RO) of the second cell. The base station may receive a preamble from the wireless device via the RO in response to the DCI. The base station may transmit to the wireless device a response of the preamble. The base station may receive a second message from the wireless device indicating a completion of the handover (e.g. RRC reconfiguration-complete message).

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a wireless device from a first base station, one or more messages indicating:
      a handover from a first cell of the first base station to a second cell of a second base station;
      a time duration of a monitoring window; and
      a time offset of the monitoring window;
   determining, based on the time offset and for starting the monitoring window, a monitoring occasion of a downlink control channel of the second cell;
   starting the monitoring window, with the time duration, at the determined monitoring occasion;
   monitoring, based on the one or more messages indicating the handover and during the monitoring window started at the monitoring occasion with the time duration, the downlink control channel for a downlink control information (DCI) from the second base station;
   receiving, based on the monitoring, the DCI from the second base station;
   determining a random-access-channel occasion (RO) of the second cell based on the received DCI;
   transmitting a preamble to the second base station via the RO; and
   transmitting, based on receiving a response to the preamble, a message to the second base station indicating a completion of the handover.

2. The method of claim 1, wherein the one or more messages comprise a parameter indicating a presence of the DCI in the second cell.

3. The method of claim 1, further comprising determining periodic ROs indicated by the one or more messages, wherein the periodic ROs do not comprise the RO indicated by the DCI.

4. The method of claim 1, wherein:
   the one or more messages further indicate a downlink reference signal of the second cell;
   a demodulation reference signal antenna port, associated with the reception of the DCI via one or more downlink control channels of the second cell, is quasi co-located with the downlink reference signal; and
   the RO is associated with the downlink reference signal.

5. The method of claim 1, wherein the DCI is identified by a radio network temporary identifier.

6. The method of claim 5, wherein the one or more messages further indicate the radio network temporary identifier.

7. The method of claim 5, wherein the first monitoring occasion is an earliest monitoring occasion of the downlink control channel after the time offset from an end of a reception of a downlink reference signal of the second cell.

8. The method of claim 1, wherein:
   the one or more messages comprise one or more parameters of random access resources of the second cell, the one or more parameters comprising:
      one or more preambles comprising the preamble;
      one or more time domain resources of the RO; and
      one or more frequency domain resources of the RO; and
   wherein the RO is determined further based on the one or more parameters of the random access resources indicated by the one or more messages.

9. The method of claim 8, wherein the determining the RO comprises determining the RO based on:
   the one or more time domain resources;
   the one or more frequency domain resources;
   at least one offset indicated by the DCI; and
   a reception timing of the DCI.

10. The method of claim 1, further comprising:
    performing, based on a type of channel access procedure, at least one channel access procedure to access a channel on which the preamble is transmitted, wherein the type is indicated by the DCI; and
    determining that the channel is idle before transmitting the preamble.

11. A wireless device comprising:
    one or more processors; and
    memory storing instructions that, when executed by the one or more processors, cause the wireless device to:
       receive, from a first base station, one or more messages indicating:
          a handover from a first cell of the first base station to a second cell of a second base station;
          a time duration of a monitoring window; and
          a time offset of the monitoring window;
       determine, based on the time offset and for starting the monitoring window, a monitoring occasion of a downlink control channel of the second cell;
       start the monitoring window, with the time duration, at the determined monitoring occasion;
       monitor, based on the one or more messages indicating the handover and during the monitoring window started at the monitoring occasion with the time duration, the downlink control channel for a downlink control information (DCI) from the second base station;
       receive, based on the monitoring, the DCI from the second base station;
       determine a random-access-channel occasion (RO) of the second cell based on the received DCI;
       transmit a preamble to the second base station via the RO; and
       transmit, based on receiving a response to the preamble, a message to the second base station indicating a completion of the handover.

12. The wireless device of claim 11, wherein the one or more messages comprise a parameter indicating a presence of the DCI in the second cell.

13. The wireless device of claim 11, wherein the instructions further cause the wireless device to determine periodic ROs indicated by the one or more messages, and wherein the periodic ROs do not comprise the RO indicated by the DCI.

14. The wireless device of claim 11, wherein:
the one or more messages further indicate a downlink reference signal of the second cell;
a demodulation reference signal antenna port, associated with the reception of the DCI via one or more downlink control channels of the second cell, is quasi co-located with the downlink reference signal; and
the RO is associated with the downlink reference signal.

15. The wireless device of claim 11,
wherein the DCI is identified by a radio network temporary identifier.

16. The wireless device of claim 15, wherein the one or more messages further indicate the radio network temporary identifier.

17. The wireless device of claim 15, wherein the monitoring occasion is an earliest monitoring occasion of the downlink control channel after the time offset from an end of a reception of a downlink reference signal of the second cell.

18. The wireless device of claim 11, wherein:
the one or more messages comprise one or more parameters of random access resources of the second cell, the one or more parameters comprising:
one or more preambles comprising the preamble;
one or more time domain resources of the RO; and
one or more frequency domain resources of the RO; and
wherein the RO is determined further based on the one or more parameters of the random access resources indicated by the one or more messages.

19. The wireless device of claim 18, wherein the instructions further cause the wireless device to determine the RO based on:
the one or more time domain resources;
the one or more frequency domain resources;
at least one offset indicated by the DCI; and
a reception timing of the DCI.

20. A system comprising:
a first base station;
a second base station; and
a wireless device comprising:
one or more processors; and
a memory storing instructions that, when executed by the one or more processors, cause the wireless device to:
receive from the first base station, one or more messages indicating:
a handover from a first cell of the first base station to a second cell of the second base station;
a time duration of a monitoring window; and
a time offset of the monitoring window;
determine, based on the time offset and for starting the monitoring window, a monitoring occasion of a downlink control channel of the second cell;
start the monitoring window, with the time duration, at the determined monitoring occasion;
monitor, based on the one or more messages indicating the handover and during the monitoring window started at the monitoring occasion with the time duration, the downlink control channel for a downlink control information (DCI) from the second base station;
receive, based on the monitoring, the DCI from the second base station;
determine a random-access-channel occasion (RO) of the second cell based on the received DCI;
transmit a preamble to the second base station via the RO; and
transmit, based on receiving a response to the preamble, a message to the second base station indicating a completion of the handover.

* * * * *

UNITED STATES PATENT AND TRADEMARK OFFICE
CERTIFICATE OF CORRECTION

PATENT NO. : 11,412,422 B2
APPLICATION NO. : 16/800518
DATED : August 9, 2022
INVENTOR(S) : Nazanin Rastegardoost et al.

Page 1 of 1

It is certified that error appears in the above-identified patent and that said Letters Patent is hereby corrected as shown below:

In the Claims

In Column 70, Line 8, replace "7. The method of claim 5, wherein the first monitoring" with --7. The method of claim 5, wherein the monitoring--.

Signed and Sealed this
Twenty-fifth Day of October, 2022

Katherine Kelly Vidal
*Director of the United States Patent and Trademark Office*